United States Patent [19]
Miyoshi et al.

[11] Patent Number: 5,274,757
[45] Date of Patent: Dec. 28, 1993

[54] BOOK EDITING APPARATUS

[75] Inventors: Akito Miyoshi; Hiromitsu Terai, both of Saitama, Japan

[73] Assignee: Honda Giken Kogyo Kabushiki Kaisha, Tokyo, Japan

[21] Appl. No.: 763,516

[22] Filed: Sep. 20, 1991

Related U.S. Application Data

[62] Division of Ser. No. 360,923, Apr. 11, 1989, Pat. No. 5,138,711.

[30] Foreign Application Priority Data

Aug. 28, 1987 [JP] Japan .................. 62-216233
Aug. 28, 1987 [JP] Japan .................. 62-216234
Sep. 8, 1987 [JP] Japan .................. 62-224276

[51] Int. Cl.[5] .................. G06F 15/20; G06F 3/14
[52] U.S. Cl. .................. 395/146; 395/144; 364/DIG. 2; 364/943; 364/943.1; 364/943.5
[58] Field of Search .............. 395/146, 145, 144, 149, 395/575

[56] References Cited

U.S. PATENT DOCUMENTS

| | | | |
|---|---|---|---|
| 4,057,849 | 11/1977 | Ying et al. | 364/900 |
| 4,608,662 | 8/1986 | Watanabe et al. | 395/146 |
| 4,652,698 | 3/1987 | Hale et al. | 380/24 |
| 4,951,249 | 8/1990 | McClung et al. | 364/900 |
| 4,958,291 | 9/1990 | Mamone et al. | 364/900 |
| 5,051,930 | 9/1991 | Kuwabara et al. | 364/523 |

*Primary Examiner*—Kevin A. Kriess
*Attorney, Agent, or Firm*—Pollock, VandeSande and Priddy

[57] ABSTRACT

In a book editing apparatus, an element data key possessing a format common to various kinds of element data such as documents, illustrations, and photographs which jointly compose one page of a book to be edited, is assigned to each of the various kinds of element data for enabling data concerning the elements to be handled as common data. The data for one page of an already edited book is decomposed into data concerning layout and other data concerning elements for storage. The data for one page of a book to be edited is composed of data concerning layout and previously stored data concerning desired elements.

4 Claims, 35 Drawing Sheets

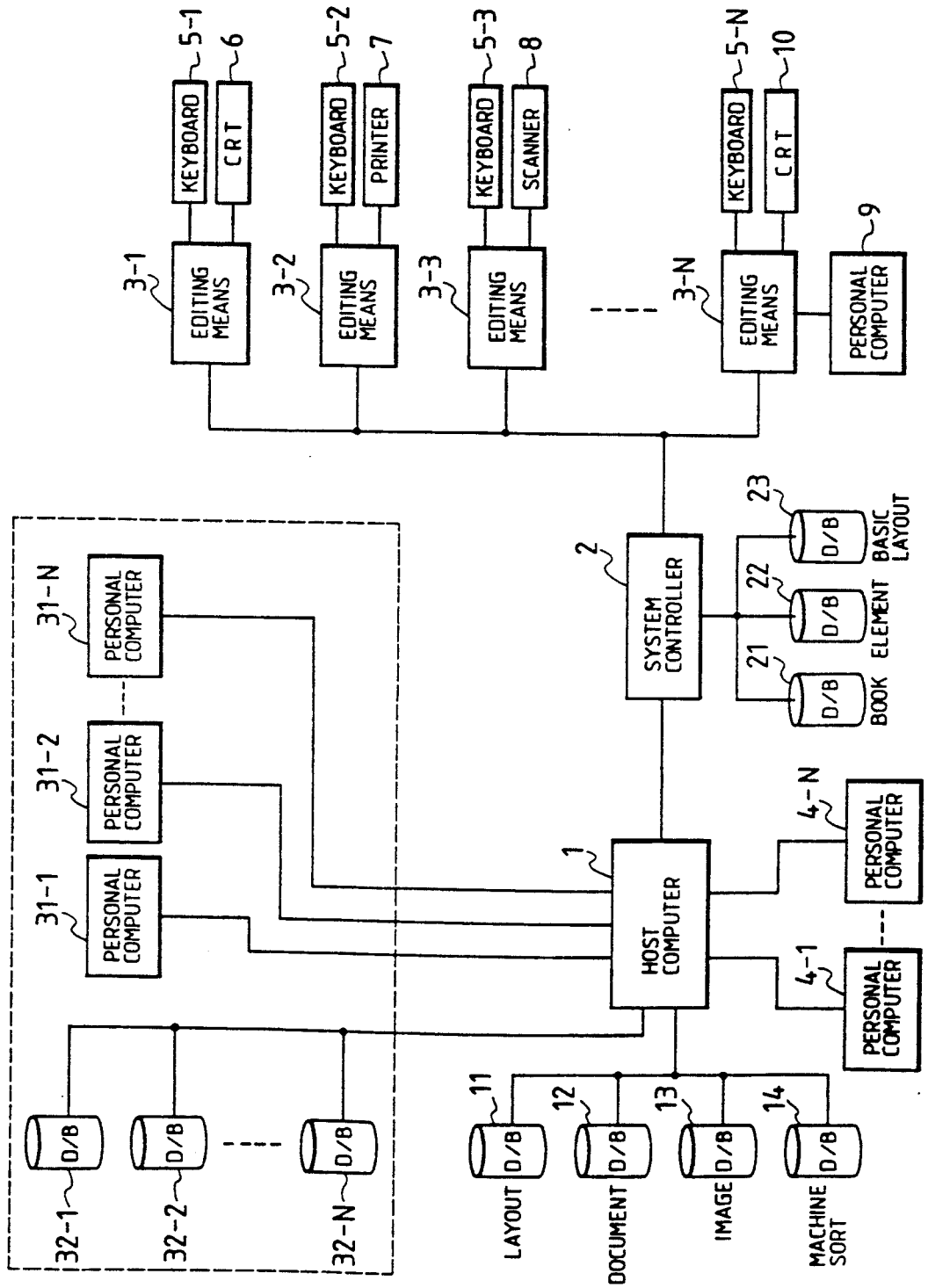

FIG. 3(1/5)
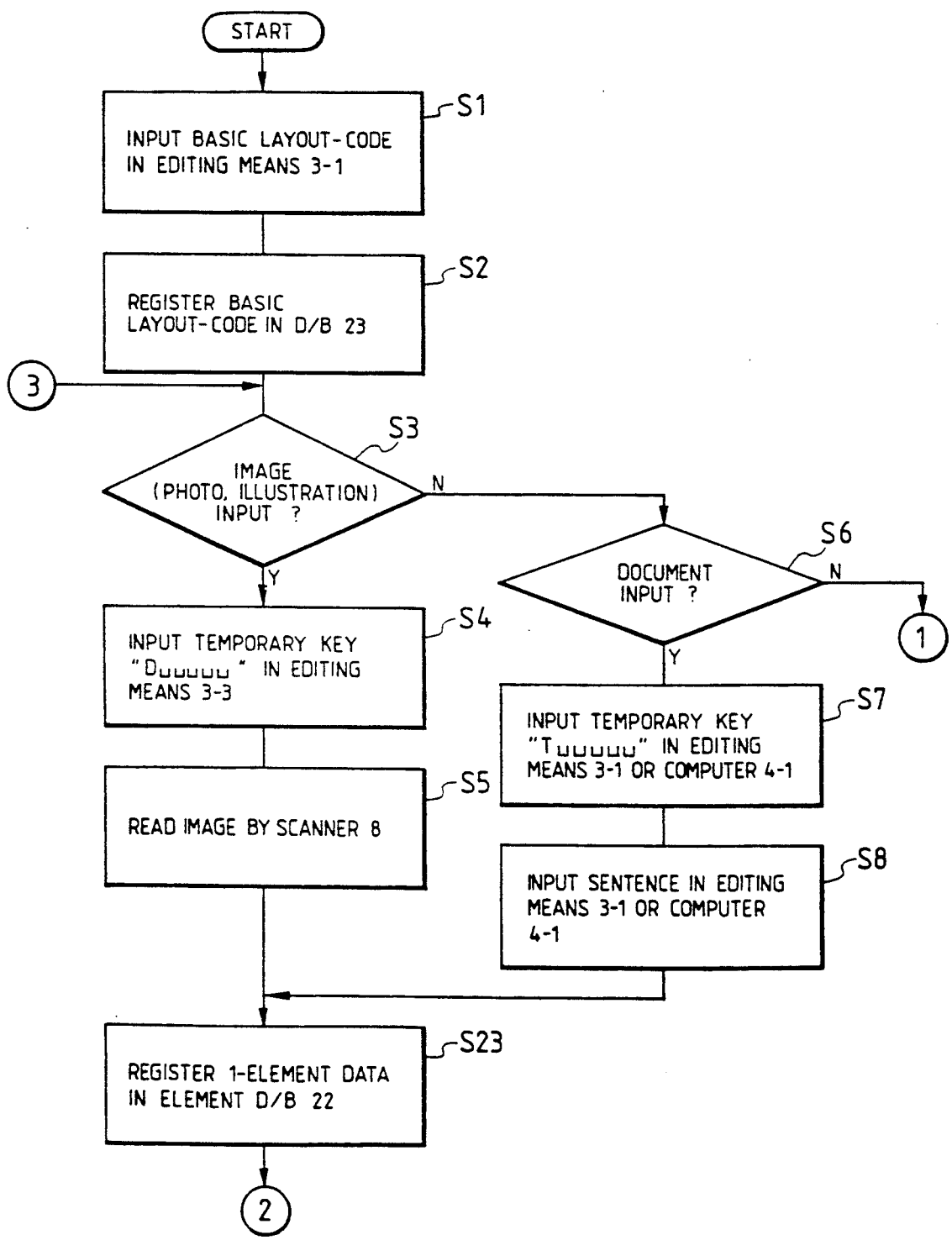

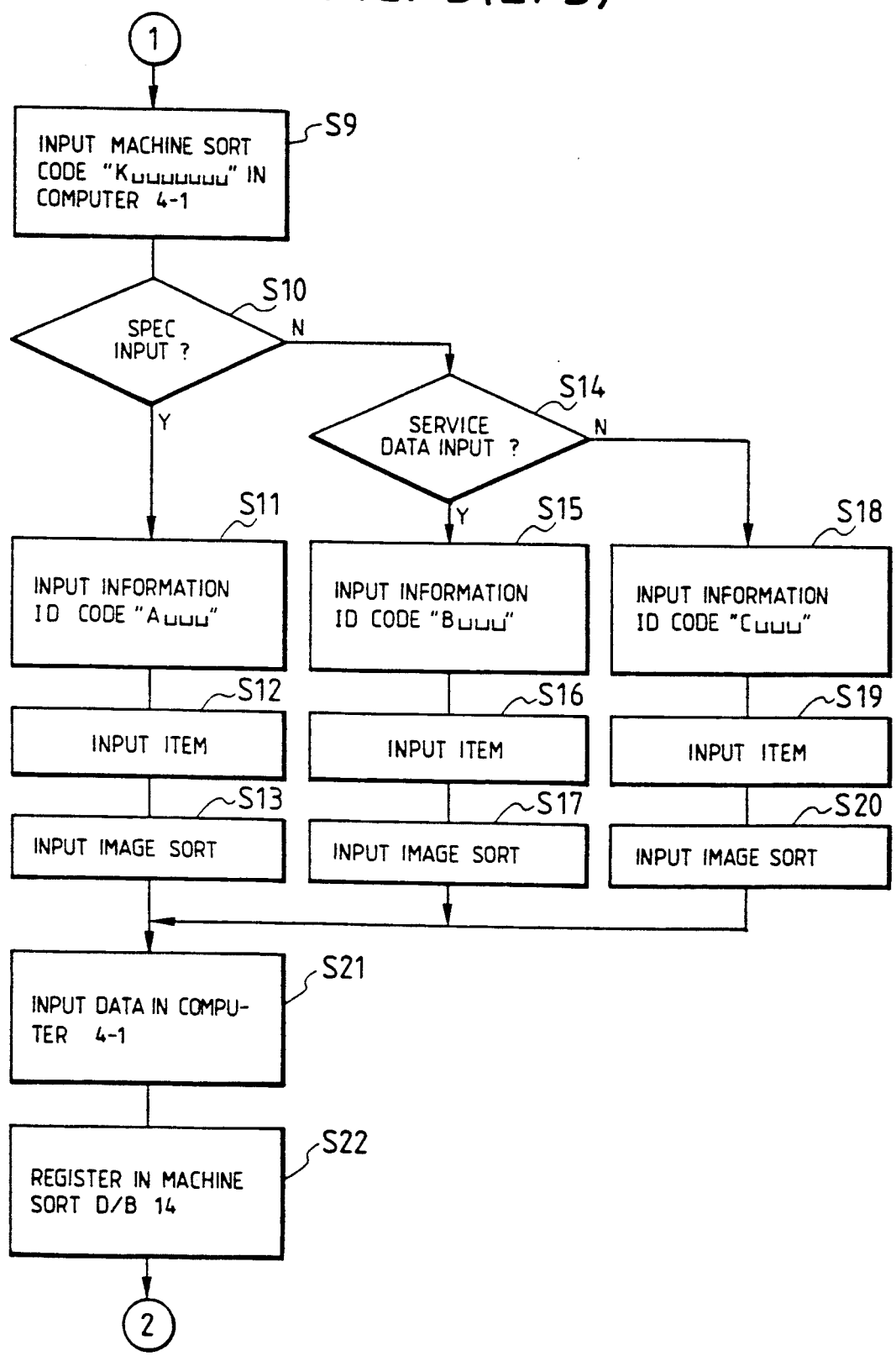
FIG. 3(2/5)

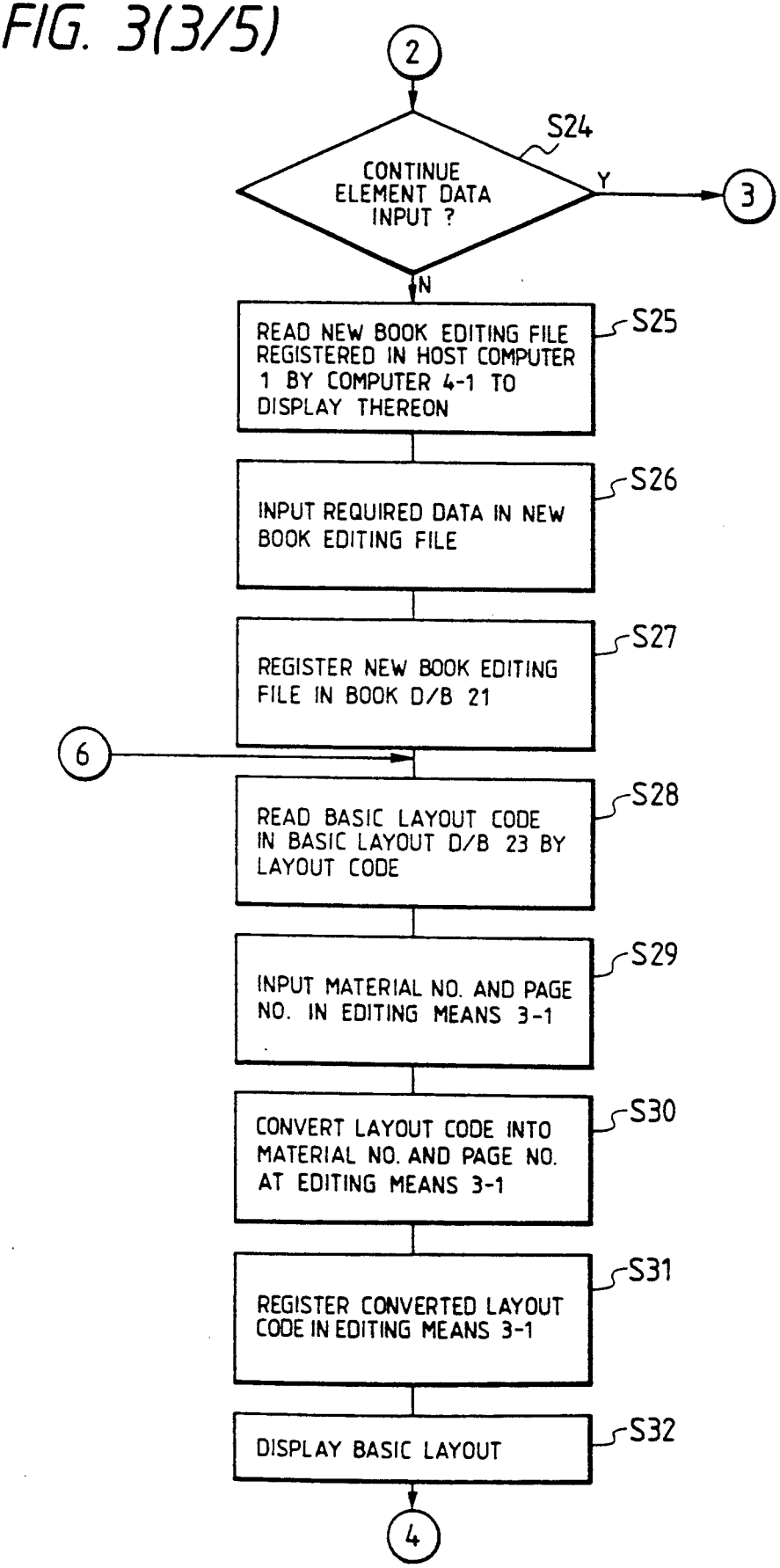
FIG. 3(3/5)

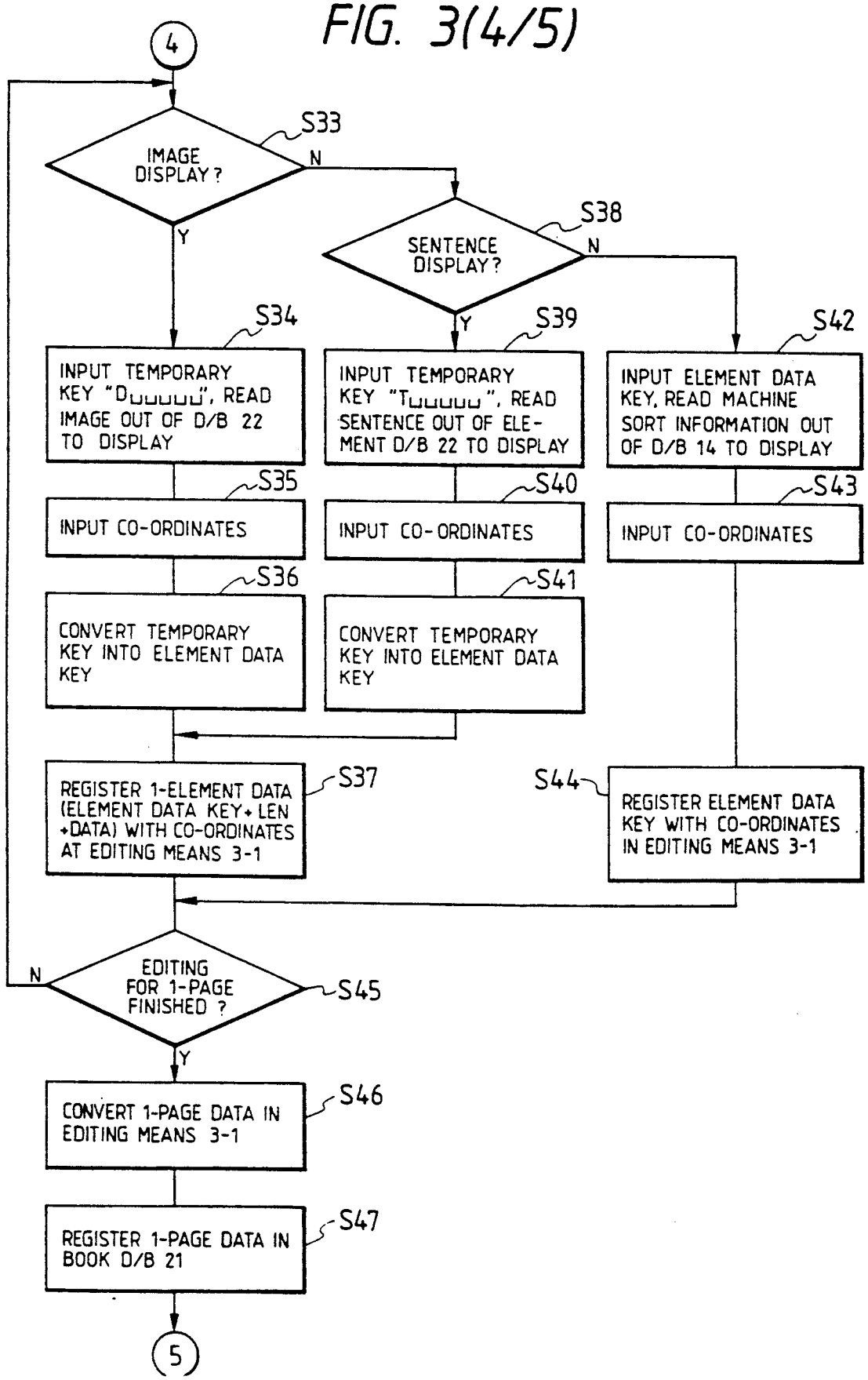
FIG. 3(4/5)

FIG. 3(5/5)
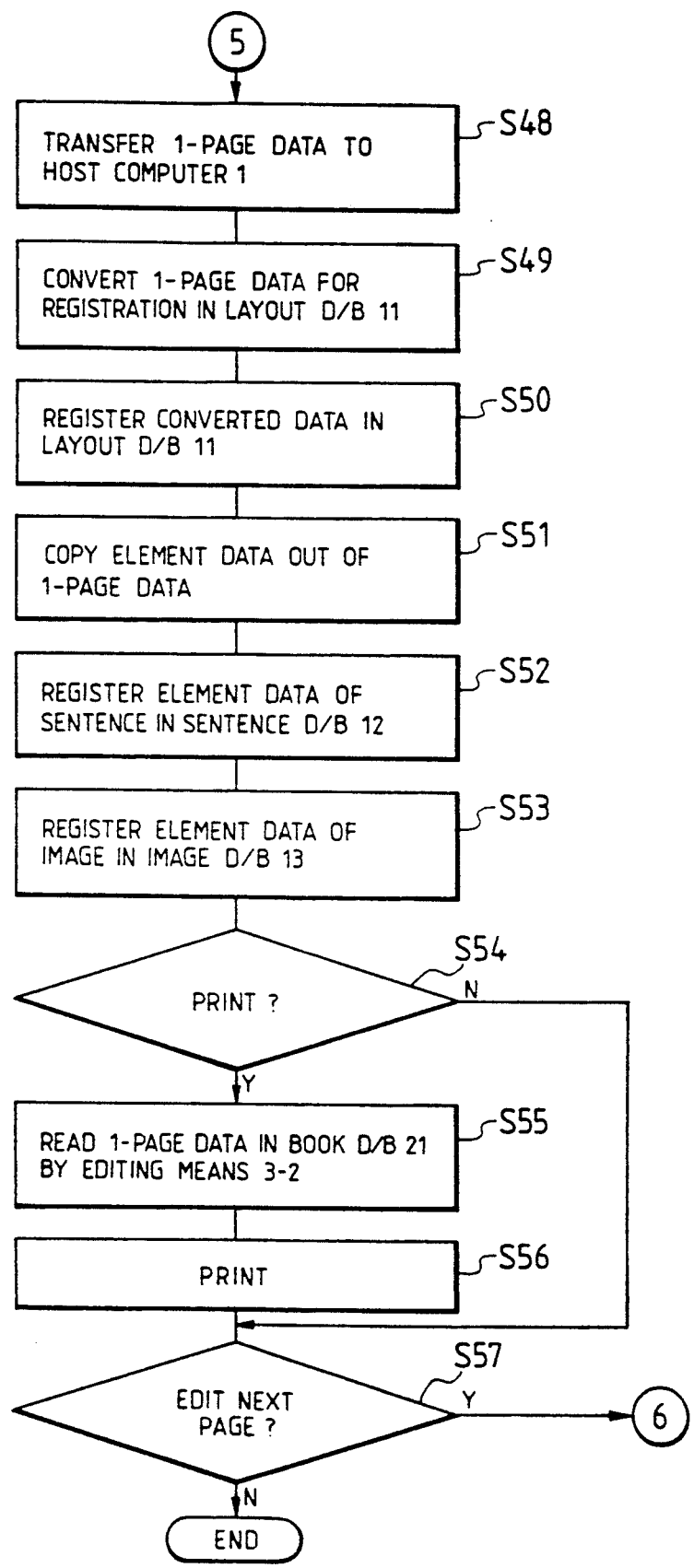

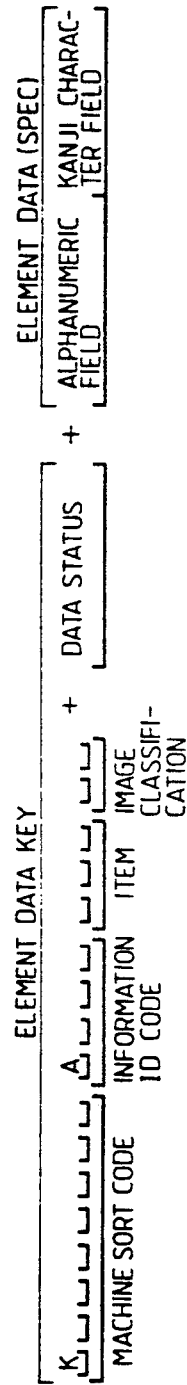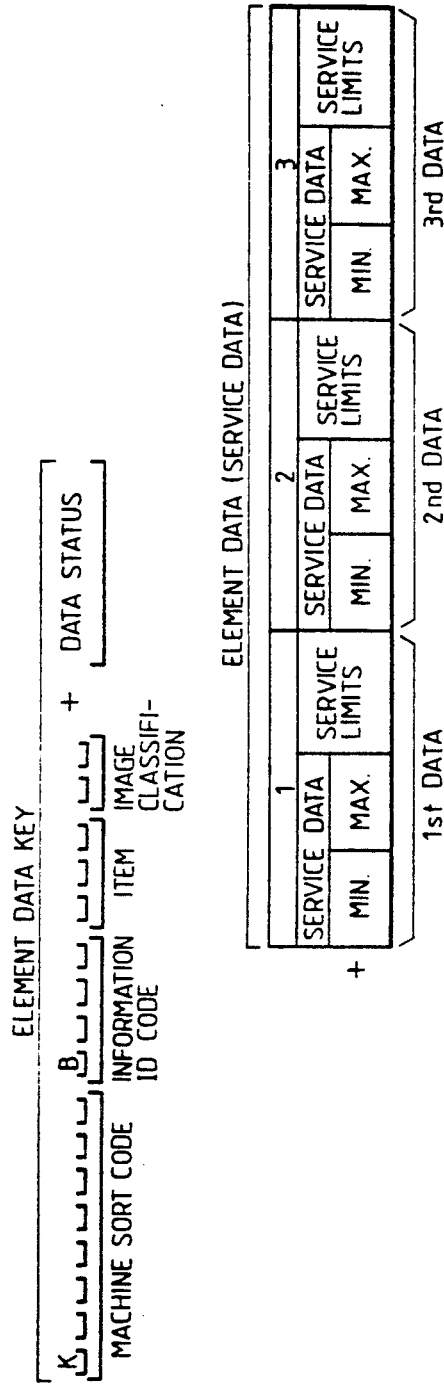
FIG. 6
FIG. 7

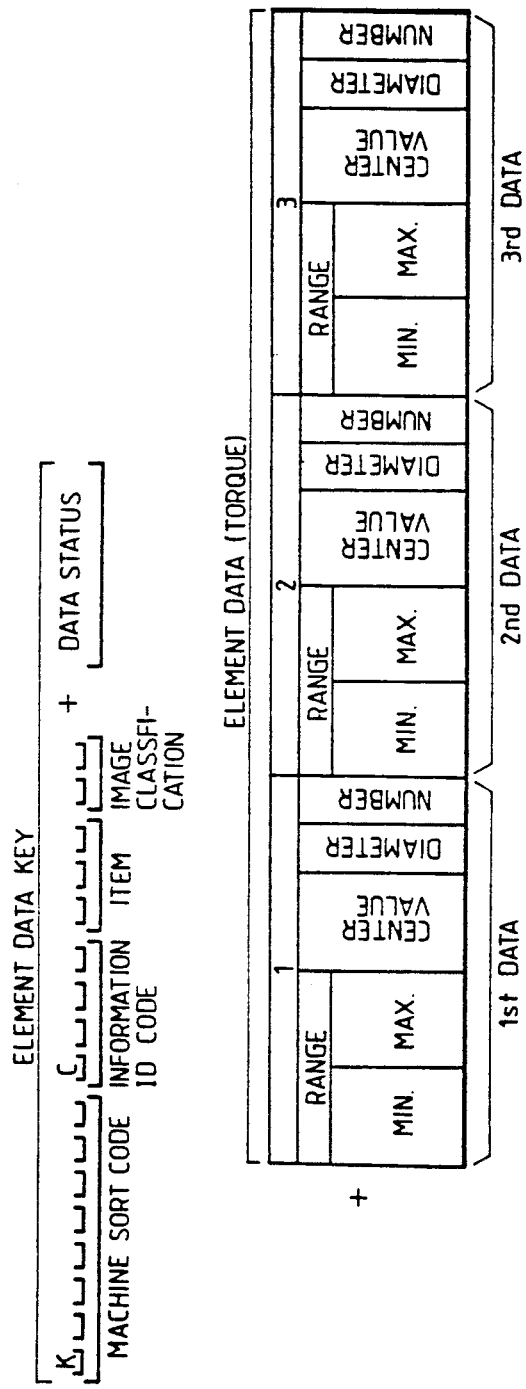
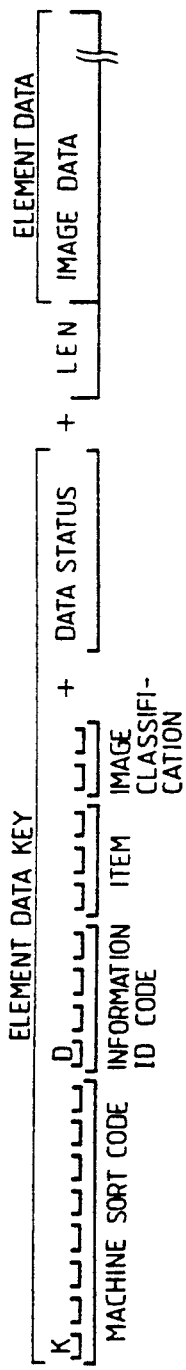
FIG. 8
FIG. 9

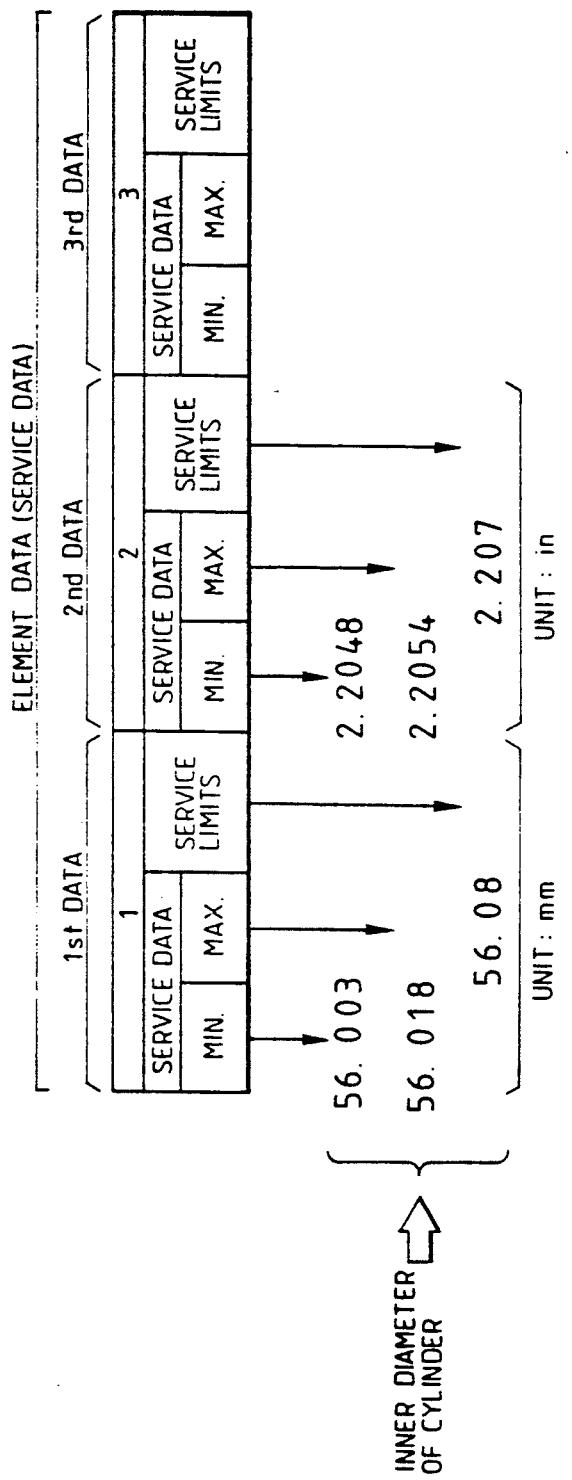

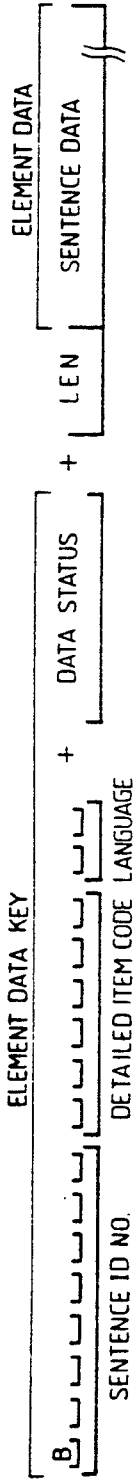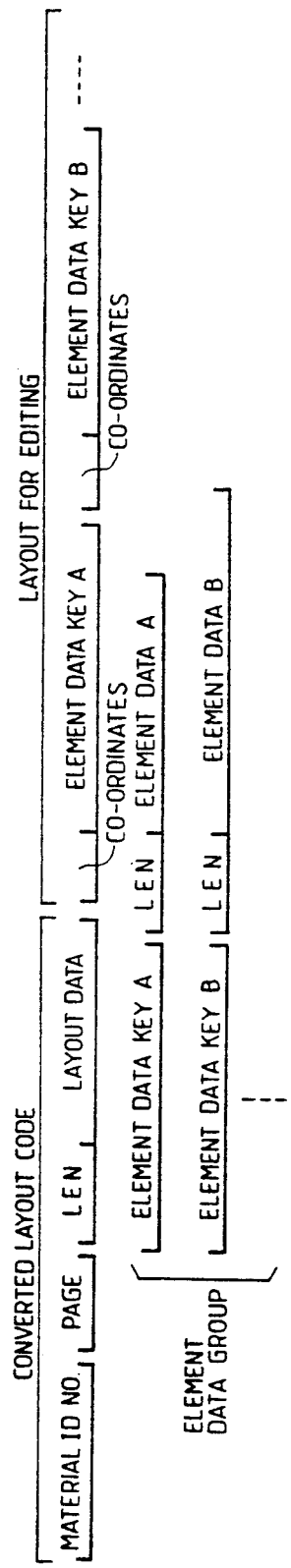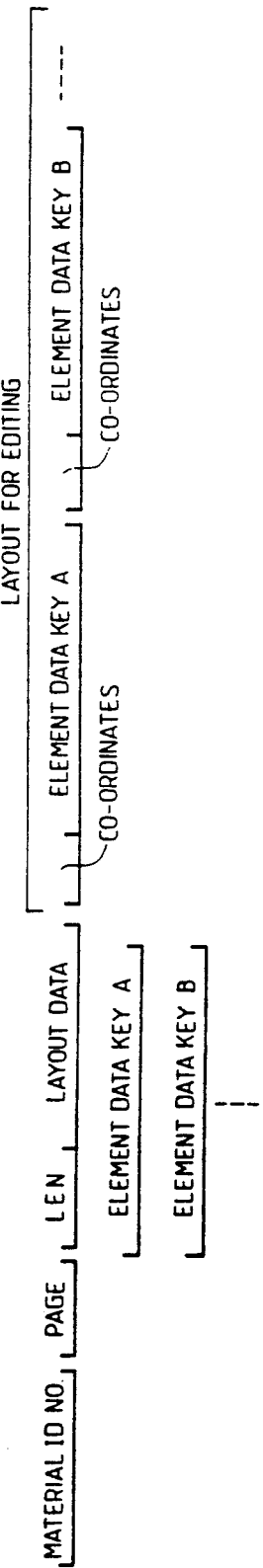

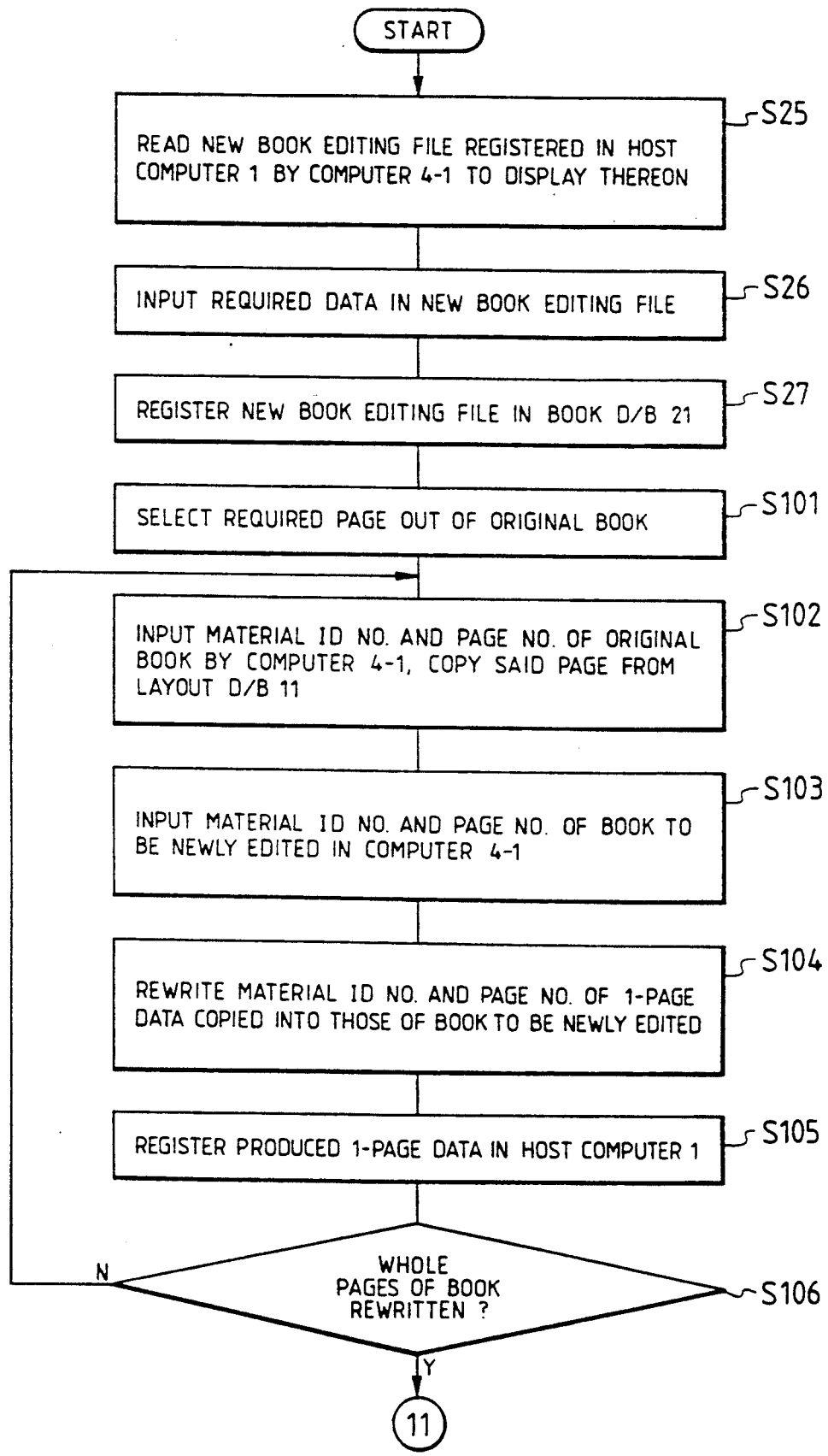
FIG. 20(1/6)

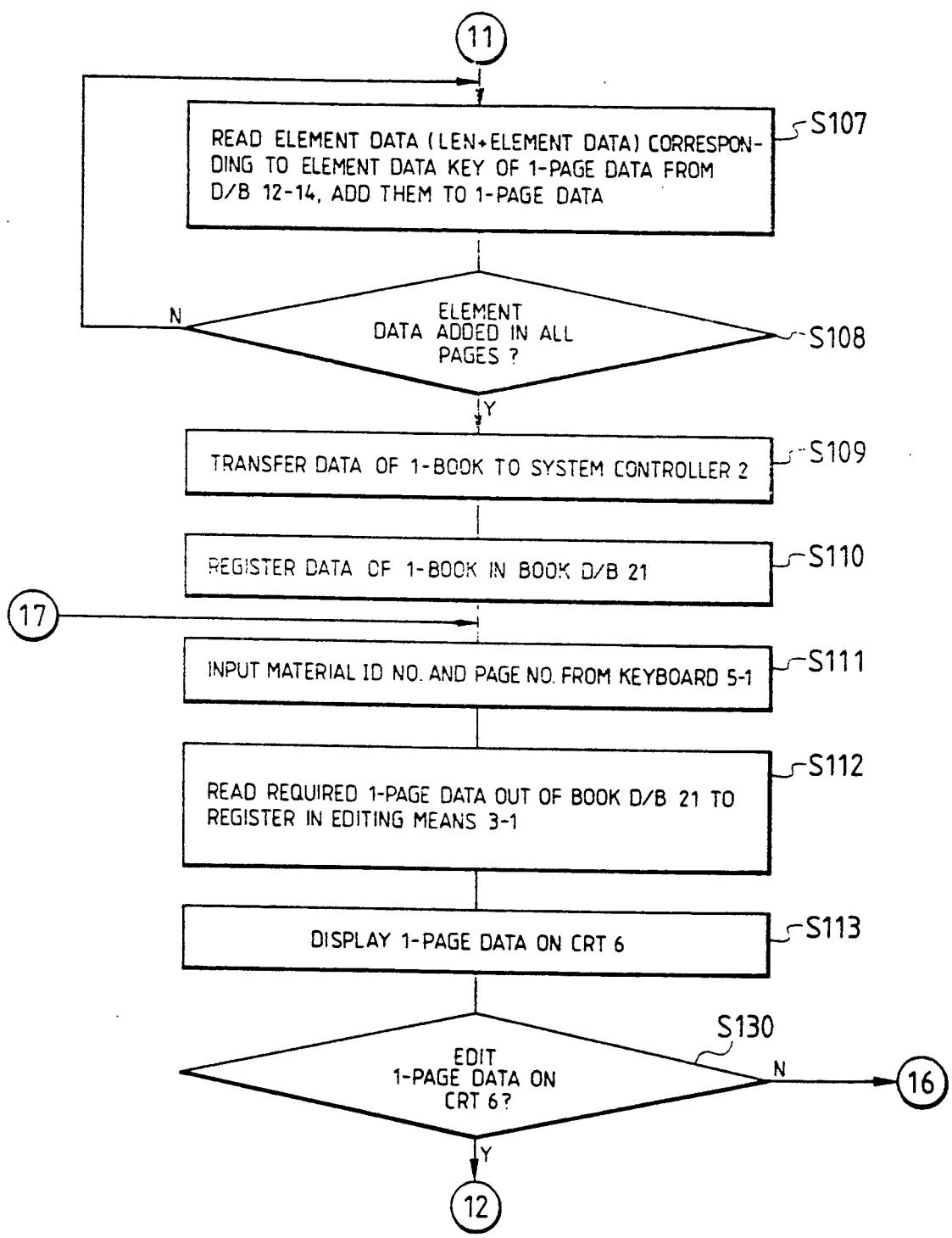
FIG. 20(2/6)

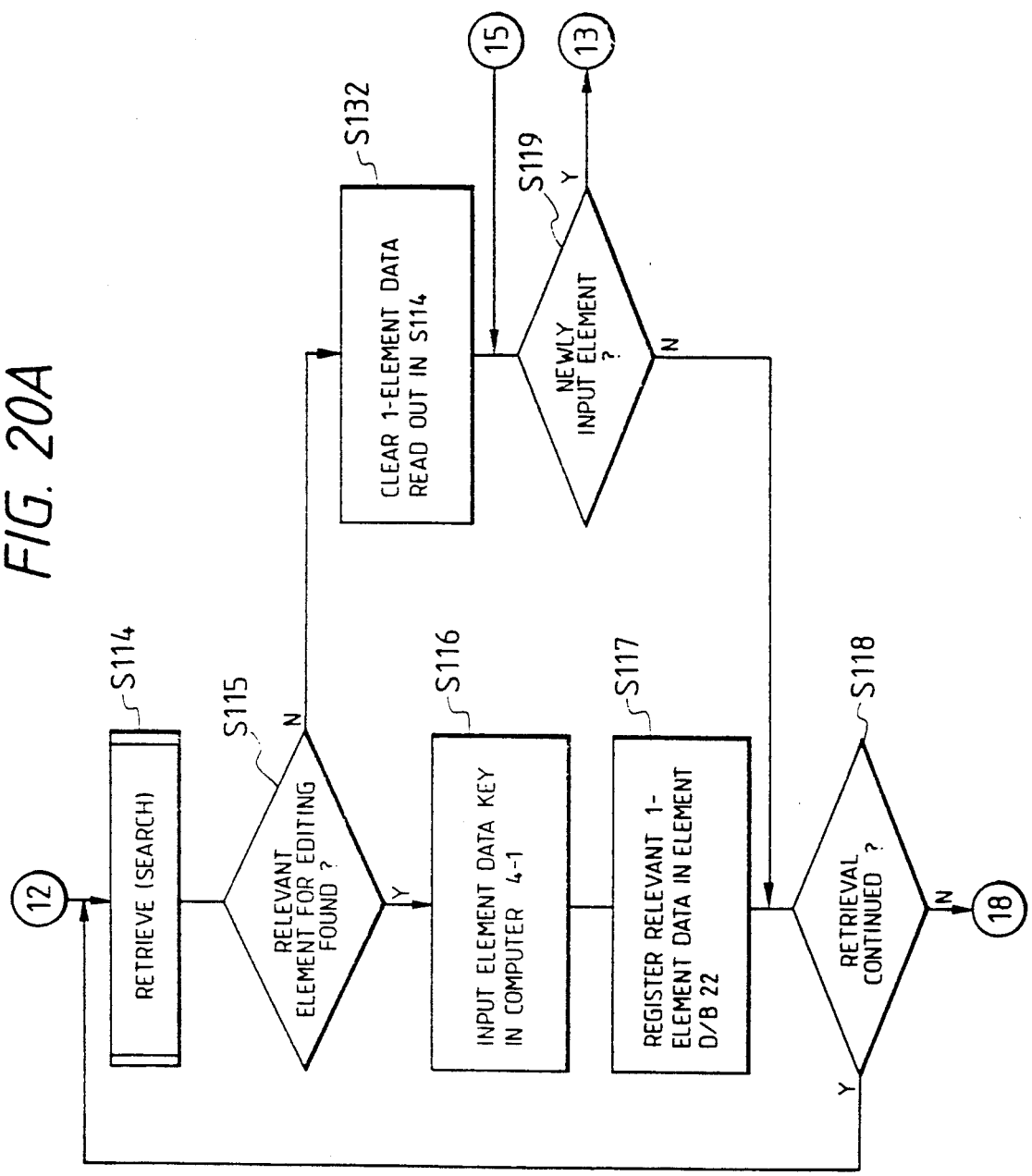
FIG. 20A
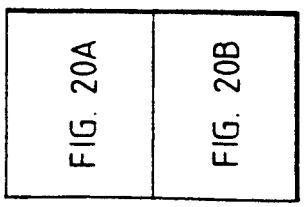
FIG. 20(3/6)

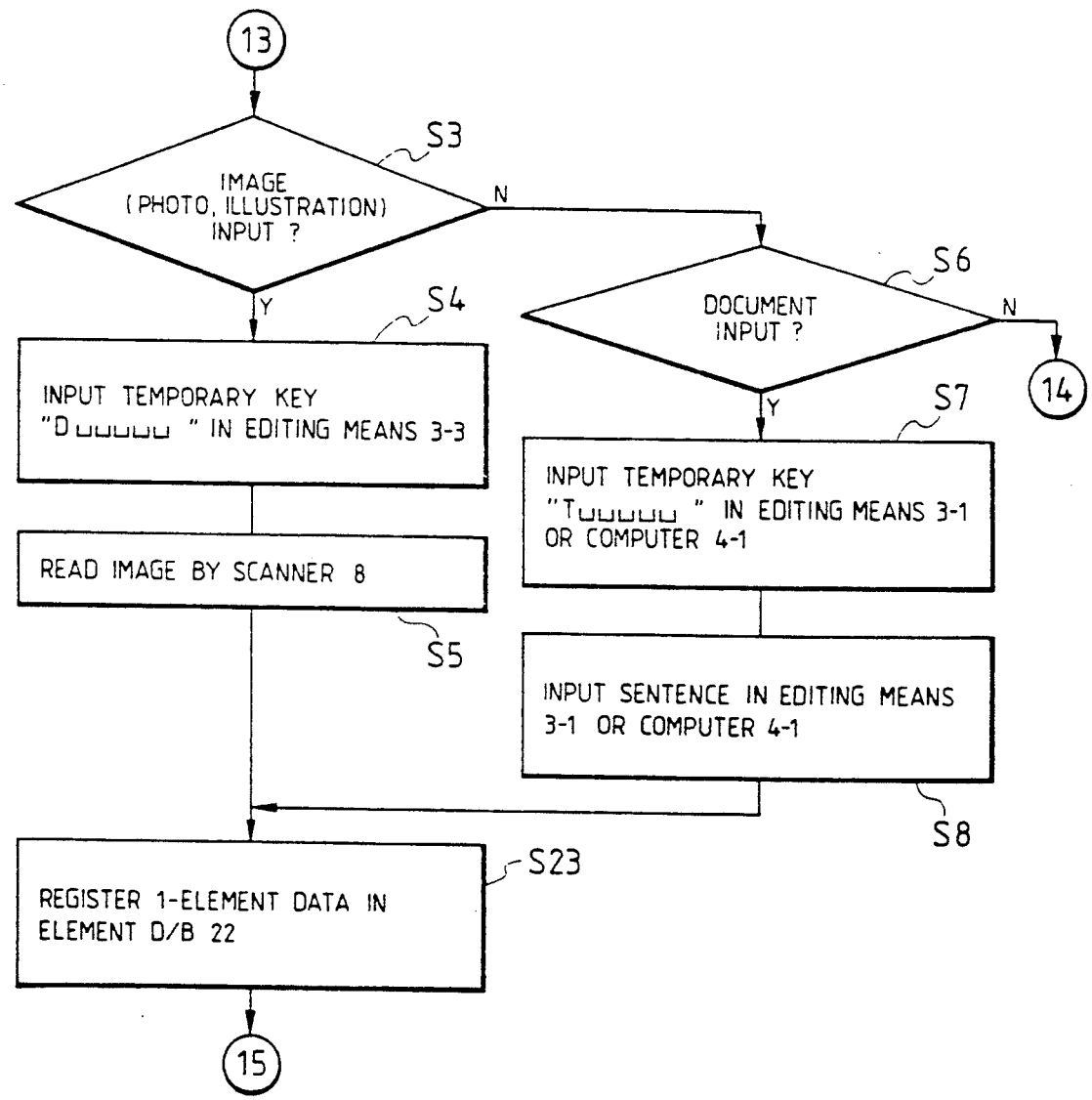
FIG. 20(4/6)

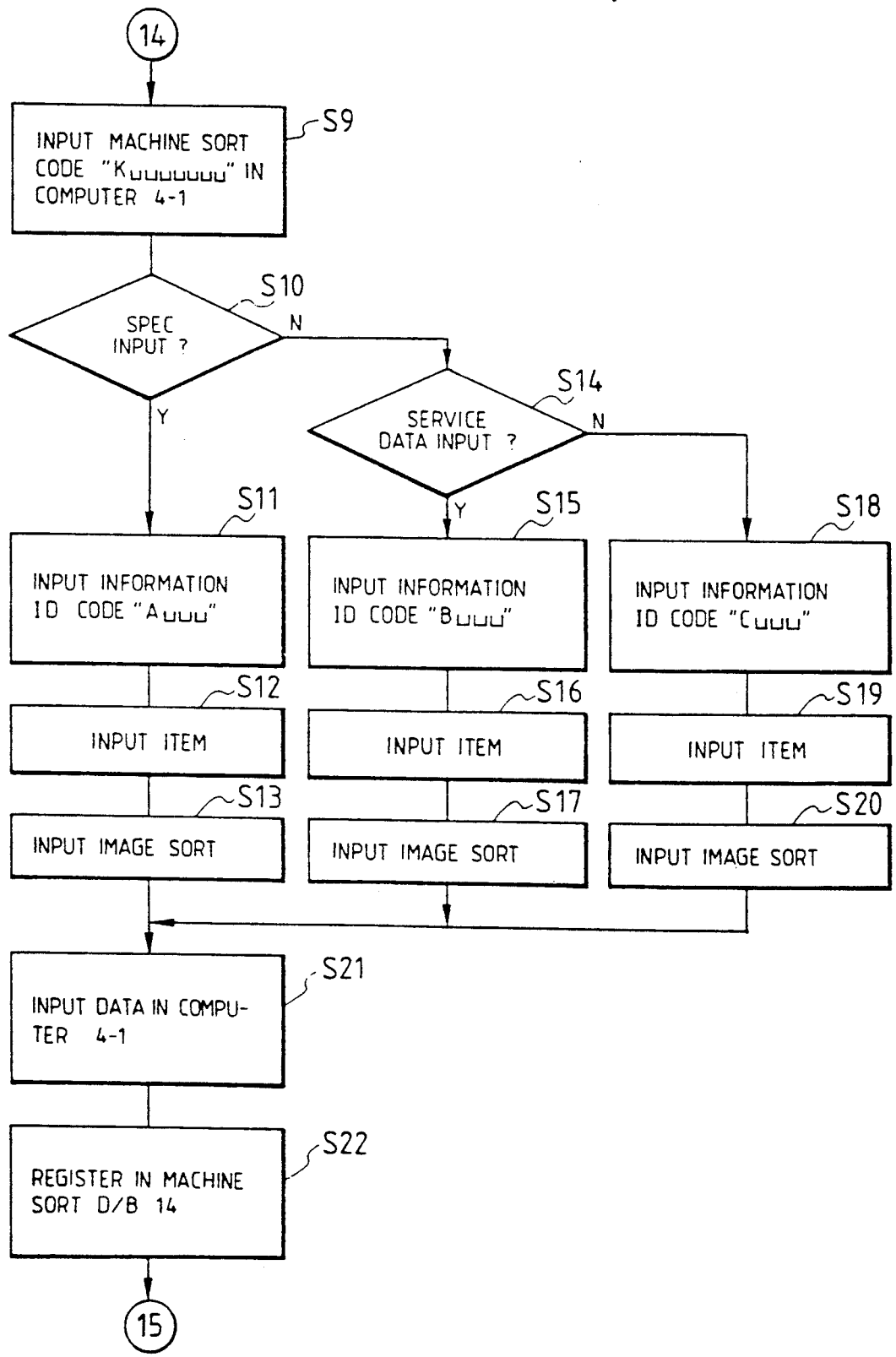
FIG. 20(5/6)

FIG. 20(6/6)
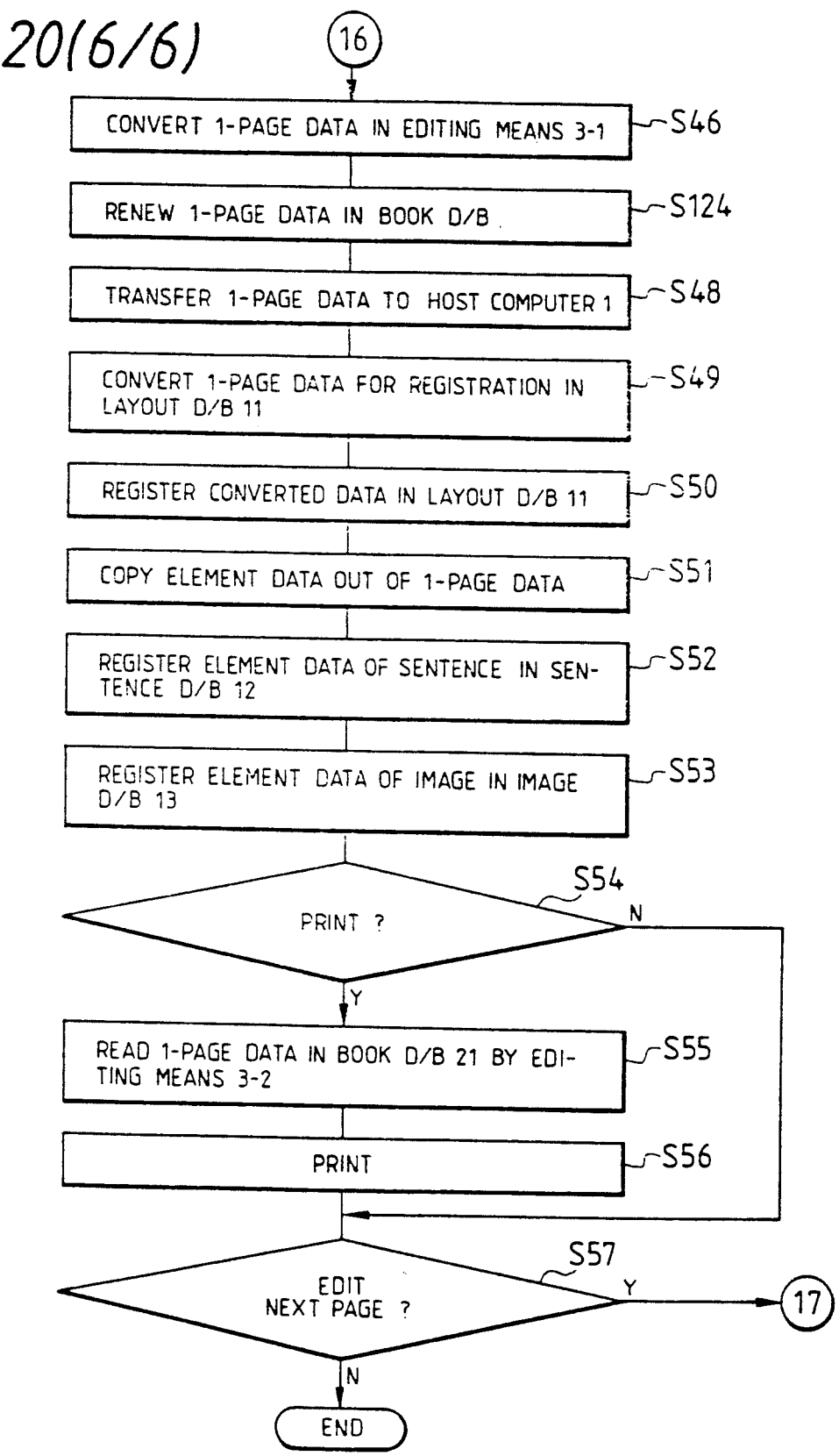

FIG. 22 a TABLE

| I | D |   |   | TITLE |
|---|---|---|---|-------|
| A | 0 | 0 | 0 | AUTO-BIKE |
| B | 0 | 0 | 0 | AUTOMOBILE |
| C | 0 | 0 | 0 | JOB VEHICLE |
|   |   |   |   | --- |

← 1st RANK b TABLE

| I | D |   |   | TITLE |
|---|---|---|---|-------|
| A | A | 0 | 0 | EXPLANATION |
| A | B | 0 | 0 | NOTICE |
| A | C | 0 | 0 | --- |
|   |   |   |   | --- | c TABLE

| I | D |   |   | TITLE |
|---|---|---|---|-------|
| B | A | 0 | 0 | EXPLANATION |
| B | B | 0 | 0 | NOTICE |
| B | C | 0 | 0 | --- |
|   |   |   |   | --- |

---- 2nd RANK d TABLE

| I | D |   |   | TITLE |
|---|---|---|---|-------|
| A | A | A | 0 | CONSTRUCTION |
| A | A | B | 0 | HANDLING |
| A | A | C | 0 | --- |
|   |   |   |   | --- | e TABLE

| I | D |   |   | TITLE |
|---|---|---|---|-------|
| A | B | A | 0 | CONSTRUCTION |
| A | B | B | 0 | HANDLING |
| A | B | C | 0 | --- |
|   |   |   |   | --- |

---- 3rd RANK f TABLE

| I | D |   |   | TITLE |
|---|---|---|---|-------|
| A | A | A | A | 12th MONTH MAINTENANCE |
| A | A | A | B | 6th MONTH MAINTENANCE |
| A | A | A | C | --- |
|   |   |   |   | --- | g TABLE

| I | D |   |   | TITLE |
|---|---|---|---|-------|
| A | A | B | A | 12th MONTH MAINTENANCE |
| A | A | B | B | 6th MONTH MAINTENANCE |
| A | A | B | C | --- |
|   |   |   |   | --- |

---- 4th RANK

| CONVERSION CLASS | IMAGE CLASS | DISPLAY ON CRT |
|---|---|---|
| 10 | 10 | 56.003-56.018mm |
|  | 20 | 56.003-56.018mm (2.2048-2.2054in) |
|  | ⋮ | ⋮ |
| 20 | 10 | 2.2048-2.2054in |
|  | 20 | 2.2048-2.2054in (56.003-56.018mm) |
|  | ⋮ | ⋮ |
| 40 | 10 | 56.003-56.018mm |
|  | 20 | 56.003-56.018mm (2.2048-2.2054in) |
|  | ⋮ | ⋮ |
| ⋮ | ⋮ | ⋮ |

FIG. 31

TABLE a

| SECURITY NO. | A 1 2 3 4 |
|---|---|
| DATA ID NO. | B 1 0 |
| | B 1 2 |
| | B 1 5 |
| | B 1 6 |
| | NEW |

TABLE b

| SECURITY NO. | A 1 2 3 5 |
|---|---|
| DATA ID NO. | B 1 2 |
| | B 1 5 |
| | B 1 6 |
| | |
| | |

TABLE c

| SECURITY NO. | A 1 2 3 6 |
|---|---|
| DATA ID NO. | B 1 0 |
| | B 1 4 |
| | |
| | |
| | |

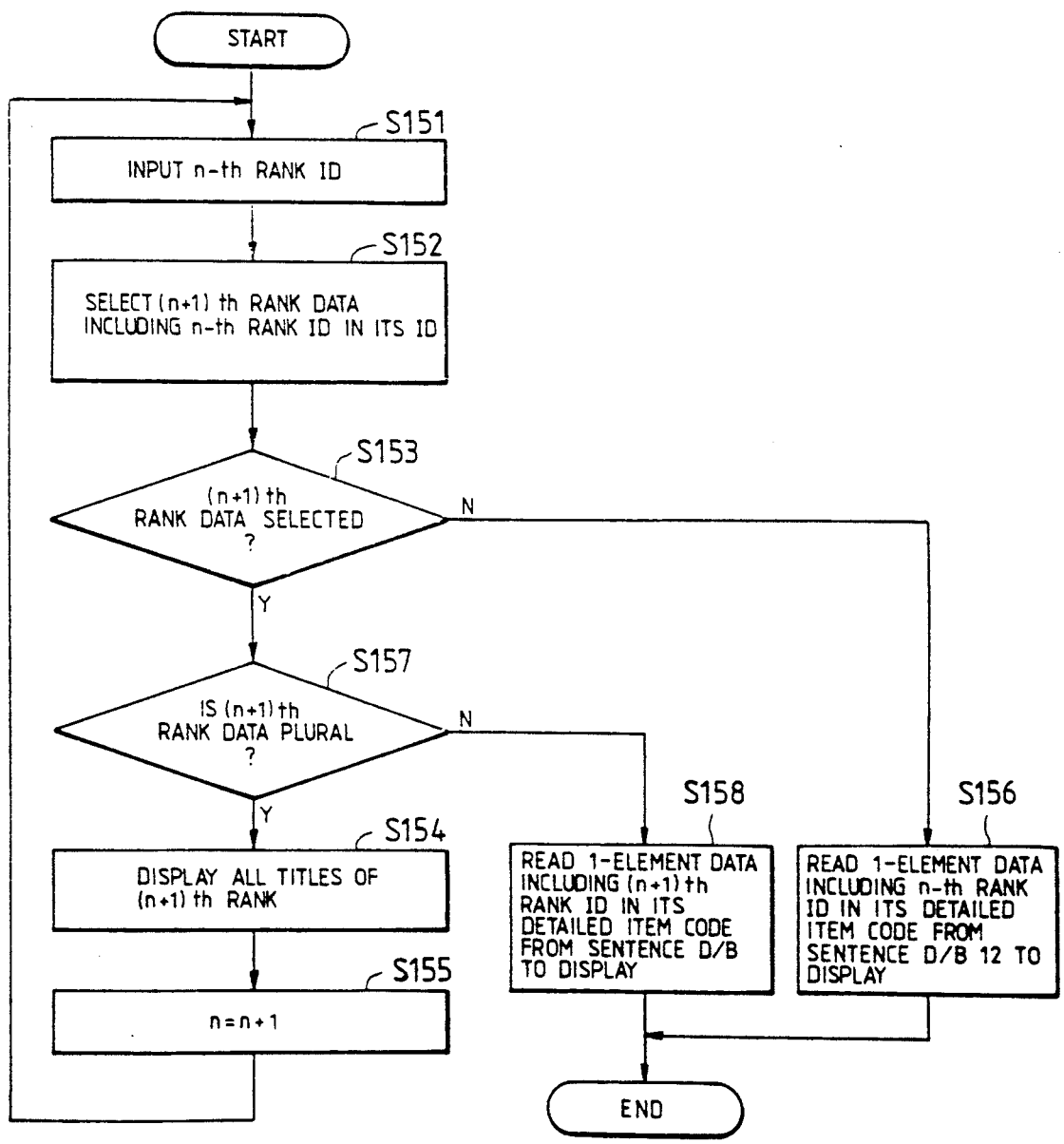

BOOK EDITING APPARATUS

This is a divisional of application of Ser. No. 07/360,923 filed on Apr. 11, 1989 now U.S. Pat. No. 5,138,711.

DESCRIPTION

1. Technical Field

This invention relates to a data processing system. More particularly this invention relates to a data processing system which is capable of easy and efficient retrieval of data.

This invention also relates to an editing apparatus aided by the data processing system. More particularly this invention relates to an editing apparatus possessing protective functions controlled by Security Number and enabling handling manuals such as for automobiles and electric appliances, books in general, magazines, and newspapers (hereinafter referred to collectively as "books") to be edited quickly and easily.

2. Background of the Invention

In recent years, the practice of performing the work of editing a book by the use of a personal computer or a work station (editing device) has been disseminated. In this case, the work of editing a book is carried out by newly feeding complete data on documents, illustrations, etc. for each of the pages, with the whole information of an edited book memorized as separated in units of page. With the conventional editing apparatus, however, those documents, illustrations, etc. which appear in two or more places cannot be utilized in common but must be repeatedly fed in all over. The conventional editing apparatus, therefore, takes up much time and labor in the production of a book. The production of a book, accordingly, is very expensive.

SUMMARY OF INVENTION

The present invention, directed to the solution of the problem mentioned above, is characterized by attaching an element data key possessing a format common to various kinds of element data such as documents, illustrations, and photographs which jointly form one page of the book, to each of the various kinds of element data thereby enabling the data concerning the elements to be handled as common data, causing data of an edited book to be decomposed into data concerning layout and other data concerning elements for storage, and composing data for one page with the data concerning the layout and the other data concerning desired elements.

When an editing apparatus is so constructed as to operate on the principle just described, the data for one edited page are enabled to be again decomposed into data concerning the layout and other data concerning the elements and put to storage. By again composing data for one page with the data concerning the layout and those concerning desired elements, therefore, the element data common to the plural pages can be used in common without requiring these data to be introduced newly or repeatedly.

When the editing of a book is enabled to be easily carried out as described above, however, there arises the possibility that an operator not authorized performs the work of editing a book or revises the contents of an already edited book. Further, since the various kinds of data forming a book are not only retained in the edited book but also memorized as element data, there ensues the possibility that the element data not yet disclosed to the public will be laid open to the public inspection without leave or even will be altered.

This invention also aims to solve the problem of alteration mentioned above.

For the solution of the problem of the alteration mentioned above, the present invention is characterized by utilizing a security number memory means for memorizing the security numbers assigned only to the operators authorized to edit books and inspect them and, whenever any operator seeks access to the editing apparatus, checking the security number of the operator, and allowing him to perform the work of editing with the editing apparatus only when the security number is found among the memorized security numbers or prohibiting him from doing so when the security No. is not found among the memorized security number.

The security of a book and element data can be warranted by checking the security number of an operator seeking access to the editing apparatus against the memorized security numbers to determine whether this operator should be allowed to do so.

This invention further provides processing means capable of efficient retrieval of data necessary for a new book from an already accumulated data base.

Generally, in the retrieval of data by a data processing apparatus, the wanted data are obtained by assigning titles (items) corresponding to various kinds of data registered in advance and, at the time of actual retrieval, introducing an item corresponding to a specific kind of data (hereinafter referred to as "data item") wanted into the data processing apparatus.

In a typical conventional data retrieval means, the items mentioned above are registered in advance in a hierarchical structure, the concepts of the items are sequentially defined by the use of input means for data items, and a particular data item which conforms to the item finally defined from a major concept is singled out to permit retrieval of the data required.

To be specific, when the retrieval of data is started, the items as major headlines appear on a display such as a CRT. When the operator selects from among the displayed items one having the contents of a pertinent data item, second items resulting from further division of the contents of the selected item appear as medial headlines on the display.

When the operator selects from among the newly displayed items one specific item having the contents of the data item, the third items resulting from further division of the contents of selected item are exhibited as minor headlines.

Thereafter, the processing described above is repeated until the item defined sequentially from the major concept conforms to the data item and the item so conforming is selected and used for the retrieval of necessary data.

Another typical conventional data retrieval means permits direct introduction of a pertinent data item to be used for retrieval of necessary data. To be specific, indexes are allocated one each to all the species of data registered in the data processing apparatus. Thus, the data processing apparatus permits retrieval of necessary data by exhibiting all the items and corresponding indexes on the display and consequently enabling the operator to inject the index corresponding to the necessary data through such input means as a keyboard.

Now, the various conventional techniques will be described further in detail as applied to the retrieval of such information as population, area, etc. of the cities in Japan.

For example, the use of the conventional technique in finding the population of Shinjuku Ward, Tokyo will be explained.

(1) In the typical conventional data retrieval means which defines the major concept sequentially until there is conformity with a pertinent data item, when the data processing is started, the names of 47 prefectures (including Metropolis and Hokkaido) are exhibited as items of major headlines on the display. At this point the operator selects from the 47 names Tokyo Metropolis as an item embracing Shinjuku Ward being sought.

Subsequently, on the display, the names of 23 wards, cities, towns, and villages forming Tokyo Metropolis are exhibited as a medial headline. At this point, the operator selects from the displayed names Shinjuku Ward as an item being sought.

Then, the information on population, area, and number of households is exhibited as a minor headline on the display. At this point, the population in the items obtained by the sequential definition of the major concept and exhibited as a minor headline conforms to the population of Shinjuku Ward as the desired data item. By singling out the population from the minor headline mentioned above, therefore, the data on the population of Shinjuku Ward are obtained.

(2) In the other typical conventional data retrieval means which has indexes allocated one each to all the species of data, when the data processing is executed, all the items and corresponding indexes are exhibited on the display and, at the same time, a message announcing that the index corresponding to the pertinent data item should be introduced is exhibited. At this point, the operator is able to get the data on the population of Shinjuku Ward by introducing the index corresponding to the population of Shinjuku Ward. Where the desired item of data happens to be the population of Shibuya Ward, the operator is allowed to take the data on the population of Shibuya Ward by introducing the index corresponding to the population of Shibuya Ward.

The conventional techniques described above, however, have the following problems.

(1) In the conventional data processing apparatus which sequentially define the major concept until there is conformity with the pertient data item, the retrieval of data is invariably started with the display of the item of the most significant concept. Where the number of steps to be taken until the major concept sequentially defined conforms to the pertinent data item is large, the efficiency of the operation of the apparatus is diluted because the time and labor spent for these steps is increased. Moreover, since the items to be selected are exhibited on the display in all steps to be involved, an operator of small experience is readily accustomed to the operation of the apparatus but an operator of large experience finds only a small part to manifest the outcome of his learning. An increase in the accumulation of the operator's experience, therefore, cannot be expected to bring about any improvement in the efficiency of the operation of the apparatus.

(2) In the second typical conventional data processing apparatus mentioned above, since indexes are allocated one each to all the species of data, the retrieval of data compels the operator to introduce the pertinent index corresponding to the particular species of data. The search for the pertinent item in the items exhibited on the display is an irksome task. Where the data are so voluminous as to require the items and indexes to be exhibited as split into a plurality of sections the size of the screen of the display, the operator is compelled to scroll the screen of the display. Thus, there arises the possibility that the necessary data are not obtained very easily.

To overcome the problems mentioned above, the present invention contemplates a data processing apparatus which is characterized by comprising data retrieval table memory means for memorizing titles and indexes in a hierarchical structure therein, n'th rank index input means for the introduction of the n'th rank index, data selection means for reading out of the data retrieval table memory means the (n+1)'th rank data corresponding to the n'th rank index, data existence discrimination means for making a judgment as to the presence or absence of the (n+1)'th rank data in the data retrieval table memory means, and element data reading means for reading pertinent data out of the element data memory means when the absence of the (n+1)'th rank data is confirmed.

As the result, when the n'th rank index is introduced through the index input means, the (n+1)'th rank data are exhibited when the presence of the (n+1)'th rank data in the data retrieval table memory means is confirmed and, to the contrary, the data corresponding to the n'th rank index memorized in the element data memory means are displayed on the display means when the absence of the (n+1)'th rank data mentioned above is confirmed.

The introduction of the n'th rank index, therefore, brings about an operational effect of permitting the start of the retrieval of data from a desired rank.

BRIEF DESCRIPTION OF DRAWING

FIG. 2 is a schematic block diagram of the first preferred embodiment of the invention;

FIG. 3 is a flowchart for representing a first editing method according to the first preferred embodiment of the invention;

FIG. 6 illustrates a data format of one specinformation element among machine sort information;

FIG. 7 illustrates a data format of one data element of service data information among machine sort information;

FIG. 8 indicates a data format of one torque information element among machine sort information;

FIG. 9 illustrates a data format of one image information element which is converted during the editing operation;

FIG. 10 represents only element data in one element data of the service data information shown in FIG. 7;

FIG. 11 represents a file for editing a new book;

FIG. 17 is an illustration for illustrating a data format of one document information element which is converted during the editing operation;

FIG. 18 is an illustration for showing a data format of one page which is edited by the editing machine;

FIG. 19 is an illustration for representing a data format of one page which is converted by the host computer so as to be registered into the layout D/B 11.

FIGS. 20A and 20B are flowcharts for representing a second editing method according to the first preferred embodiment of the invention;

FIG. 22 is a schematic diagram for showing a portion of a table for retrieving document data set in the document D/B 12;

FIG. 25 is a graphic representation for showing relationships of a conversion section, an image section and service data on a CRT;

FIG. 31, consisting of table a through table C, is a model diagram illustrating the condition of data controlled within the data control number, memory means.

FIG. 35 is a flow chart illustrating a procedure of data retrieval according to the present invention.

DESCRIPTION OF THE PREFERRED EMBODIMENT

Figure 1:
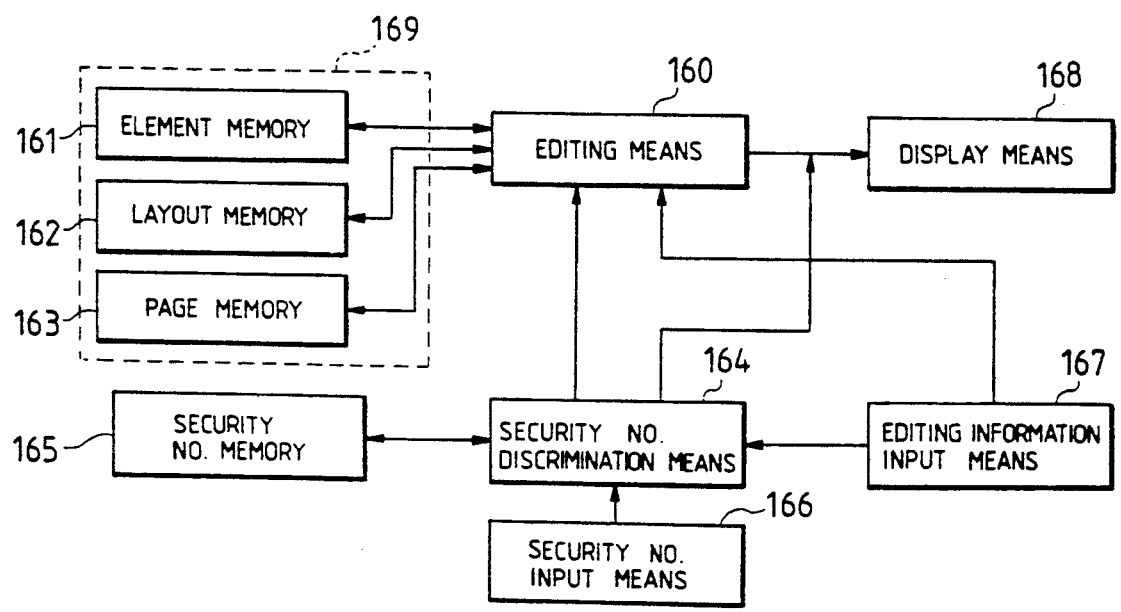
FIG. 1 is a functional block diagram for illustrating a basic arrangement of the first preferred embodiment of this invention.

Now, the present invention will be described in detail below with reference to the accompanying drawings. Preparatory to the detailed description, the general construction and operation of the editing apparatus embodying the present invention will be described.

In FIG. 2 a plurality of editing apparatus (work stations) 3-1 to 3-N for inputting/outputting document, photographs, illustrations and the like are connected in an on-line mode to a system controller 2 for controlling these editing apparatus. These editing apparatus receive various information such as document, photographs and illustrations by way of vector conversion.

A CRT (cathode-ray tube) 6 is connected to the editing apparatus 3-1, a printer 7 is connected to the editing apparatus 3-2, a scanner 8 is connected to the editing apparatus 3-3, and a personal computer 9 and another CRT 10 are connected to the editing apparatus 3-N. Furthermore, keyboards 5-1 to 5-N are connected to the respective editing apparatus 3-1 to 3-N.

The system controller (a medium-scale relay computer) 2 is furthermore connected to a host computer 1.

A book data base (D/B) 21, an element data base 22 and a layout basic data base 23 are connected to the system controller 2.

The system controller 2 controls these editing apparatus 3-1 to 3-N, and transfers/receives the information in a page unit or an element document, photograph, illustration) unit constituting one page to and from the respective editing apparatus.

The host computer 1 is a large-scale general purpose computer such as an, IBM 3090 or equivalent. The system controller 2, personal computers 4-1 to 4-N, layout D/B 11, document D/B 12, image D/B 13 and machine sort information D/B 14 are respectively connected to the host computer 1.

It should be noted that the personal computers 4-1 to 4-N may be exclusively used for the editing apparatus, or for the general purpose other than the editing work, which is similar to personal computers 31-1 to 31-N to be discussed later).

In case the editing apparatus 3-1 to 3-N possess a function capable of inputting a language (referred to as "a specific language") other than the language input by the personal computers 4-1 to 4-N, software for inputting and processing the specific language by the personal computers 4-1 to 4-N is provided with, for instance, the system controller 2.

In addition, another software is provided with the system controller 2, by which the document input by the personal computers 4-1 to 4-N is vector-converted, as is similar to the document input by the respective editing apparatus 3-1 to 3-N.

The personal computers 31-1 to 31-N which are employed to carry out the work other than the editing work effected by the editing apparatus, are connected to the host computer 1. In other words, the machines or parts surrounded by a dot line shown in FIG. 2 do not constitute the editing apparatus of this invention.

The host computer 1 constitutes the data of one book from the information which have been stored in the data bases 11 to 14, and transfers this data to the system controller 2. The system controller 2 transfers the information of one page which has been edited in the editing apparatus to the host computer 1.

An operation of the data processing apparatus according to a preferred embodiment of the invention will now be described.

Basically, the editing apparatus employing the constructions as illustrated in FIG. 2 can produce, or edit a new book by way of two editing methods as follows.

(A) When a new book is newly produced, all of documents or sentences, illustrations, and photographs etc. to be written on each page of the new book must be newly input.

This will be referred as "a first editing method".

(B) When a new book is produced by utilizing other books which have previously been edited or produced in the editing apparatus, the necessary portions of other books are utilized for the new book and only the minimum portions required to produce the new book are newly input. This will be referred to as "a second editing method".

Referring now to FIGS. 3 to 19, a description is made of how a service manual (simply referred to as "a book" hereinafter) for a bike (auto-bicycle) is produced in accordance with the above-defined first editing method.

FIG. 3 is a flowchart for indicating the first editing method according to the preferred embodiment of the invention.

In FIG. 3, first as a step S1, a basic layout code is input into the editing apparatus to which CRT is connected (for instance, the editing apparatus 3-1) by the keyboard 5-1. The basic layout code is to set a size of a book to be newly produced, namely, a size, the number of character, a column number and a column space in one page of the new book.

Figure 4:
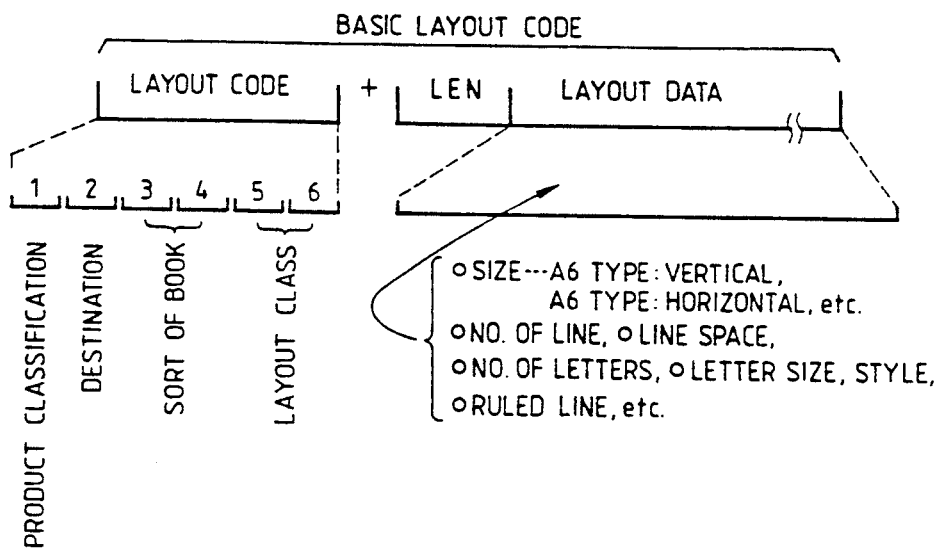
FIG. 4 illustrates a format of the basic layout code.

FIG. 4 illustrates one example of the format of the basic layout code.

The basic layout code is constructed of a layout code having, for example, a 6-byte code length, layout data, and another data representing the data length of the layout data.

It should be noted that the data representing a data length of certain data is simply referred to as a "LEN" in the following description.

The layout code is constructed of the data for representing which product classification a book to be produced belongs to; the data for indicating which location (country) the new book is designated; the data representative of the sort of the new book, e.g., service manual, or shop manual; and the data representative of the layout of each page of the new book, e.g., a single frame or a double frame.

The layout data is constructed of the data representing a size of each page of the book, i.e., A6 vertical, A6 horizontal and so on; and the data indicative of a line number, a line space, the number of character, a point, style, presence of a ruled line.

The data concerning a concrete layout of a page on a screen of CRT is set in the layout data, and the layout code is merely an identification code of the layout data. The layout code is converted into a document identification number and a page number which correspond to the indentification data of the new book, as will be described later in connection with the steps S29 and S30.

When entry of the layout data is accomplished, LEN of the layout data is added in front of the layout data.

As previously described in detail, the basic layout code is produced from the layout code, LEN of layout data, and layout data.

Referring back to FIG. 3, when the basic layout code is generated, as illustrated in a step S2, the editing apparatus 3-1 transfers the basic layout code to the system controller 2 which registers the basic layout code in the layout basic D/B 23.

Upon completion of registering the basic layout code, in the next steps S3 to S24, entry of such information of illustrations, photographs, document and the like which are to be arranged in each page of the book is carried out. It should be noted that both illustrations and photographs are referred to as an image in the following description.

In the step S3, a judgement is made whether or not the information to be input corresponds to the image. When the image is entered, as indicated in the step S4, a temporary key having, for instance, a 6-byte length is entered in the editing apparatus 3-3 by the keyboard 5-3. The temporary key corresponds to an identification code of image data to be entered which is determined by an operator by himself. "D" indicating that this temporary key relates to the image data is entered into the head byte of the temporary key.

In the next step S5, the image is read out by the scanner 8.

In a step S23, the temporary key, LEN of the readout image data, and the image data are registered into the element D/B 22 as one element data.

If a judgement is made in the previous step S3 that no image is entered, another judgement is made in a step S6 whether or not a document or sentence is entered. When the document (sentence) is entered, as indicated in a step S7, the temporary key is input in the editing apparatus 3-1 by the keyboard 5-1 or in any of the personal computers 4-1 to 4-N. As previously explained in the step S4, the temporary key is constructed of, for instance, a 6-byte length, and corresponds to an identification code of the document to be input which is determined by the operator himself. In this case, "T" indicating that the temporary key relates to the document key is input into the head byte of the temporary key.

In the subsequent step S8, the document or sentence is entered in the keyboard 5-1 or any one of personal computers 4-1 to 4-N.

Then, in the step S23, the temporary key entered in the previous step S7, LEN of the document entered in the step S8, and this document are registered as one element data in the element D/B 22.

Figure 5:
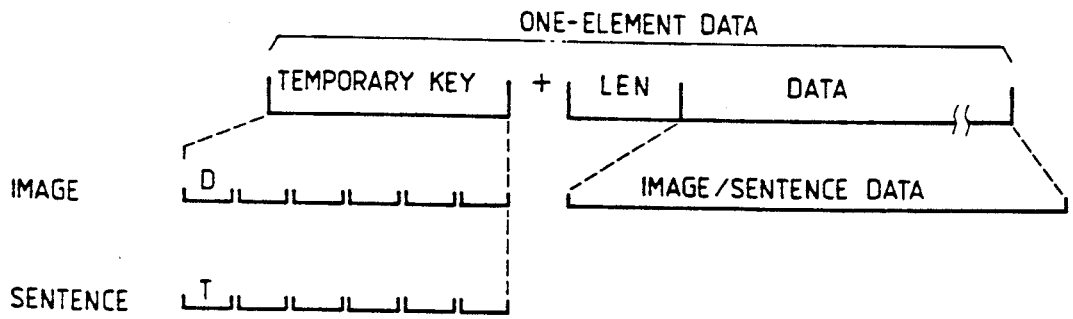
FIG. 5 represents a data format of one data element when image data or document data is newly entered.

In FIG. 5, there is shown one element data registered in the step S23.

In the step S6, if a judgement is made that no document is entered, it is decided that said input is related to the machine sort information.

The machine sort information includes the data on the repairing data, tools to be used and the like for a bike. In accordance with the preferred embodiment of this embodiment, the machine sort information includes the specification, service data and torque, which will be described in detail hereinafter.

(A) Specification is, for instance, the repairing data on the bike, and the data representative of the repairing items and details which are entered into a list indicating the data of the tool to be used, and is constructed of alphanumerical data and KANJI characters. In other words, this specification represents a type of an engine oil, a name of a tool to be used, and repairing items such as an inner diameter of a cylinder, an outer diameter of a piston, and the like.

(B) Service data is numerical data representative of, for instance, maintenance data which is entered into a list of the maintenance data, and constructed of three different data, i.e., a maximum value, a minimum value, and a limit value of usage (or a center value).

That is, as the maintenance data relating to the inner diameter of the cylinder, there are the typical maximum value and minimum value, and the usable maximum value. Also, as the maintenance data concerning the outer diameter of the piston, there are the typical maximum value and minimum value, and the usable minimum value. As to the data of a capacity of an engine oil tank, a capacity of a coolant and the like which has no discrimination in the maximum and minimum values, the same values as these maximum and minimum values are input, by which these data are registered.

(C) Torque is numerical data indicative of fasten torque of fastening screws for the bike (maximum value, minimum value, and center value), a diameter of a screw, the number of the required screws. That is to say, the torque information is constructed of five pieces of numeral data containing the maximum value, minimum value, center value (or the limit value for usage) and other two informations.

When the judgement is made that the input data corresponds to the machine sort information, the machine sort code is entered which represents that the machine sort information to be input is related to which sort of the bike, as indicated in the step S9, by utilizing any one of the personal computers 4-1 to 4-N (e.g., personal computer 4-1) connected to the host computer 1. This machine sort code is constructed of, for instance, 8 bytes, and "K" for representing that the machine sort code is related to the machine sort information is input into the head byte of the machine sort code.

In a step S10, a judgement is made whether or not the machine sort information to be input is the specification.

If a judgement is affirmative in the step S10, then, an information identification code having, for instant, a 4-byte length is input in a step S11. At this time, "A" for indicating that the information identification code is related to the specification is input at the head byte of the identification code.

In a next step S12, an item having, for example, a 3-byte length is entered.

In a subsequent step S13, an image classification or sort having, for instance, a 2-byte length is input. Data representing a language sort of the specification information (for example, the language is Japanese, or English) is entered into this image classification.

In a step S21, specification information is entered by the personal computer 4-1.

In a subsequent step S22, the machine sort code, information identification code, item and image classification which have been input by the previous steps S9, S11, S12, and S13, the data status (which is automatically set in the host computer 1) for indicating the history of the specification information entered in the step S21, and the specification information are registered as one element data in the machine sort D/B 14 by means of the host computer 1.

A data format of the one element data is illustrated in FIG. 6. As is shown in FIG. 6, the data consisting of the machine sort code, information identification code, item, image classification, and data status will be referred to as an element data key in the following description.

If no specification is input in the previous step S10, another judgement is made whether or not the service data is entered in a step S14.

If the service data is entered, the information identification code is input in a step S15, which is similarly done in the preceding step S11. In this case, "B" is input into the head byte of this code.

In the next step S16, the item is input, which is similarly executed in the previous step S12.

In the subsequent step S17, the image section is entered. The function of the image classification information entered at entry of the service data will be discussed later with reference to a step S42.

In the step 21, the service data information is input by means of the personal computer 4-1.

The service data information is constructed of three different data, i.e., the maximum value, minimum value and a limit value of usage (or a central value). When these three data are input in a specific unit in the editing apparatus according to the preferred embodiment, these data are stored and also converted into other units to be stored thereafter.

FIG. 7 illustrates a format of 1-element data (element data key and service data) which is registered in the machine sort information D/B 14 in the step S22.

As illustrated in FIG. 7, the service data is so constructed as to be set in a first data section through a third data section. In the step S21, when the three data are input in the preselected specific unit (for example "mm"), these data are set in the first data section. Although it is not shown in FIGS. 3 and 7, just before entry of the service data information, a conversion classification (for example, 2-byte length data) for indicating what other units the three data set in the first data section should be converted into, with the result that the three data entered in millimeter units into the first data section are converted into other units (e.g., an inch unit) which are designated by the conversion classification, and thereafter stored in the second data section.

Then the three data in millimeter units stored in the first data section are converted a still other unit designated by the conversion classification and the resultant converted data are transferred to the third data section.

Referring to FIG. 10, the above-mentioned conditions will now be described more in detail. FIG. 10 illustrates only the service data (element data) among the data shown in FIG. 7.

When the information on the inner diameter of the cylinder of the bike is entered as the service data, the minimum value of 56.003, the maximum value of 56.018, and the limit value of usage of 56.08 (illustrated in FIG. 10 as the service limit) are input in the millimeter unit. These numerical data are set in the first data section.

If the conversion classification set before entry of the service data is designated to convert the millimeter unit into the inch unit, each of the data set in the first data section is converted into 2.2048; 2.2054; and 2.207 inches, respectively and the converted data are set in the second data section.

Also in the third data section, each of the data set in the first data section is converted a still other unit in accordance with the designation of the conversion classification.

In other words, the function of the conversion classification is to automatically convert the service data into certain units other than the originally input unit when the service data is entered in the certain specific unit, and thereafter to set these converted data into the second and third data sections.

Next, in the step S22 as shown in FIG. 7, the machine sort code, information identification code, item and image classification which have been entered in the previous steps S9, S15, S16 and S17, the data status (which is automatically fixed in the host computer 1) for representing a history of the service data information entered in the step S21, and the service data information consisting of the first to third data sections are registered as the 1-element data in the machine sort information D/B 14 under the control of the host computer 1.

Then, if no service data is entered the judgement of the step S14 is negative and shows that the torque information is entered.

When the entry of the torque information is judged, the information identification code is entered in the step S18, which is similarly executed in the preceding steps S11 and S15. At this time, "C" is input in the head byte of the information identification code.

In the subsequent step S19, the item is input, which is similarly performed in the steps S12 and S16.

In the step S20, the image classification is entered. The function of the image classification which is entered during entry of the torgue information is similar to a function of an image classification which will be described later relating to a step S42.

In the next step S21, the torque information is input into the personal computer 4-1.

The torque information is constructed of five pieces of data containing the maximum value, minimum value, and center value (or a limit value of usage), and also two pieces of data representative of other information. In the editing apparatus, when these five pieces of data are input in the specific unit similar to the above-mentioned entry method of the service data, these data are stored, and at least three pieces of data other than two pieces of data to represent the other information are firstly converted into other units and secondly stored.

FIG. 8 illustrates a format of 1-element data (element data key and torque) which is registered in the machine sort information D/B 14 in the step S22.

As illustrated in FIG. 8, the torque data is so arranged as to be set in the first to third data sections. In the step S21, when the torque data is entered in some particular unit (for example, "kg"), this torque data is set in the first data section. Although not shown in FIGS. 3 and 8, the conversion classification is input, just before entry of the torque information, so as to instruct that five pieces of data set in the first data section should be converted into a certain different unit. As a result, at least three pieces of data input in the "kg" unit into the first data section (i.e., three pieces of data other than two pieces of data representative of the other information among five pieces of data to indicate the torque information) are converted into a different unit (e.g., "lb" unit) designated by the conversion classification except the "kg" unit. Then, the converted data is set in the second data section.

In addition, at least three pieces of data entered into the first data section in the "kg" unit are converted into a still other unit which are designated by the conversion classification, and thereafter the converted data are set in the third data section.

In other words, the conversion classification is to automatically convert torque data into the units other than the above-described unit when the torque data is input in the certain specific unit, and also to set these converted data into the second and third data sections, in a manner similar to the case of the service data.

Since the data concerning the diameter and the number are not required to be converted by units, no unit conversion is needed for these two pieces of data. It may be possible, of course, to perform a similar unit conversion on these two data as in the other three data. In this case, however, it is necessary to prohibit from using the converted two data.

In the 1-element data as illustrated in FIGS. 6 to 8, a byte length of the respective element data key is identical to each other.

In the step S22, as shown in FIG. 8, the machine sort code, information code, item and image classification which have been input in the steps S9, S18, S19 and S20, the data status (which is automatically set in the host computer 1) representative of the history of the torque data which has been input in the step S21, and the torque data information consisting of the first to third data sections are registered as 1-element data by the host computer 1 into the machine sort information D/B 14.

In the steps S22 or S23, when entry of one-image, one-document, or one piece of the machine sort information (these are referred to as "element data" hereinafter) is accomplished, a judgement is made whether or not the entry of the element data is continued in the next step S24. If the entry of the element data is continued, the control process is returned to the previous step S3. If the entry of the element data is not continued, the editing work of the book is commenced from a step S25. The editing work is performed by one page unit.

In the step S25, a new book file is read out from the host computer 1 by any one of the personal computers 4-1 to 4-N connected to the host computer 1.

FIG. 11 illustrates an arrangement of the new book producing file. As shown in FIG. 11, the new book producing file is constructed of material supervision or ID number information, staff-in-charge information, and starting page information.

The material supervision number is a title of a book to be newly produced or the supervising number. The staff-in-charge information is the data representative of a staff person who is qualified to produce the new book. The starting page information indicates what page the book to be produced is commenced from. In other words, the page information indicates the first page of the new book for the starting page. For instance, the second page corresponds to the starting page of a book distributed in Japan, whereas the eleventh page corresponds to the starting page of a book distributed in U.S.A.

The staff-in-charge information is able to be applied to the security supervision of a newly edited book, for example. That is to say, the information relating to a staff person who is permitted to produce a new book is previously registered in the host computer 1, and the new book can be edited by a particular staff person only when he has been registered in the new book producing file in the host computer 1. Under this security supervision, it can prevent that the book which is not allowed to be edited is mistakenly edited or the previously edited book is unnecessarily and mistakenly revised by the editing apparatus.

In this case, the staff-in-charge information may be preferably encrypted or stored in a magnetic card.

When the new book producing file is read out, predetermined data is input into this file at a step S26. When the predetermined data is entered, as shown in a step S27, the new book producing file is transferred from the host computer 1 to the system controller 2 and then registered in the book D/B 21.

In the next step S28, the layout code (see FIG. 4) is entered by the keyboard 5-1, so that the basic layout code previously registered in the layout basic D/B 23 is called up to CRT 6.

When the basic layout code is called up in the editing apparatus, both the document supervision number and the page number to be edited are input. The document supervision number is a title or the supervision or ID number of the new book, which is similar to the document supervision number of the new book producing file shown in FIG. 11.

Figure 12:
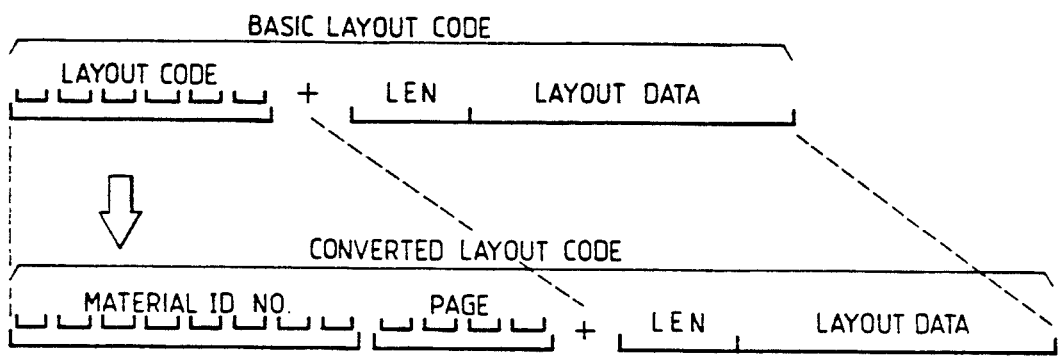
FIG. 12 illustrates how the converted layout code is produced from the basic layout code.

After the document supervision number and the page number to be edited are input in a step S29, the editing apparatus 3-1 converts the layout code among the basic layout code read in the step S28 into the document supervision number and the page number which have been input in the step S29, as illustrated in a step S30 and FIG. 12.

Upon completion of the code conversion, the editing apparatus 3-1 stores the document supervision number, the number of page, LEN and layout data in the editing apparatus 3-1 in a step S31. These document supervision number the number of page, LEN and layout data will be referred as "a converted layout code" in the following description.

Figure 13:
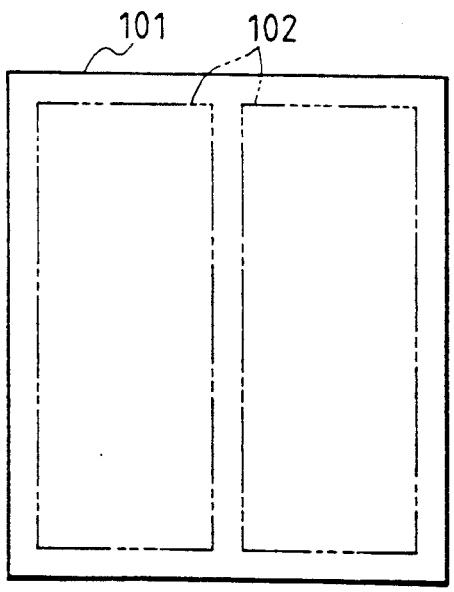
FIG. 13 is an illustration of one example of a display screen of the basic layout.

In a step S32, the basic layout is displayed on CRT 6 by employing the converted layout code. As illustrated in FIG. 13, the basic layout is basically constructed of a contour 101 of a page to be edited and a document entry region 102. The basic layout shown in FIG. 13 is a double frame.

In a subsequent step S33, a judgement is made whether or not the image is displayed on CRT 6.

To display the image, the temporary key (see FIG. 5) is entered by the keyboard 5-1 in a step S34 so as to call up one element data, i.e., temporary key, LEN of the image data to be called up, and the image data from the element D/B 22, and display the image data called up on CRT 6.

In a step S35, by a mouse (not shown) connected to the keyboard 5-1, the image displayed on CRT 6 is moved to a desirable position on the basic layout.

Figure 14:
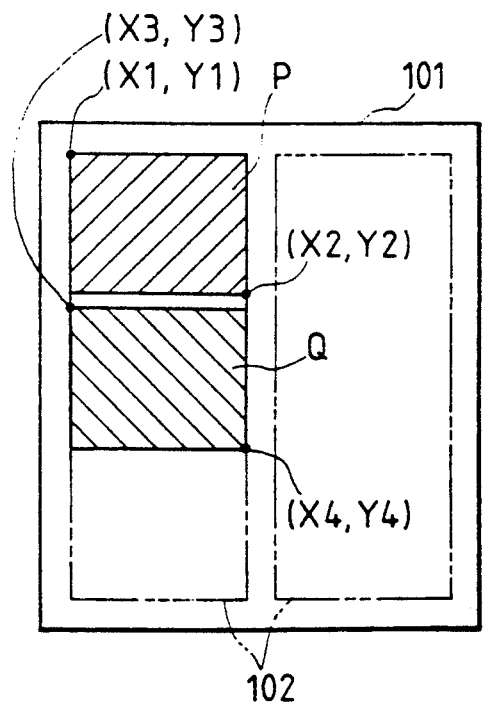
FIG. 14 is an illustration of one example of a display screen during the editing operation.

FIG. 14 illustrates an image of the screen of CRT 6 at that moment, which is similar to the illustration of FIG. 13. As shown in FIG. 14, when the image is moved to the region denoted by "P", the upper left coordinates and lower right coordinates of the image are (X1, Y1) and (X2, Y2), respectively.

When the image is transferred in this way, the upper left coordinates (X1, Y1) and lower right coordinates (X2, Y2) on the basic layout are entered into the editing apparatus 3-1.

It should be noted that while the image is moved, the size of the image may be enlarged or reduced in accordance with the capability of editing apparatus. Only the image can be moved over the document input region 102.

Figure 15:
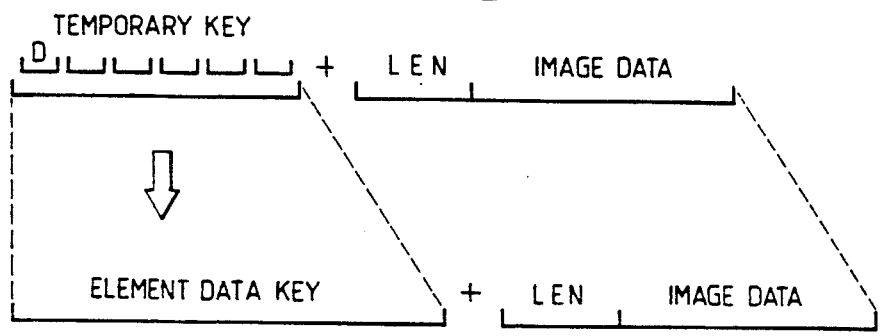
FIG. 15 is an illustration for illustrating how a temporary key of one element data of newly input image information is converted into an element data key.

In a step S36, as illustrated in FIG. 15, the temporary key among the 1-element data consisting of the temporary key, LEN of image data to be called up, and image data is converted into the element data key.

As illustrated in FIG. 9, the element data key is constructed of the machine sort code, information identification code, item, image classification, and also data status (which is automatically input in the host computer 1) representative of a history of image data, which is similar to the machine sort information including the specification information, service data information, and torque information.

The conversion operation of the temporary key into the element data key in the step S36, is practically performed when an editor has entered the element data key excepting for the data status. "D" is input in the head byte of the information identification code. A byte length of the element data key shown in FIG. 9 is identical to the respective byte lengths shown in FIGS. 6 to 8.

In a step S37, both the 1-element data consisting of the element data key, LEN of the image data corresponding to the element data key and the image data, and the coordinates (X1, Y1), (X2, Y2) are registered in the editing apparatus 3-1.

In a step S45, another judgement is made whether or not the editing of one page is accomplished. If not yet accomplished, then the control process is returned to the step S33.

If it is judged in the step S33, that the image is not displayed on CRT 6, another judgement is made whether or not the document or sentence is displayed in a step S38.

When the document or sentence is displayed, in a step S39, the temporary key (see FIG. 5) is entered by the keyboard 5-1, and the one element data consisting of the temporary key, LEN of the document data to be called up, and the document data themselves is called up from the element D/B 22, and the document data are displayed on CRT 6.

By employing the mouse (not shown) connected to the keyboard 5-1, the document displayed on CRT 6 is moved to the desired position on the basic layout in a step S40.

When the document is moved to the position indicated by the symbol "Q" on the basic layout shown in FIG. 14, the upper left coordinates and the lower right coordinates of the document are (X3, Y3) and (X4, Y4), respectively.

After the document has been moved, both the upper left coordinates (X3, Y3) and the lower right coordinates (X4, Y4) of the document on the basic layout are input into the editing apparatus 3-1 (S40).

Figure 16:
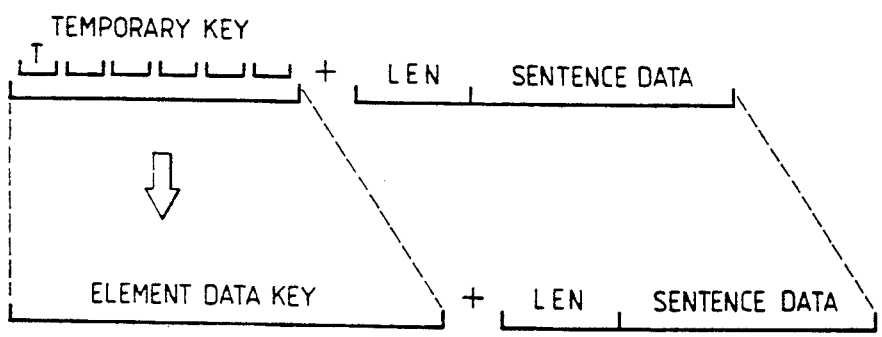
FIG. 16 is an illustration for illustrating how a temporary key of one element data of newly entered document information is converted into an element data key.

In a step S41, as illustrated in FIG. 16, the temporary key in the 1-element data consisting of the temporary key, LEN of the called up document, and document data is converted into the element key data. Formats of these element data key, LEN of the called up document data and document data are illustrated in FIG. 17.

As shown in FIG. 17, the element data key corresponding to the document data is constructed of the sentence supervision number having a length of, for instance, 8 bytes; the detailed item code having a length of, for example, 6 bytes; the language information having a length of, for example, 2 bytes; and the data status (which is automatically added by the host computer 1) indicative of a history of the sentence or document data.

The sentence supervision number is the data to specify each document, and in the head byte of which "B" is input. The language information indicates what language the document data has been produced in, for example, Japanese or English. The detailed item code is a classification code of the document or sentence.

It should be noted that after the data status of the 1-element data shown in FIG. 17, an appropriate number of blanks are added to make the byte length of the element data key equal to that of the respective element data keys as shown in FIGS. 6 to 9. In other words, each byte length of the element data keys corresponding to the document data, image data and machine sort information data is set to be identical with each other.

With employing the detailed item code, the editing apparatus can retrieve the document or sentence. This document retrieval operation will be discussed later in a step S114.

In a step S37, the element data key, LEN of the document data corresponding to the element data key, and document data are registered as the 1-element data together with the coordinates (X3, Y3), (X4, Y4) into the editing apparatus 3-1.

In a step S38, if a judgement is made that no document is displayed on CRT 6, it can be recognized that the machine sort information is to be displayed.

In a step S42, the element data key of the machine sort information to be called up (see FIGS. 6 through 8) is input by the keyboard 5-1, whereby the machine sort information having 1-element data, i.e., element data key, specification information, service data information or torque information is called up from the machine sort information D/B 14 to the editing apparatus 3-1, and then the specification information, service data information or torque information is displayed on CRT 6.

In the preferred embodiment, the element data key is entered by the keyboard 5-1, and the machine sort information is directly called up via the host computer 1 and system controller 2 from the machine sort information D/B 14 to the editing apparatus 3-1. However, alternatively, employing any one of the personal computers 4-1 to 4-N, the machine sort information may be called up from the machine sort information D/B 14 to be temporarily registered into the element D/B 22. Thereafter, the element data key may be input by the keyboard 5-1, and the machine sort information may be called up via the system controller 2 from the element D/B 22 to the editing apparatus 3-1.

It should be noted that display conditions or modes of the service data information and torque information among the machine sort information data are determined in accordance with the image classification information in the element data key and the conversion classification (not shown) described with reference to the step S21.

As to the service data, for instance, as illustrated in FIG. 10, when the data set in the first data section is automatically converted to be set within the second and third data sections in accordance with the conversion classification information previously set, the service data is displayed on CRT 6 in the illustration format of FIG. 25 in accordance with the conversion classification and image classification information.

FIG. 25 is a table for representing one example of a relationship between the conversion classification, image classification and service data, which is displayed on the CRT.

In FIG. 25, if the conversion classification is "10" and the image classification is "10", only the data set in the first data section (see FIG. 10) is displayed on CRT 6 in the millimeter unit.

If the conversion classification is "10" and image classification is "20", the data set in the first data section is displayed in the millimeter unit, and subsequently, the data set in the second data unit is displayed within a parenthesis in the inch unit.

If the conversion classification is "20" and image classification is "10", only the data set in the second data is displayed in the inch unit.

When the conversion classification is "20" and image classification is "20", the data set in the second data is displayed in the inch unit, and subsequently, the data set in the first data unit is displayed within a parenthesis in the millimeter unit.

When the conversion classification is "40", the same data and unit display as in the conversion classification being "10" is performed, and its decimal point is not a period, but a comma.

As is similar to the steps S35 and S40, the data on the machine information is positioned on the basic layout and the coordinates thereof is input in a step S43.

In a subsequent step S44, the element data key and its coordinates information selected from the 1-element data, as illustrated in FIGS. 6 to 8, are registered into the editing apparatus 3-1.

Not only the element data key, but also the respective element data together with the coordinates information thereof may be of course registered.

When a judgement is made that the editing work for one page is accomplished in the step S45, the format of one page data is converted into another format shown in FIG. 18 in a step S46. This conversion is executed in the editing apparatus for performing the editing work (the editing apparatus 3-1 in this case).

FIG. 18 illustrates a format of the data having one page information converted in the editing apparatus. In FIG. 18, the one page data converted in the editing apparatus is constructed of the following data:

(A) The converted layout data which has been converted in the step S30 (see FIG. 12)

(B) The coordinates entered in the previous steps S35, S40 or S43, and the element data key of the 1-element data arranged in the region designated by said coordinates. When a plurality of element data (image data, document data, or machine sort information data) are arranged within one page, plural sets of the coordinates and element data key should be storaged for one page.

The coordinates and element data key are set subsequent to the converted layout data. A set of coordinates and element data key will be referred to as "a layout for the editing work" in the following description.

(C) The element data key of the element data arranged within one page, LEN of the element data, and the element data. When a plurality of element data are inserted in one page, plural sets of the element data key, LEN, and element data should be arranged for one page.

In other words, the number of the 1-element data constituted of the element data key, LEN and element data is the same as that of a pair of the coordinates and element data key contained in the layout for the editing work.

Subsequent to the layout for the editing work, the element data key, LEN and element data are set.

When the element data is the machine sort information, as apparent from FIGS. 6 to 8, since no LEN is present in front of the element data, of course, only the element data key and element data are set.

These data arranged behind the layout for the editing work will be referred to an element data group in the following description (see FIG. 18).

Although not shown in FIG. 18, an end code for indicating that one page data is completed is added at the end of the final element data.

When one page data is converted as illustrated in FIG. 18, the resultant converted one page data is registered via the system controller 2 in the book D/B 21 in the step S47.

In the next step S48, one page data which has been converted in the previous step S46 is transferred to the host computer 1.

In a step S49, the above-described one page data is duplicated and the format thereof is converted into that illustrated in FIG. 19 in the host computer 1. FIG. 19 illustrates one page layout information which is converted in the host computer 1 so as to be registered in the layout D/B 11.

The one page data transferred to the host computer 1 is distributed and stored in the respective D/B (i.e., layout D/B 11, document D/B 12, image D/B 13 and machine sort information D/B 14) connected to the host computer 1. The data conversion executed in the step S49 is performed so as to store in the layout D/B 11, only the information relating to the layout among the one page data.

As is obvious from the comparison between FIGS. 18 and 19, in the step S49, both LEN and the element data have been removed from the element data group of the 1-page data which is set subsequent to the layout for the editing work.

In a next step S50, the data converted in the previous step S49 is registered in the D/B 11.

In a step S51, the element data group is copied by employing the 1-page data which has been transferred to the host computer 1 in the previous step S48.

In a step S52, the data relating to the document data among the element data group is registered in the document D/B 12.

In a step S53, the data relating to the image data among the element data group is registered in the image D/B 13.

In a subsequent step S54, a judgement is made whether or not the edited 1-page data is to be printed out. If no printing operation is to be carried out, the control process is advanced to a step S57. If the printing operation should be performed, the control process is advanced to a step S55.

In a step S55, both the reference supervision No. and page are entered by using of the keyboard 5-2, so that the 1-page data registered in the book D/B 21 is called up into the editing apparatus 3-2.

In a step S56, the 1-page data is printed out by the printer 7.

In a step S57, a judgement is made whether or not the next page is produced. When the next page is produced, the control process is returned to the step S28. Conversely if the next page is not produced, the control process is accomplished.

In accordance with above-mentioned process (first editing method), a new book is newly produced or edited.

Referring now to FIGS. 20 to 24, as is similar to the description on the first editing method, a description will be made of the second editing method applied to produce a service manual of a bike or the like.

Figure 20B:
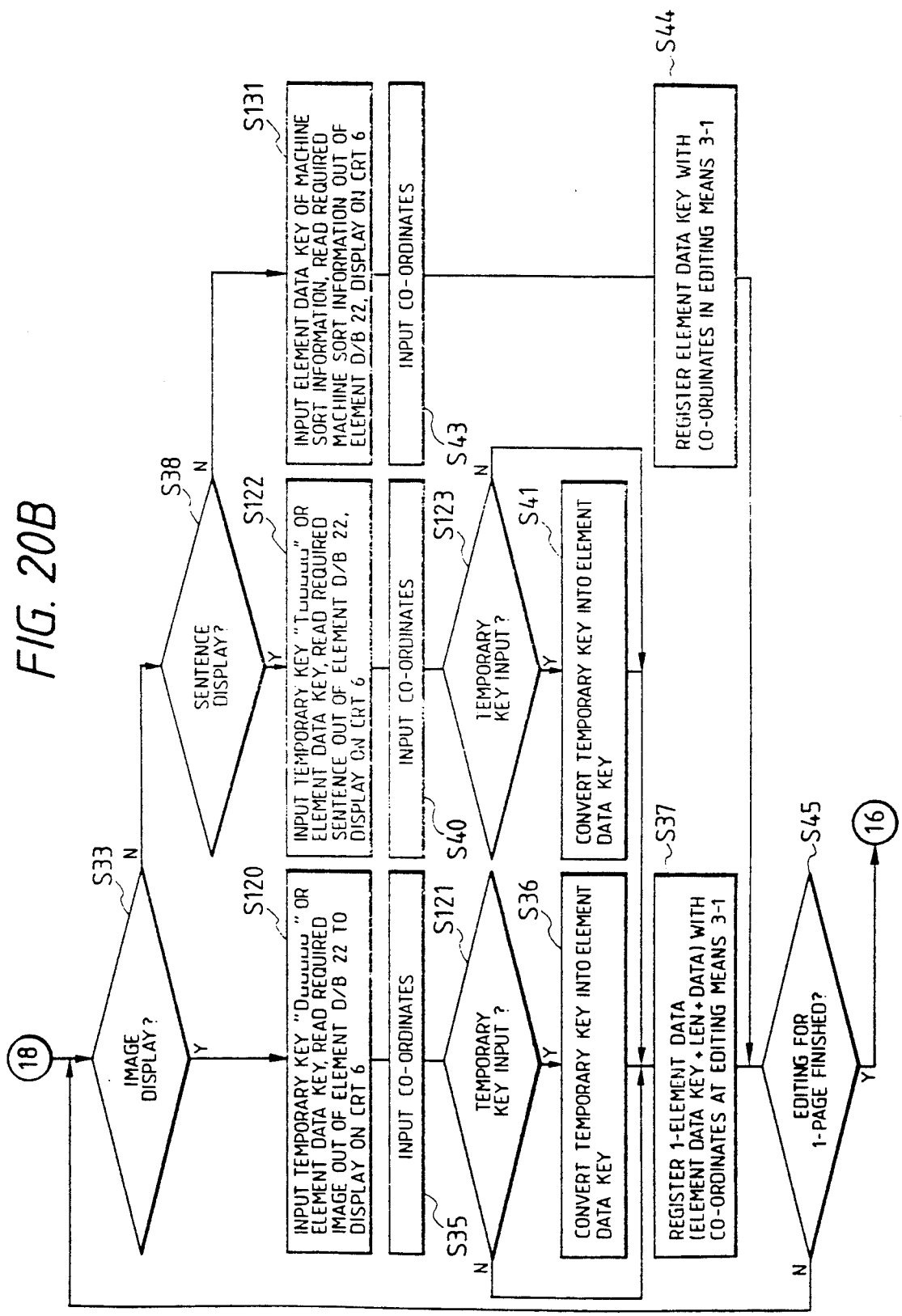

FIG. 20 is a flowchart illustrating the second editing method according to a preferred embodiment of the invention.

In the respective steps shown in FIG. 20, the same reference numerals as those in FIG. 3 indicate the same or similar processing operations.

According to the second editing method, in a step S25, a new book producing file is first called up which has been registered in the host computer 1, by employing any one of the personal computers 4-1 to 4-N (for instance, the personal computer 4-1) connected to the host computer 1. Since the arrangement of this new book producing file is identical to that shown in FIG. 11, the description thereof is omitted.

After the new book producing file is called up, predetermined data, i.e., the material supervision No. information, staff-in-charge information and starting page information are entered into the new book producing file in a step S26.

Next, as illustrated in a step S27, the new book producing file is transferred by the host computer 1 to the system controller 2 and registered in the book D/B 21.

In a step S101, referring to a book which has been produced in the editing apparatus (referred to as "an original book"), a selection is made of the pages of this original book that are utilized to produce a new book. That is to say, the following page selection is carried out, as one example. The 21st to 30th pages of the first original book are available to produce the 1st to 10th pages of the new book, the 46th to 50th pages of the second original book are utilized to produce the subsequent 11th to 15th pages of the new book, and furthermore, the 31st to 40th pages of the first original book are usable to produce the succeeding 16th to 25th pages thereof.

Such a process is performed while an operator actually observes the original book pages.

In a next step S102, the material supervision No. and the page number of the original book are input by way of the personal computer 4-1, and 1-page data (see FIG. 19) is copied in the host computer 1 from the layout D/B 11.

In a step S103, a new material supervision No. and a new page number of a book to be newly edited are input into the personal computer 4-1.

In a step S104, both the document supervision No. and the page number in the 1-page data copied in the previous step S102 are rewritten by the new material supervision No. and page number of the new book input in the previous step S103.

Figure 21:
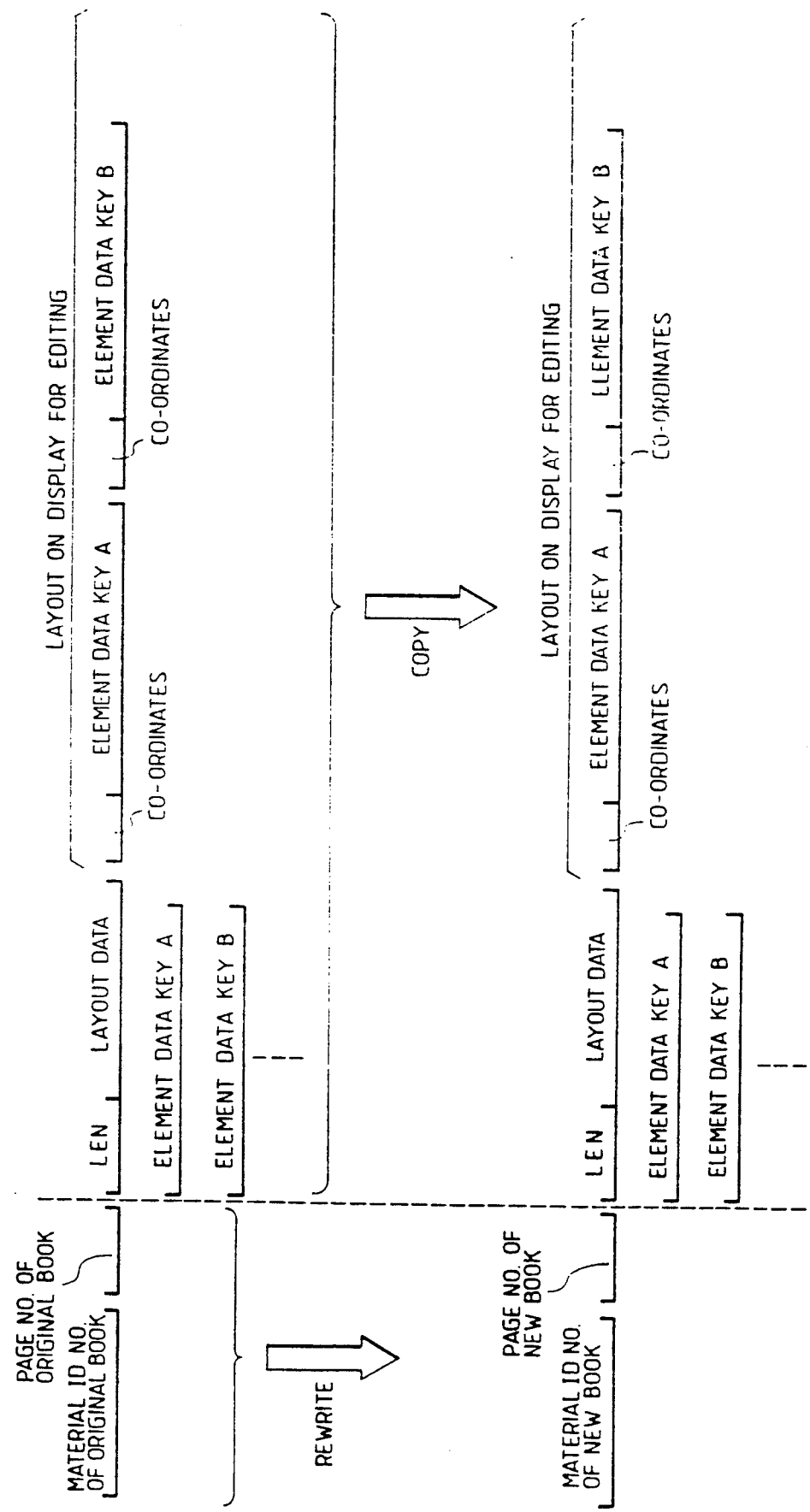
FIG. 21 is an illustration for explaining how the data rewriting at the step S104 of FIG. 20 is performed.

FIG. 21 illustrates the data rewriting operation executed in the step S104.

The 1-page data of the original book which has been called up and copied in the step S102 is as shown in the upper portion of FIG. 21. In the step S104, as illustrated in the lower portion of FIG. 21, only the material supervision No. and page number among the above-described data are rewritten by those of the new book.

In the step S105, the 1-page data produced in such a way is stored in the host computer 1.

In a step S106, a judgement is made whether or not the rewriting operation of the material supervision No. and the page number is accomplished for the new book. In accordance with the previous example, a judgement is made whether or not all of the 21st to 30th pages of the first original book, the 46th to 50th pages of the second original book, and the 31st to 40th pages of the first original book have been converted into the 1st to 25th pages of the new book.

If one book is not yet rewritten, the control process is returned to a step S102. To the contrary, if the rewriting operation is accomplished, the control process is advanced to a step S107.

In the step S107, the element data or both LEN of the element data and element data corresponding to the element data key, among the 1-page data converted in the step S104 are called up from the respective D/B 12 to 14. These data are added after the respective element data keys of the 1-page data which are arranged in the rear of the layout for the editing work. That is to say, the 1-page data converted in the step S104 is rearranged in a complete form as shown in FIG. 18.

In a step S108, a judgement is made whether or not all pages of the new book have been rearranged in a complete form. If all pages of the new complete book are not yet rearranged, the control process is returned to step S107. If all pages are converted, the control process is advanced to a step S109.

In the step S109, the data of the new complete book is transferred from the host computer 1 to the system controller 2.

In a step S110, all pages of one complete book are registered in the book D/B 21 by the system controller 2.

In a subsequent step S111, the new material supervision No. and page number of the new book are entered by the key-board 5-1 into the editing 3-1.

In a step S112, the input page data of the new book is read out from the book D/B 21 to be registered in the editing apparatus 3-1.

Then, in a next step S113, the page called up from the book D/B 21 is displayed on CRT 6.

In a step S130, a judgement is carried out whether or not the editing operation of the 1-page data displayed on CRT 6 is executed. That is to say, a judgement is made whether or not the pages which have been copied from the original book for the new book in the steps S102 to S104 can be utilized without any further editing. If no editing work is required, the control process is advanced to a step S46. If editing work is required, the control process is advanced to a step S114.

In the step S114, a retrieval operation by any one of the personal computers 4-1 to 4-N is performed to determine whether or not elements of the original book (including the original book selected in the previous step S101) can be utilized for editing the page of the new book displayed on CRT 6. The retrieval method will be discussed later with reference to FIGS. 22 to 24.

In a step S115, a judgement is made whether or not an element usable in the new book editing operation is found in the above-described retrieval operation.

If some relevant elements are found, the element data key of the retrieved relevant elements are input in the personal computer (for example, 4-1) in a step S116.

In a step S117, the 1-element data called up by the above retrieval operation is transferred to the system controller 2, and is registered in the element D/B 22 under the control of the system controller.

In a step S118, a judgement is made whether or not the retrieval operation should be continued. If yes, then the control step is returned to the step S114.

If the element usable for editing the new book is not found in the step S115, the 1-element data retrieved in the step S114 is cleared in a step S132. It is, of course, not appropriate to clear the data stored in the D/B 12 to 14 at this stage.

In the step S119, a judgement is made whether or not the image data, document data or machine information data, namely the element, is newly input. If the element is not newly input, the control step is returned to the step S118.

When the element is newly input, the control process is advanced to the step S3. Since the processes effected in the steps S3 to S23 are same as those denoted by the same reference numerals in FIG. 3, the descriptions thereof are omitted.

If the control process defined by the step S22 or S23 is completed, the control step is returned to the step S119.

In the step S118, if the retrieval operation is not continued, another judgement is made whether or not the image is displayed on CRT 6 in the step S33. If the image is displayed, the temporary key or element data key of the image to be displayed is input by the key-board 5-1 in the step S120, and the predetermined image is read out from the element D/B 22 and then displayed on CRT 6.

In the next step S35, the image is moved to the desired position and the coordinates thereof are input.

In the step S121, a judgement is made whether or not the temporary key is input in the previous step S120.

When the temporary key is input, it is converted into the element data key in the step S36. The data conversion has been described with reference to FIG. 3, so that no further description is made here.

If a judgement is made that no temporary key was entered in the step S121, or after the process of the step S36 is accomplished, the element data key, LEN of the image data corresponding to the element data key and the image data itself are registered as one element data into the editing apparatus 3-1 together with the coordinates input in the previous step S35.

In the step S33, if a judgement is made that the image is not displayed, another judgement is made whether or not the document or sentence is displayed in the step S38.

When the document is displayed on CRT 6, the temporary key or element data key to be displayed is entered by the keyboard 5-1 in a step S122, and the predetermined document is called up from the element D/B 22 to be displayed on CRT 6.

In a subsequent step S40, the above document is moved to the desired position and the coordinates thereof are entered.

In a step S123, a judgement is made whether or not the temporary key was input in the previous step S122. When the temporary key is input, it is converted into the element data key in the step S41. This key conversion is carried out in the same way as in the conversion effected in the preceding step S36.

If a judgement is made that no temporary key was input in the step S123, or after the process effected in the step S41 is accomplished, the element data key, and both LEN and the sentence data of the document data corresponding to the element data key, are registered as one element data into the editing apparatus 3-1 together with the coordinates input in the preceding step S35.

If a judgement is made that no sentence was displayed in the preceding step S38, it is judged that the machine sort information is displayed, and the control process is advanced to a step S131.

In the step S131, the element data key of the machine sort information to be displayed is entered by the keyboard 5-1 and the predetermined machine sort information is called up from the element D/B 22 to be displayed on CRT 6.

In the next step S43, the above machine sort information is moved to the desired position and the coordinates thereof are input.

In a step S44, the element data key is registered together with the coordinates entered in the step S43 in the editing apparatus 3-1.

When the process in the step S37 or S44 is completed, a judgement is made whether or not the 1-page data displayed on CRT 6 has been edited. If not yet, the process is returned to the step S33. If completed, then the process is advanced to a step S46.

In a step S46, the edited one page data is converted in the form as illustrated in FIG. 18 in the editing apparatus 3-1.

In the next step S124, the converted one page data is updated in the book D/B 21.

Since the processes defined in the steps S48 through S57 are the same as those denoted by the same reference numerals of FIG. 3, the explanations thereof will be omitted. If in the step S57, the judgement is performed to edit the next page, the control process is returned to the step S111.

It is obvious that although in the explanations with reference to FIG. 20, the retrieval operation was previously executed before the 1-page data was edited in the steps S33, and thereafter the necessary data were read out of the D/B 12 through 14 to be registered in D/B 22, these processes may be performed during the editing work.

A detailed description will now be made of how the process of the above-described step S114 is carried out for the document data retrieval operation. The retrieval operation of the step S114 is performed by employing any one of the personal computers 4-1 to 4-N.

FIG. 22 is a schematic diagram showing a portion of a table for the document data retrieval which has been previously set in the document D/B 12. A symbol "O" indicated in the respective tables of FIG. 22 represents "null", or that no data is entered.

In the document D/B 12, as illustrated in FIG. 22, a plurality of document data retrieval tables each consisting of an index (referred to as an "ID" simply) and a title have been input and set. A byte length of the ID is set to be equal to that of the detailed item code (6 bytes in the preferred embodiment) in order to correspond to the detailed item code of the element data key which in turn corresponds to the document or sentence data shown in FIG. 17.

In an a-table of FIG. 22, the different data such as A, B, C, and so on, are respectively input only in the head byte (first byte) of ID each having a 6-byte length.

In a b-table of FIG. 22, the common data of "A" is input in the first byte of each ID, and the different data of "A, B, C" are respectively input in the second byte thereof.

In a c-table of FIG. 22, the common data of "B" is entered in the first byte of each ID and the different data of "A, B, C" are entered, respectively, in the second byte thereof.

In a d-table of FIG. 22, the common data of "AA" is input in the first and second bytes of each ID, and also the different data of "A, B, C" are entered, respectively, in the third byte.

In an e-table of FIG. 22, the common data of "AB" is input in the first and second bytes of each ID, and the different data of "A, B, C" are entered, respectively, in the third byte thereof.

Similarly, in an f-table of FIG. 22, the common data of "AAA" is input in the first to third bytes of each ID, and the different data of "A, B, C" are entered, respectively, in the fourth byte thereof.

In a g-table of FIG. 22, the common data of "AAB" is input in the first to third bytes of each ID, and the different data of "A, B, C" are entered, respectively, in the fourth byte.

Figure 23:
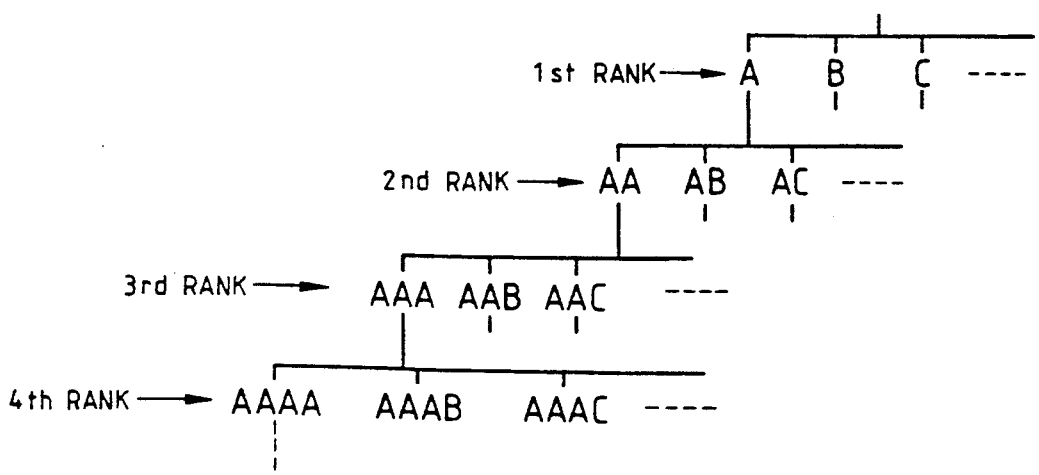
FIG. 23 is a schematic diagram for representing a hierarchical structure of a document retrieval table.

Thus, the respective tables for the document data retrieval operation set in the document D/B 12 are formed in a hierarchical structure as illustrated in FIG. 23.

In practice, each of the tables for the document data retrieval operation are formed in the following method. That is to say, in correspondence to the respective ID's in the table (a-table) of the first hierarchy or rank where the data has been input in only the first byte of each ID, each title (auto-bike, automobile, or special-purpose car etc.) representative of the first highest concept of the document data is input. Also, in correspondence to each of the ID's in the tables (b and c-tables) of the second hierarchy or order where the data has been input in only the first and second bytes of each ID, another title (explanation, or notice etc.) representative of the second highest concept is input. Similarly, still other title (structure explanation, operating or handling manual etc.) representative of the third rank concept is input in the tables (d and e-tables) of the third hierarchy, and a further title (twelfth month maintenance, or sixth month maintenance, etc.) indicative of the fourth rank concept is input in the tables (f and g-tables) of the fourth hierarchy. Also the data the same as ID representative of the lowest concept is previously input in the detailed item code of the element data key shown in FIG. 17. And then the retrieval operation of the document data is performed as illustrated in FIG. 24.

It should be noted that the lowest hierarchy data need not be set in the table of the sixth hierarchy, but may be set in the table higher than the sixth hierarchy.

Figure 24:
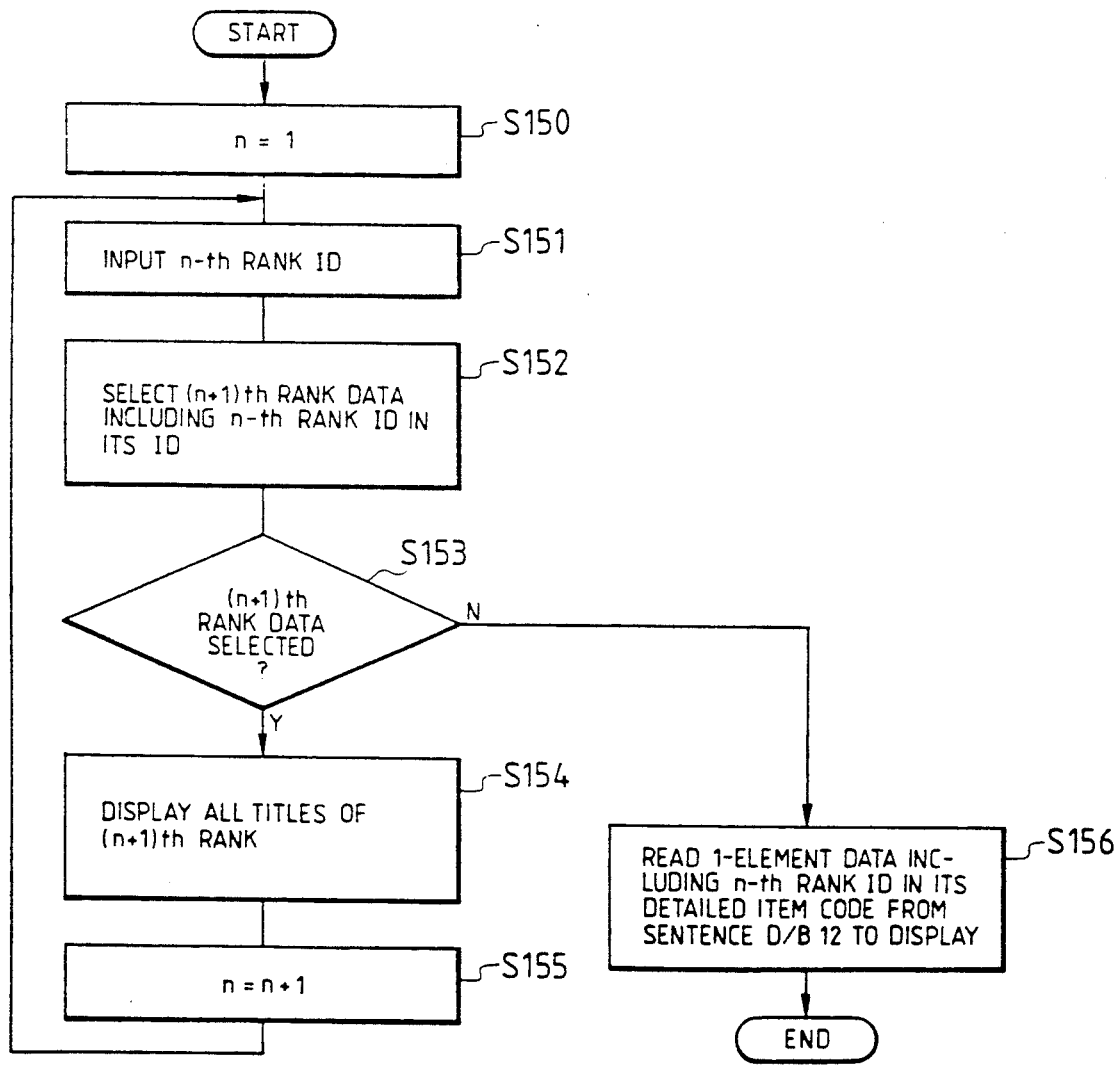
FIG. 24 is a flowchart for illustrating a retrieval method according to one preferred embodiment of the invention.

FIG. 24 is a flowchart for illustrating the retrieval method indicated in the step S114 according to the editing device which the invention is applied to. As previously described, the retrieval operation is carried out by any one of the personal computers 4-1 to 4-N.

In a step S150 of FIG. 24, first "n" is set to be 1.

In a step S151, ID of the n-th hierarchy or rank is input by, for instance, the personal computer 4-1.

In a step S152, the (n+1)th hierarchy data containing the n-th hierarchy ID in ID thereof is selected from the table for the document data retrieval operation.

In a step S153, a judgement is made whether or not the (n+1)th hierarchy data is present, namely, the (n+1)th hierarchy data is selected in the step S152.

If yes, then all titles of the (n+1)th hierarchy are displayed in the step S154. Then, after 1 is added to "n" in a step S155, the control process is returned to the step S151.

When a judgement is made that the (n+1)th hierarchy data is not present in the step S153, the control process is transferred to the step S156.

In a step S156, the 1-element data containing the n-th hierarchy ID in the detailed item code thereof (i.e., 1-document or 1-sentence data shown in FIG. 17) is called up via the host computer 1 from the document or sentence D/B 12 and displayed in the personal computer 4-1.

Consequently, when the table for the document data retrieval operation is constructed as in FIG. 22, and "A" is input as ID only to the first byte, the b-table of the second hierarchy or rank where "A" is set in the first byte is selected and displayed, as indicated by an arrow "P".

Then, when "AA" is input in the first and second bytes as ID, the d-table of the third hierarchy where "AA" is set in the first and second bytes is displayed, as denoted by an arrow Q.

Similarly, when "AAA" is entered as ID in the first to third bytes, the f-table of the fourth hierarchy where "AAA" is set in the first to third bytes is displayed, as shown by an arrow R.

According to the above-mentioned method, such a retrieval operation can be done to show that such documents or sentences as a twelfth month maintenance manual are registered with respect to the document of the structure explanation on, for example, the auto-bike.

Furthermore, when "AAAA" is input as ID into the first to fourth bytes for the retrieval operation, the list of the fifth hierarchy (not shown) where "AAAA" is set in the first to fourth bytes is displayed as denoted by an arrow S.

When such a retrieval process is performed for the list of the lowest hierarchy, a judgement can be made whether or not the required document data is registered in the document D/B 12.

When the necessary data is retrieved, the retrieved data can be utilized to edit a new book if the retrieved data is registered in the element D/B 22 as previously described with regards to the step S117.

Although the above explanation was made on the retrieval operation of the document data, the image data or machine sort information may be similarly retrieved. That is to say, if a plurality of retrieval tables as illustrated in FIG. 22, are set in the image D/B 13 and machine sort information D/B 14, and if ID's of the retrieval tables are input into the items (3-byte length; see FIGS. 6 to 9) in the element data key of the image data and machine sort information, the above-described retrieval operation may be performed.

Although in the preceding description, the machine sort information and image were registered into the respective different D/B (i.e., the machine sort information D/B 14 and image D/B 13), they may be registered in a common D/B since the data of the machine sort information shown in FIGS. 6 to 8 has the same format as that of the image data shown in FIG. 9.

Also when the image and document data were input in the previous embodiment, the temporary key was input first and converted into the element data key in the actual editing operation. However, the temporary key may not be input in advance but the element data key may be input at the beginning, which is similar to the entry of the machine sort information data.

According to the embodiment of the present invention described above, since a new book can be formed by making use of an original book formed by the editing apparatus, the new book is produced efficiently.

Where a service manual or a shop manual covering a machine similar to what is covered in an already edited manual is to be newly produced, since the greater part of the former manual is available for the new production, the new manual can be produced very quickly and inexpensively.

Of course, the editing apparatus of the embodiment can be used for editing books in general, magazines, and newspapers as well as for producing service manuals and shopmanuals.

Incidentally, the second procedure of editing illustrated in FIG. 20 has been depicted as one that requires pertinent data to be introduced and registered in the file for the production of a new book at the step S25 to S27. Said procedure, however, does not always require introduction of the material ID No. or the starting page of the file for the production of the new book, because the editing apparatus is so constructed that the data of such particulars are to be introduced at the step S103.

The processing at the step S150 illustrated in FIG. 24 may be omitted. In the present invention, the retrieval of data can be started by the introduction of ID of a lower rank than the first rank.

Figure 32:
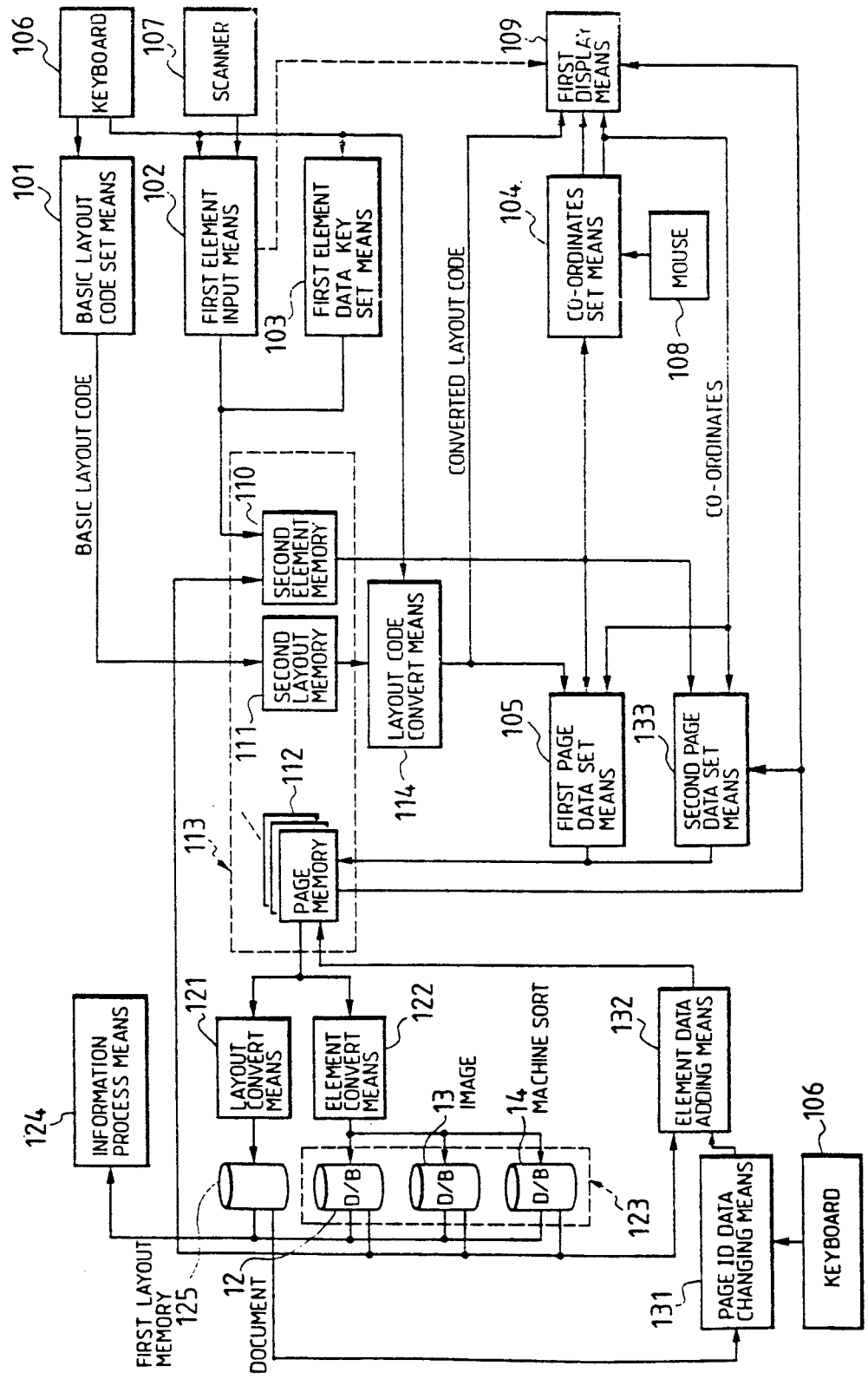
FIG. 32, 33, and 34 are functional diagrams of yet another embodiment of this invention, respectively.

Now, the construction of the first embodiment of this invention will be described. FIG. 32 is a functional block diagram illustrating the construction of this invention. In FIG. 32, the reference numerals which have equals in FIG. 2 denote identical or similar parts.

In FIG. 32, a keyboard 106 and 106A are similar in function to the keyboards 5-1 to 5-N and the keyboards of the personal computers 4-1 to 4-N illustrated in FIG. 2 and a scanner 107 to the scanner 8 illustrated in the same drawing.

Similarly, second element memory means 110 is similar in function to the element D/B 22 of FIG. 2, second layout memory means 111 to the basic layout D/B 23, and page memory means 112 to the book D/B 21 of the same drawing.

In FIG. 32, the keyboard 106 is connected to basic layout code setting means 101, element input means 102, element data key setting means 103, and layout code conversion means 114.

The basic layout code setting means 101 sets the basic layout code (refer to FIG. 4) to be fed in at the step S1 of FIG. 3.

The element data key setting means 103 sets the element data key illustrated in FIGS. 6 to 9 and FIG. 17.

The element input means 102 receives the document data fed in through the keyboard 106 and the image data fed in through the scanner 107.

The layout code conversion means 114 converts the "layout code" part of the basic layout code introduced through the basic layout code setting means 101 into the material ID No. and page.

The basic layout code setting means 101 is connected to the second layout memory means 111 in the memory means 113. The second layout memory means 111 is connected to the layout code conversion means 114. The element input means 102 and the element data key setting means 103 are connected to the second element memory means 110 in the memory means 113.

The second element memory means 110 is connected to coordinates setting means 104, first page data setting means 105, and second page data setting means 133. The coordinates setting means 104 fulfills the role of feeding the element data key supplied from the second element memory means 110 and the element data corresponding to the element data key to display means 109 and, at the same time, setting the coordinates of the element data to be moved by the manipulation of a mouse 108, and feeding the information of the coordinates to the display means 109, the first page data setting means 105, and the second page data setting means 133.

The layout code conversion means 114 calls out a desired one of the basic layout codes stores in the second layout memory means 111, converts the basic layout code into such a converted layout code as illustrated in the lower part of FIG. 12, and supplies the converted layout code to the first page data setting means 105 and the display means 109.

The first page data setting means 105 which is actuated when an entirely new book is to be produced, serves to prepare such data for one page as illustrated in FIG. 18 by using the element data key and the element data supplied from the second element memory means 110, the converted layout code supplied from the layout code conversion means 114, and the information on the coordinates supplied from the coordinates setting means 104, and supply the produced data for one page to the page memory means 112 in the memory means 113.

The element input means 102 is connected with a broken line to the display means 109, indicating that the data concerning documents, for example, are exhibited on the display means 109 when such documents as letters and sentences are to be introduced through the keyboard 106.

The page memory means 112 is connected to layout conversion means 121 and element conversion means 122.

The layout conversion means 121 prepares such information on layout as illustrated in FIG. 19 by removing the LEN and element data from the group of element data in the one page data (FIG. 18) memorized in the page memory means 112. The layout conversion means 121 is connected to first layout memory means 125 which is in turn connected to information processing means 124. The first layout memory means 125 is a memory device which corresponds to the layout D/B 11 illustrated in FIG. 2.

The element conversion means 122 copies a group of element data from the data for one page memorized in the page memory means 112 to decompose the data into units of element. The element conversion means 122 is connected to the first element memory means 123 which is connected to the information processing means 124. The first element memory means 123 is provided with a document D/B 12, an image D/B 13, and a machine sort D/B 14.

The first layout memory means 125 is further connected to page discrimination data alteration means 131. The page discrimination data alteration means 131, when a book is to be produced by utilizing the information on another book already edited by the present editing apparatus and memorized in the first layout memory means 125 and the first element memory means 123, reads necessary part of the layout information memorized in the first layout memory means 125 and converts the material ID No. and page number in the layout information (namely, the page discrimination data for identifying the page of the layout information) into the material ID No. and page number of the new book to be produced. The data necessary for said conversion are introduced through the keyboard 106A.

The page discrimination data alteration means 131 and the first element memory means 123 are connected to element data addition means 132. The element data addition means 132 reads out of the first element memory means 123 the element data corresponding to the element data key being set after the layout on editing in the layout information (FIG. 19) which is supplied from the page discrimination data alteration means 131 and adds the element data to the element data key.

The element data addition means 132 is connected to the page memory means 112 which is further connected to the second page data setting means 133 and the display means 109.

The second page data setting means 133 which is actuated when a new book similar to an already edited book is to be produced based on the edited book, effects modification of a part of the information for one page supplied from the page memory means 112, based on the data in the element unit supplied from the second element memory means 110 and the positional coordinates of the element data supplied from the coordinates setting means 104. Thereafter, it feeds back the modified information for one page to the page memory means 112. The second page data setting means 133, when the data in element units are not supplied from the second element memory means 110, causes the information for one page conveyed from the page memory means 112 to be returned in their unmodified form to the page memory means 112.

The first element memory means 123 is further connected to the second element memory means 110.

The basic layout code setting means 101, the element input means 102, the element data key setting means 103, the coordinates setting means 104, the first page data setting means 105, the second page data setting means 133, and the layout code conversion means 114 are severally provided for the editing devices 3-1 to 3-N or the system controller 2 illustrated in FIG. 2. The layout conversion means 121, the element conversion means 122, the page discrimination data alteration means 131, and the element data addition means 132 are provided severally for the host computer 1, the system controller 2, or the personal computers 4-1 to 4-N illustrated in the same drawing.

The embodiment of FIG. 32 has a function to be fulfilled in wholly new production of a new book and a function to be fulfilled in the production of a book similar to an already edited book, based on that edited book.

First, the operation of the editing apparatus for the wholly new production of a book will be described in detail below.

In the first place, information for designating a basic layout for one page is introduced through the keyboard 106. In the basic layout code setting means 101, the information is recomposed in such a basic layout code as illustrated in FIG. 4. The basic layout code is memorized in the second layout memory means 111.

The introduction and memorization of the basic layout may be carried out a plurality of times when necessary.

Then, the element data key corresponding to the element data to be introduced is fed in through the keyboard 106. In the element data key setting means 103, the element data key is set in such a form as illustrated in FIGS. 6 to 9 and FIG. 17.

After the introduction of the element data key, information on documents or machine sort is fed in through the keyboard 106 or images are taken in through the scanner 107. The data thus introduced are fed out to the element input means 102. In the element input means 102, an LEN for the element data is attached when necessary to the element data. The LEN-attached element data are fed out to and memorized in the second element memory means 110 in combination with the element data key. The introduction and memorization of the element data key and element data may be carried out a plurality of times as occasion demands.

Then, the necessary part of the basic layout code memorized within the second layout memory means 111, namely the basic layout code in which the layout data for a page to be edited are set, is read out of the second layout memory means 111 by the introduction of the layout code through the keyboard 106 and then fed out to the layout code conversion means 114.

In the layout code conversion means 114, the "layout code" part of the basic layout code is converted into the material ID No. and page introduced through the keyboard 106. As the result, a converted layout code (as illustrated in the lower part of FIG. 12) is produced. The converted layout code is fed out to the first page data setting means 105 and the display means 109.

From the second element memory means 110, either the element data to be used for editing a page or the LEN and the element data are fed out in conjunction with the element data key corresponding to the element data, to the first page data setting means 105 and the coordinates setting means 104. The coordinates setting means 104 supplies the element data to the display means 109.

When the element data exhibited on the display means 109 are moved by the mouse 108, the coordinates corresponding to the position assumed by the movement are set by the coordinates setting means 104. The coordinates are transferred to the first page data setting means 105.

Optionally, a plurality of sets of such element data are displayed at pertinent positions on the basic layout, to effect the editing of a page.

When the work of editing one page is completed, such data for one page as illustrated in FIG. 18 are produced in the first page data setting means 105, based on the output signals of the layout code conversion means 114, the second element memory means 110, and the coordinates setting means 104. To be more specific, the data for one page are composed of the converted layout code fed out of the layout code conversion means 114, the layout on editing consisting of the positional coordinates fed out of the coordinates setting means 104 and the element data key of the element data corresponding to the positional coordinates, and the group of element data consisting of the element data key forming the layout on editing and the element data corresponding the element data key.

The one page data produced in the first page data setting means 105 are memorized in the page memory means 112. In the page memory means 112, as many pages of edited data as are required for completing the book are memorized. The data are fed out to hard copy forming means (not shown).

The data for one page memorized in the page memory means 112 are transmitted to the layout conversion means 121. In the layout conversion means 121, such layout information as illustrated in FIG. 19 is produced from the data for one page. The layout information is transmitted to and memorized in the first layout memory means 125.

The data for one page memorized in the page memory means 112 are transmitted to the element conversion means 122. In the element conversion means 122, the group of element data is copied from the data for one page, decomposed into units of element, and transmitted to the first element memory means 123. Of the decomposed group of element data, those concerning the element of document are memorized in the document D/B 12 in the first element memory means 123, those concerning the image element in the image D/B 13, and those concerning the element of machine sort information in the machine sort information D/B 14, respectively.

The element information memorized in the first element memory means 123 and the layout information memorized in the first layout memory means 125 are called out, when necessary, by the information processing means 124 to be utilized for the various information processing and retrieval operations to be executed by the information processing means 124.

As the result, a new book is completed. The data on the new book are decomposed into those concerning layout and those concerning element and memorized.

Now, the operation of the editing apparatus in the production of a book similar to the book edited as described above, based on the edited book, will be described below.

The operator personally examines the already edited books to find which books and which pages of the books are available for a new book, feeds the material ID Nos. and pages (page identification data) of the books to be utilized, and reads out the data of the selected pages from the first layout memory means 125.

The data thus read out are transmitted to the page discrimination data alteration means 131.

When the material ID No. and pages of the book to be produced are fed in through the keyboard 106A, the material ID No. and pages of the data so read out are converted in the page discrimination data alteration means 131 into the material ID No. and pages so introduced.

The element data addition means 132 reads out of the first element memory means 123 the "element data" corresponding to the element data key set after the layout of editing in the converted data for one page and suffixes them to the element data key. This step complete the data for one page.

The data for one page are memorized in the page memory means 112, then transmitted to the display means 109 for display thereon, and also transmitted to the page data setting means 133.

The operator examines the data for one page exhibited on the display means 109 to find whether the data are in need of any alteration or not. When the absence of necessity for data alteration is confirmed, the information announcing this fact is fed out from suitable means (not shown) and the data are transmitted to the page memory means 112. In the layout conversion means 121 and the element conversion means 122, the data are decomposed into those concerning the elements and those concerning the layout. In this case, since the data concerning the elements have been already memorized in the first element memory means 123, only the data concerning the layout are fed out to and memorized in the first layout memory means 125.

When the desired "element data" part of the data for one page exhibited on the display means 109 is to be altered, namely when the data for one page exhibited on the display means 109 are to be revised, the element information comprising the element data key and the element data is read out of the first element memory means 123 and registered in the second element memory means 110 by introducing the element data key corresponding to the required element data.

When the element data required for a new book to be edited are not found in the first element memory means 123, the element data key and the element data are newly introduced and registered in the second memory means 110.

The second element memory means 110 is urged by means (not shown) to supply necessary element data and element data key to the coordinates setting means 104 and the second page data setting means 133. The coordinates setting means 104 supplies the element data to the display means 109, sets the coordinates of the element data fixed by the manipulation of the mouse 108, and supplies the coordinates to the second page data setting means 133.

The operations described above are repeated when necessary. When the one page data exhibited on the display means 109 have been altered (edited), the second page data setting means 133 causes the data for one page transmitted from the page memory means 112 to be reset into edited data for one page. To be more specific, the second page data setting means 133 erases from the data for one page transmitted from the page memory means 112, the element data superposed with the element data set newly on the layout by editing, the element data key corresponding to the element data, and the positional coordinates thereof and, at the same time, supplements the data for one page with the element data set newly on the layout by editing, the element data key corresponding to the element data, and the positional coordinates of the element data.

The data for one page altered as described above are supplied from the second page data setting means 133 to the page memory means 112 and memorized therein. The data for one page are supplied in unit of page or book to the layout conversion means 121 and the element conversion means 122. The layout conversion means 121 and the element conversion means 122 decompose the supplied data into those concerning the elements and those concerning the layout to memory, respectively, in the first layout memory means 125 and the first element memory means 123. In this case, those of the data concerning the elements which have been already memorized in the first element memory means 123 are not doubly memorized.

When the operation described above is performed in the production of a book similar to an already edited book, since common element data can be utilized in their unmodified form in the production of the new book, there is obtained a generous saving in the time required for the production of the book.

The embodiment of FIG. 32 has been depicted as so constructed that the basic layout code is preparatorily set in the basic layout code setting means 101, the basic layout code in which the page layout for the page to be edited is set is called out by the use of the layout code, before the editing work is started, and the "layout code" part of the basic layout code is converted into the material ID No. and page in the layout code conversion means 114. This construction is convenient because the layout of a page to be edited (namely the layout data illustrated in FIG. 4) is not required to be set each time a new page is edited.

The embodiment described above is not specifically restricted to such a construction. Optionally, the construction may be modified so that the converted layout code illustrated in the lower part of FIG. 12 may be directly set by introducing the material ID No. and page during the introduction of the layout data. In this case, since the converted layout code fixes the layout of only the page to be edited, the converted layout code is not required to be memorized in the second layout memory means 111. The modified construction is not very suitable for the work of editing a book of a large number of pages because the layout code must be set each time a new page is to be edited. It is nevertheless simple as compared with the construction of the embodiment illustrated in FIG. 32.

The embodiment illustrated in FIG. 32 has been depicted as so constructed that, of the data on the elements decomposed by the element conversion means 122, those concerning the image are memorized in the image D/B 13 and those concerning the information on the machine sort in the machine sort information D/B 14. The present embodiment is not required to be specifically restricted to that construction. The construction may be modified so that either of the image D/B 13 and the machine sort information D/B 14 is installed and the data concerning the image and the data concerning the machine sort are both memorized therein. Since the data concerning the image and the data concerning the machine sort are each furnished with element data keys of one and the same format as illustrated in FIG. 9 and FIGS. 6 to 8, these data can be handled in the common identical form.

Further, when the element data key of the data concerning the documents illustrated in FIG. 17 is written in the same format as that of the data concerning the image and the machine sort information, the data concerning the documents can be memorized in the D/B intended for the memorization of the data concerning the image and the machine sort information.

Further the embodiment mentioned above has been depicted as so constructed that the data for one page produced by the first page data setting means 105, the second page data setting means 133, and the element data addition means 132 are memorized in the page memory means 112. When the page memory means 112 is so adapted as to permit memorization of the data for a plurality of pages and the host computer 1 in FIG. 2 is endowed with the functions of the layout conversion means 121, the element conversion means 122, the page discrimination data alteration means 131, and the element data addition means 132, the otherwise inevitable temporary concentration of load upon the host computer 1 is precluded as mentioned below.

When the editing apparatus is not provided with the page memory means 112, since the host computer 1 is required to call out and preserve data each time the data for one page are fed out for the purpose of editing and printing, for example, or after the editing of one page is completed, it must supply data rather frequently to the first element memory means 123 and the first layout memory means 125. As the result, there are times when the host computer 1 is exposed to temporary concentration of load.

In contrast, when the editing apparatus is provided with the page memory means 112, since the data for all the pages of one book can be memorized wholly in the page memory means 112 preparatorily to the editing of the book by virtue of the page discrimination data alteration means 131 and the element data addition means 132, the host computer 1 can be used for processing all the data introduced from the various devices (such as the personal computers 31-1 to 31-N of FIG. 2) connected to the host computer 1 and installed for a purpose other than the editing by the editing apparatus until the processing of the data for the whole book such as editing and printing is completed. As the result, the operation of the host computer 1 with respect to the processing for the editing apparatus is appreciably decreased and, consequently, the load on the host computer 1 is dispersed and alleviated.

When the page memory means 112 has the data of pages of the book to be edited memorized therein, the work of editing the book can be performed even when the office is closed as on a holiday and the operation of the host computer 1 is stopped.

On the condition that inconveniences of the nature suggested above are tolerated, it may be naturally permissible to so modify the present embodiment that the data for one page output from the first and second page data setting means 105 and 133 are directly supplied to the layout conversion means 121 and the element conversion means 122 and the data for one page fed out of the element data addition means 132 are directly supplied to the second page data setting means 133 and the display means 109.

Further, the embodiment has been depicted as so constructed that the element data key and the element data newly set by the element input means 102 and the element data key setting means 103 and the element data key and the element data supplied from the first element memory means 123 are memorized in the second element memory means 110. The otherwise possible concentration of load upon the host computer 1 can be precluded by installing the second element memory means 110 as described above and consequently allowing the data concerning the elements to be called out abundantly in advance from the first element memory means 123. When the inconveniences are tolerated, the installation of the second element memory means 110 may be omitted.

Further, the installation of the data processing means 124 illustrated in FIG. 32 is not critical.

As is clear from the description given above, the present embodiment brings about the following effect because it is so constructed that the data of a book edited by the editing apparatus itself are decomposed into data concerning the layout and data concerning the elements for storage therein and these data are then utilized for the formation of data for one page. For example, when a new book is to be produced and the new book and a book already edited by the editing apparatus have common documents and illustrations, for example, these common documents and illustrations are not required to be newly fed in and these data may be utilized for the production of the new book. Thus, the production of the new books is simplified and the operation is performed quickly.

Now, the second embodiment of the present invention will be described in detail below with reference to FIG. 1. FIG. 1 is a functional block diagram illustrating the construction of the first aspect of the invention.

With reference to FIG. 1, element memory means 161 memorizes the element data representing such images as documents, photographs, and illustrations and the element data key corresponding to the element data.

Layout memory means 162 memorizes the layout data, the LEN, and the layout code corresponding to the layout data.

Page memory means 163 memorizes the page data composed of material ID No. page, layout data, coordinates, and element data key as illustrated in FIG. 19.

Data memory means 169 which comprises the element memory means 161, the layout means 162, and the page memory means 163 is connected to editing means 160.

Editing information input means 167 is for introducing information necessary for the execution of the editing work. The editing means 160 carries out the editing work in accordance with the information fed in through the editing information input means 167.

The information required by the operator in executing the work of editing is supplied from the editing means 160 to the display means 168.

Security No. input means 166 is used by the operator ready for the operation of the editing means 160 to feed in his own security No.

The security No. memory means 165 memorizes the security Nos. of the operators who are authorized to operate the editing means 160.

Security No. discrimination means 164 examines the security No. fed in through the security No. input means 166 to determine whether said particular security No. is found among the security Nos. memorized in the security No. memory means 165.

Incidentally, the security No. discrimination means 164 and the security No. memory means 165 may be provided indiscriminatingly for any of the host computer 1, the system controller 2, and the editing devices 3-1 to 3-N.

Now, the operation of the second embodiment will be described more specifically with reference to FIG. 1, FIG. 26, and FIG. 27.

Figure 26:
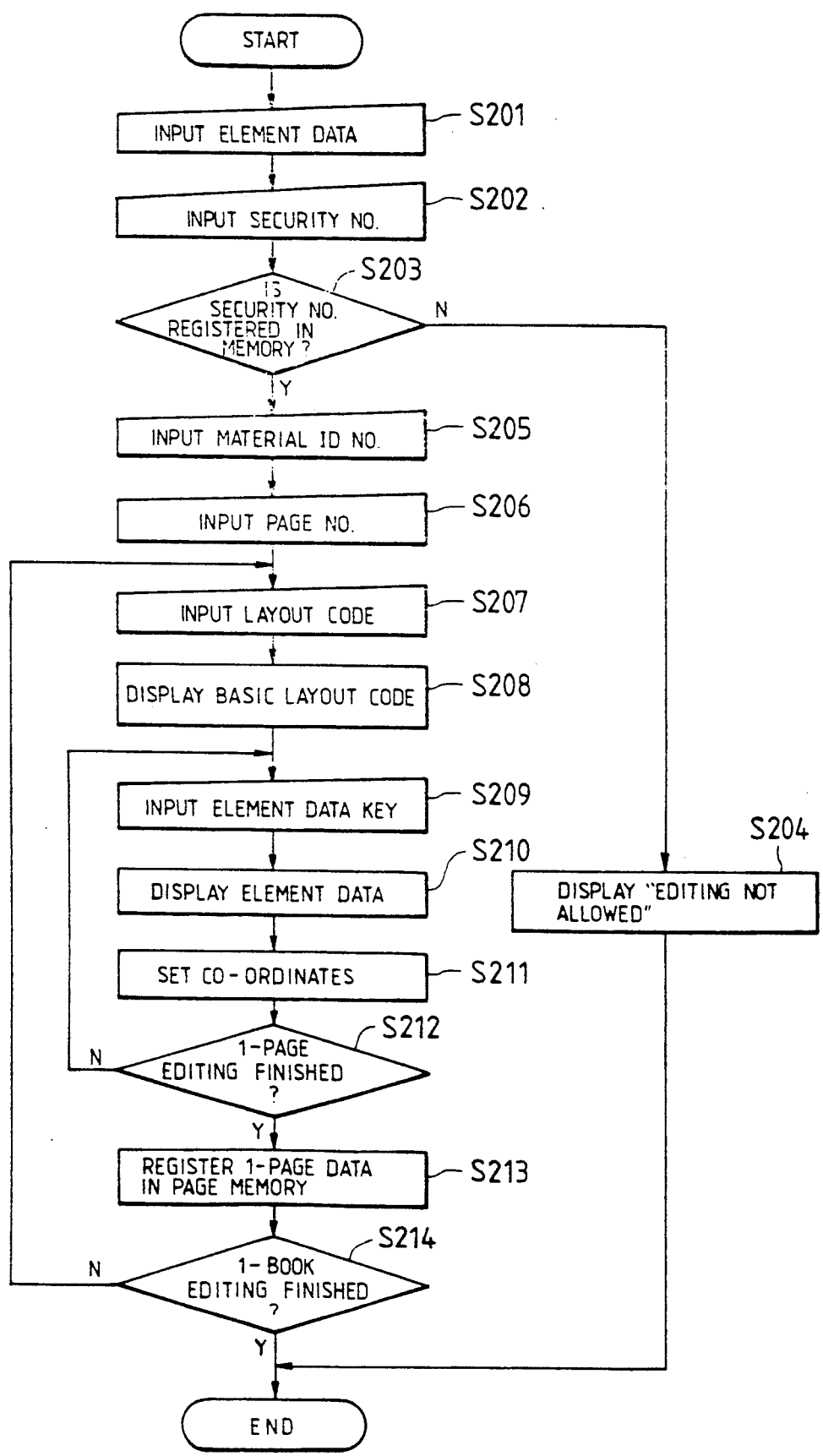
FIG. 26 is a functional block diagram of the first preferred embodiment of the invention.

FIG. 26 is a flow chart of the second embodiment applied to the first procedure of editing mentioned above.

With reference to FIG. 1 and FIG. 26, when the operator wishes to produce a new book by the first procedure of editing, he is required to feed in the data on elements to register in the element memory means 161 at the step S201, and then input pertinent information serving as his own security No. through the security No. input means 166 such as a keyboard or a magnetic reader at the step S202. The pertinent information may be the data of a staff person in charge who is responsible for the formation of a new book illustrated in FIG. 11.

When the security No. is fed in, the security No. discrimination means 164 examines the security No. at the step S203 to define whether said particular security No. is memorized in the security No. memory means 165 as the security No. of an operator authorized to produce the new book by the editing apparatus.

When the absence of the security No. in the memory is confirmed, the security No. discriminating means 164 exhibits a message announcing that the operator is not authorized to operate the editing means 160 on the display means 168 formed of a CRT, for example, at the step S204. At this point, the processing is immediately terminated.

Conversely when the presence of the security No. in the memory is confirmed, the protection lock controlled by the security No. is released and the operator is allowed to proceed to produce the new book.

When the protection lock is released, the operator begins to produce the new book by feeding in various kinds of data through the editing data input means 167.

The operator feeds in the material ID No. of the book to be newly produced at the step S205, and the page number intended to be produced at the step S206.

Subsequently, the operator, for the purpose of setting the layout of the page designated, feeds in the layout code at the step S207.

When the layout code is fed in, the layout information designated by said particular layout code is called out of the layout memory means 162. At the step S208, the basic layout corresponding to the layout information is exhibited on the display as illustrated in FIG. 13.

Then, at the step S209, the operator feeds in the element data key corresponding to the image he wishes to insert and consequently calls the image from the element memory means 161.

The image, at the step S210, is exhibited on the display. At this time, in which position on the basic layout the image is to be inserted is designated by the use of a mouse (not shown), for example, connected to the editing means 160.

When the position for the insertion of the image is fixed with the mouse, the coordinates (X1, Y1) of the upper left corner of the image and the coordinates (X2, Y2) of the bottom right corner of the image on the basic layout are fed into the editing means 160 at step S211.

At the step S212, a decision is made as to whether the editing of one page has been completed or not. When the image to be inserted on the same page still remains, the processing returns to the step 209.

When the editing of one page is completed, such page data as illustrated in FIG. 19 are formed and memorized in the page memory means 163 at the step S213. Thereafter, the processing is moved to the step S214.

At the step S214, a decision is made as to whether the editing of one book has been completed or not. When one or more pages to be edited still remain, the processing returns to the step S207. When the editing of one book is completed, the processing is automatically terminated.

Next, the operation of the second embodiment which the operator performs in the production of a new book by the second procedure of editing will be described below. FIG. 27 is a flow chart illustrating the editing operation. In FIG. 27, the reference numerals which have equals in FIG. 26 denote identical of similar parts. The explanation of these parts, therefore, will be omitted here.

Figure 27:
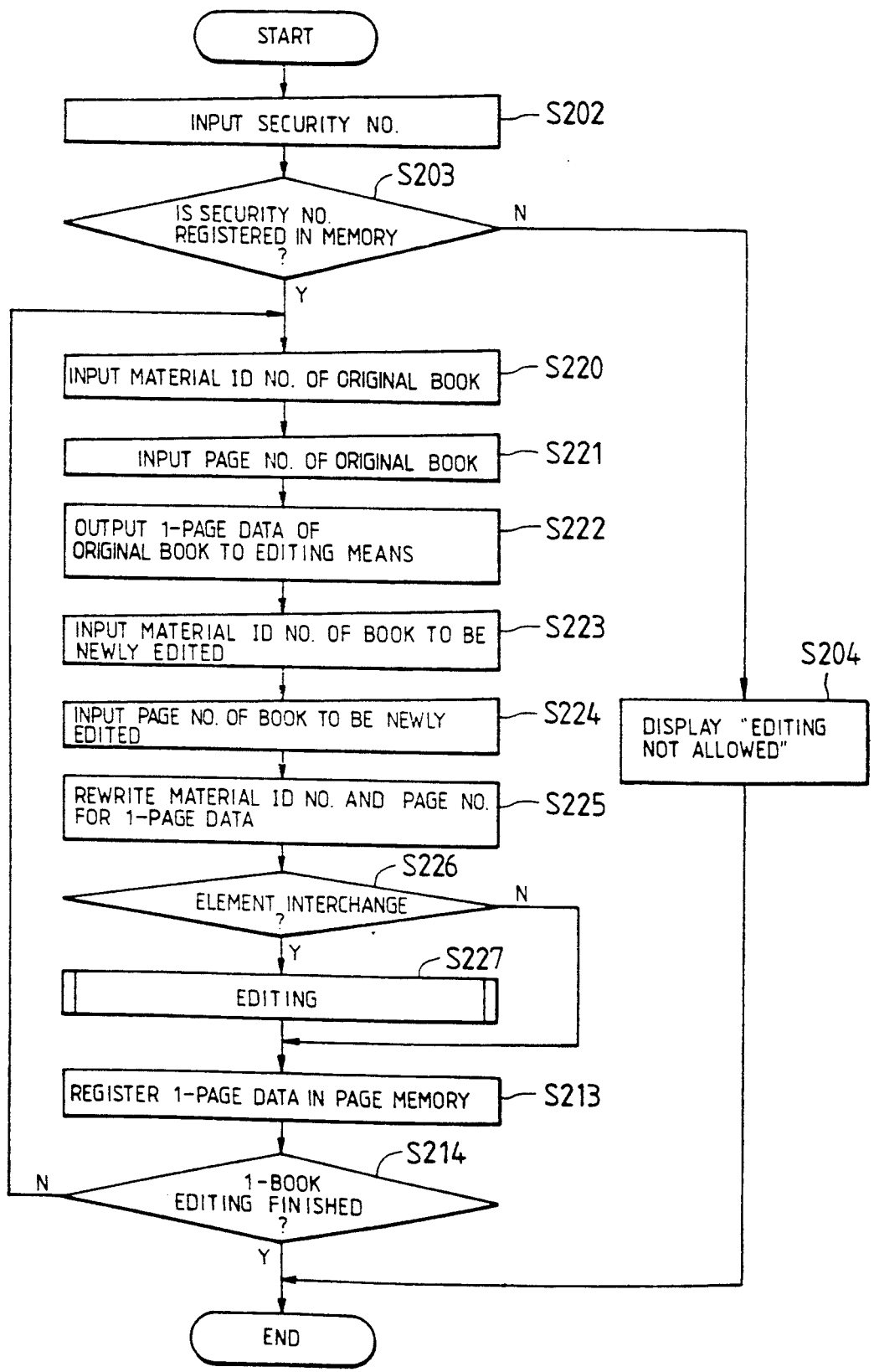
FIG. 27 is a flow chart illustrating the second procedure of editing according to the present invention.

With reference to FIG. 1 and FIG. 27, when a new book is to be produced by the second procedure mentioned above, after the processing in the step S203 has been completed, material ID No. of the original book is input at the step S220 and the page number desired to be copied out of the original book is input at the step S221, respectively.

At the step S222, the data for one page corresponding to the material ID No. and page number are called out of the page memory means 163 to be supplied to the editing means 160.

Subsequently the material ID No. of the new book is fed in at the step S223 and the page number of the new book is input at the step S224, respectively.

At the step S225, the material ID No. and page of the data for one page of the original book memorized in the editing means 160 at the step S222 are rewritten into those of the new book fed in at the steps S223 and S224 as illustrated in FIG. 21.

At the step S226, the element data of photographs, illustrations, etc. inserted in the copied page are examined to determine whether they should be replaced with other element data or not. When the absence of necessity for the replacement is confirmed, the processing is moved to the step S213.

Conversely, when the necessity for the replacement is present, the element data are newly fed in at the step S227 and/or the editing processing similar to that in the first procedure of editing at the steps S209–S212 is executed.

At the step S213, the data for one page rewritten at the step S225 or the data for one page edited at the step S227 are memorized in the page memory means 163 and, at the same time, the necessary part of the data concerning the elements is memorized in the element memory means.

As noted clearly from the description given above, in the second embodiment, the security control is effected by means of the operator's security No.

Now, the third embodiment which permits further elaboration of security control by the secret level of the memorized data and the security No. of the operator will be described below.

Figure 28:
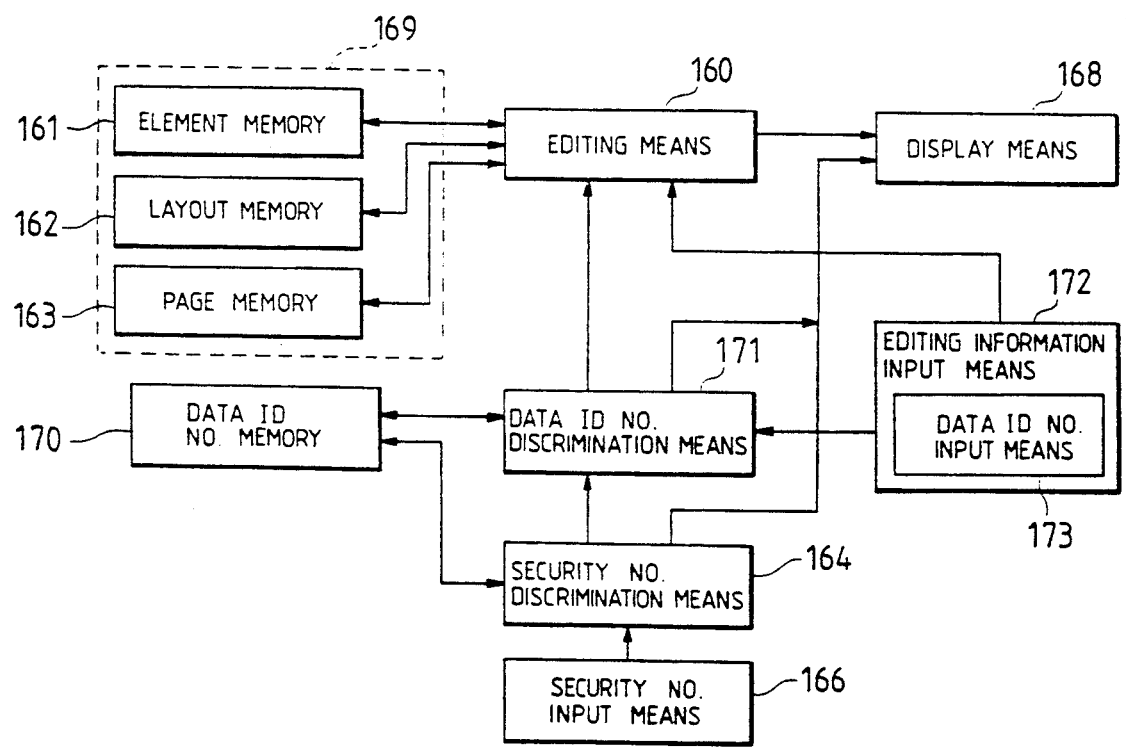
FIG. 28 is a functional block diagram of still another embodiment of the present invention.

FIG. 28 is a functional block diagram illustrating the construction of the third embodiment. In FIG. 28, the reference numerals which have equals in FIG. 1 denote identical or similar parts. The explanation of these parts, therefore, will be omitted here.

Editing information input means 172 serves for feeding in information necessary for executing the work of editing. Data ID No. input means 173 receives the material ID No. for the control or supervision of books to be edited or the element data key for the control of images such as photographs (hereinafter, the material ID No. and the element data key will be collectively referred to as "data ID No.").

Data ID No. memory means 170 memorizes the security No. of the operator and the data ID No. corresponding to the security No. as illustrated in FIG. 31. The operator owning the particular security No. is authorized to utilize the editing apparatus for the work of editing.

The editing means 160 is connected to the editing information input means 172 and adapted to perform the editing work in accordance with the information supplied from the editing information input means 172.

Data ID No. discrimination means 171 examines the data ID No. fed in through the data ID No. means 173 to determine whether it is memorized in the data ID No. memory means 170 as the data ID No. authorizing the operator owning the security No. fed in through the security No. input means or not.

Optionally, the data ID No. memory means 170 and the data ID No. discrimination means 171 may be provided indiscriminatingly in any of the host computer 1, the system controller 2, and the various editing devices 3-1 to 3-N.

Figure 29:
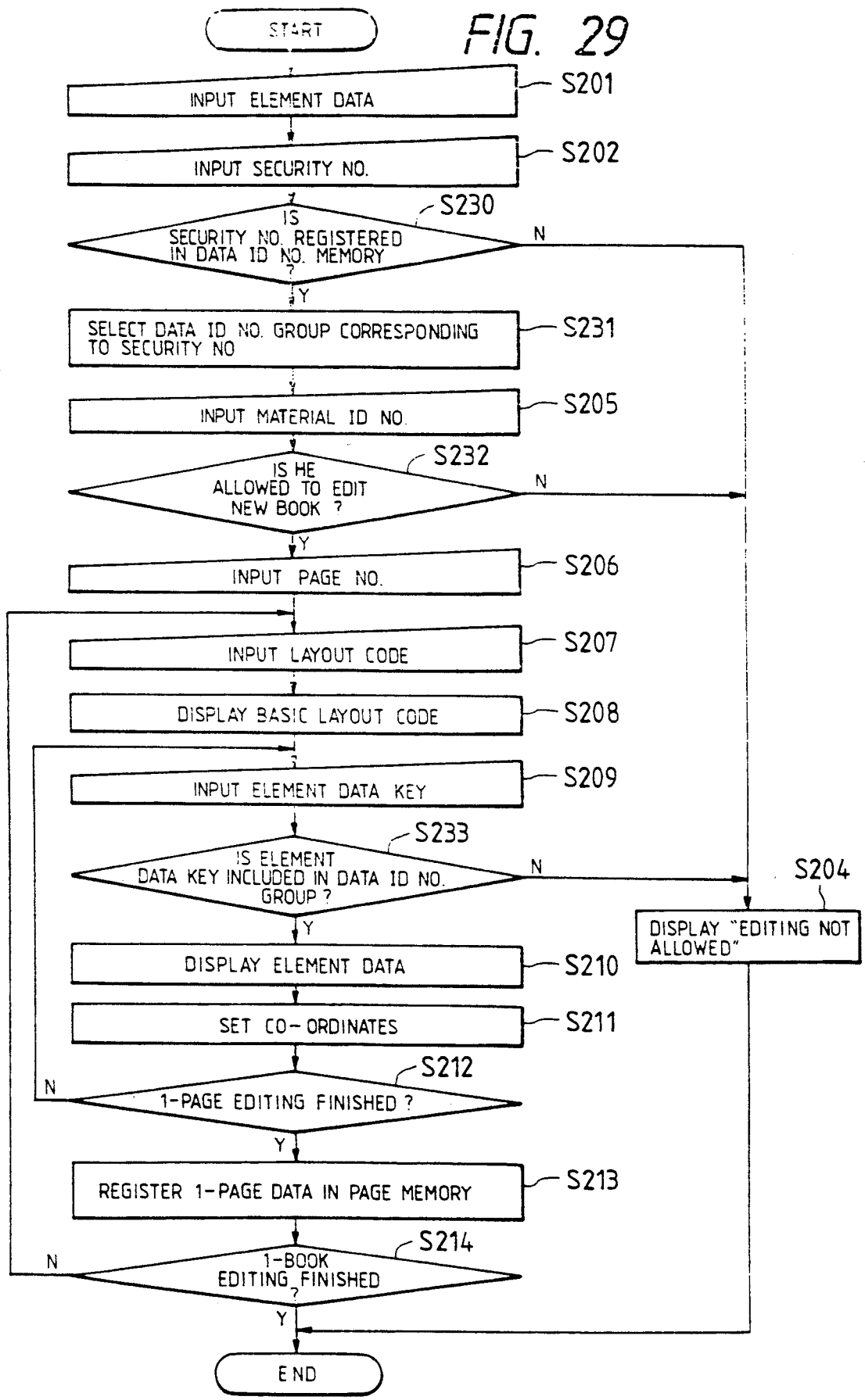
FIG. 29 is a flow chart illustrating the first procedure of editing according to the embodiment of FIG. 28.

Now, the operation of the third embodiment will be described in detail below with reference to FIG. 28, FIG. 29, and FIG. 30. FIG. 29 is a flow chart illustrating the third embodiment as applied to the first procedure of editing. In FIG. 29, the reference numerals which have equals in FIG. 26 denote identical or similar parts. The explanation of these parts will be omitted here.

With reference to FIG. 28 and FIG. 29, when a new book is to be produced by the first procedure of editing mentioned above, the operator at the step S202 feeds in his own security No. and the security No. discriminating means 164, at the step S230 in response to the input, examines whether or not said particular security No. is memorized in the data ID No. memory means 170 as the security No. for the control of the data ID No. When the absence of the particular security No. is confirmed, the processing is terminated at the end of the step S204.

When the presence of the security No. is confirmed, all of the data ID Nos. controlled by the particular security No., namely the group of data ID Nos. of the books which the operator is authorized to edit and inspect, are selected from among the data ID Nos. memorized in the data ID No. memory means 170 at the step S231.

When "A1234" is fed in as a security No., for example, the data ID No. discriminating means 171 selects the group of a total of five data ID Nos., specifically "B10" to "B16" and "NEW" as the data ID Nos. controlled by "A1234" as shown in Table a of FIG. 31.

The term "NEW" as used herein refers to the data ID No. which is assigned to the operator authorized to produce the new book by the use of the editing apparatus. It does not mean the presence of any data with the data ID No. "NEW".

At the step S205, the material ID No. of the book to be newly produced is fed in as the data ID No. thereof.

At the step S232, the decision is made as to whether or not the "NEW" is present among the group of data ID Nos. mentioned above and the material ID No. is present nowhere in the data ID No. memory means 170.

When the result of the decision is in the affirmative, the operator is judged as authorized to produce the new book by the editing apparatus.

Conversely, when the "NEW" is not present in the data ID Nos. or when it is present and the corresponding material ID No. is present somewhere in the data ID No. memory means 170, the operator is judged as unauthorized to use the editing apparatus for the production of the new book.

At the step S232, when the operator is not judged as authorized to use the editing apparatus for the production of the new book, the processing is terminated at the end of the step S204 similarly to the second embodiment.

When the operator is judged as authorized, the processing is carried through the steps S206 to S209, similarly to the first procedure of editing in the second embodiment.

At the step S233, the decision is made as to whether or not the element data key fed in as the data ID No. at the step S209 is found among the group of data ID Nos. selected at the step S231.

When "A1234" is fed in as the security No. and "B12" as the element data key in the case mentioned above, for example, it is judged that "B12" is memorized in the group of data ID Nos. as the element data key corresponding to the security No. "A1234" as shown in Table a of FIG. 31.

Conversely, when "B14" is fed in as the element data key, for example, it is judged that this particular element data key is not memorized in the group of data ID Nos. corresponding to "A1234".

When the absence of the element data key from the group of data ID Nos. is confirmed, the processing is terminated at the end of the step S204. When the presence of the element data key is confirmed, the processing is carried through the steps S210 to S214, similarly to the first procedure of editing in the second embodiment.

Optionally, the procedure may be modified so that when the absence from the memory is confirmed at the step S233, the processing is returned to the step S207.

Now, the operation of the third embodiment to be performed by the operator in the production of a new book in accordance with the second procedure of editing will be described below. FIG. 30 is a flow chart of the operation of the third embodiment applied to the second procedure of editing. In FIG. 30, the reference numerals which have equals in FIG. 27 and FIG. 29 denote identical or similar parts. The explanation of these parts, therefore, is omitted here.

Figure 30:
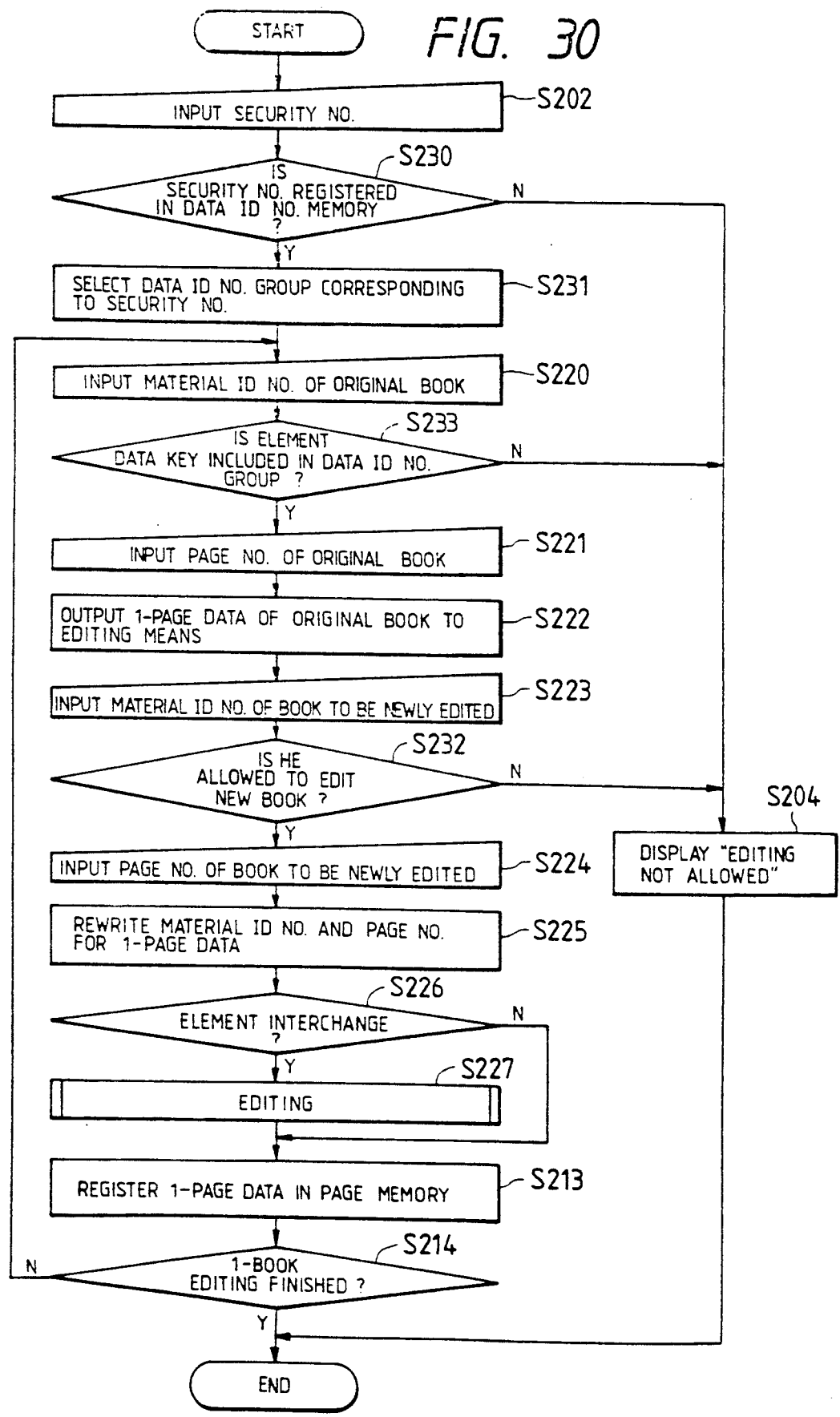
FIG. 30 is a flow chart illustrating the second procedure of editing according to the embodiment of FIG. 28.

In the production of a new book by the second procedure of editing, substantially the same processing as that of the second procedure of editing in the second embodiment is carried out as illustrated in FIG. 28 and FIG. 30. Similarly to the first procedure of editing in the third embodiment illustrated in FIG. 29, after the judgement of the step S230, the group of data ID Nos. corresponding to the security No. are selected at the step S231 and the judgement as to the introduced data ID No. is carried out at the step S232 and the step S233.

It is clear from the description given above that when the secret level of the data ID No. "B10" is higher than that of "B12", "B15", or "B16", namely when the books controlled by "B15" are more important in FIG. 31, the operator whose security No. is "A1234" is authorized to edit or revise all the books controlled by the four data ID Nos., "B10" to "B16" and produce a new book as illustrated in Table a of FIG. 31. The operator assigned the security No. of "A1235" is authorized only to edit the books controlled by the three data ID Nos. "B12", "B15", and "B16" as illustrated in Table b and is not authorized to produce a new book. The present embodiment, therefore, permits security control conforming to the secret level of the data.

The classification of data according to the secret level may be easily supplemented by the classification according to the contents of data to make the security control more effective.

Where the data ID Nos. "B10" and "B14" cover the data on illustrations and the other data ID Nos. cover data on documents, for example, the operator whose security No. is "A1236" is authorized to edit indiscriminatingly the data concerning the illustrations without reference to the secret level. Thus, the effective control is easily accomplished.

This arrangement proves to be advantageous when the editing system of this invention is used not exclusively by the employees of the owner' company but is used additionally by the employees of related companies including contractors for the purpose of inspection of necessary data.

The security control involved in the use of the editing apparatus for the editing work has been described. Optionally, this system may be modified so that the security control is effected when the editing apparatus is started. As the result, the access to the system for the inspection of books and element data can be controlled.

Figure 33:
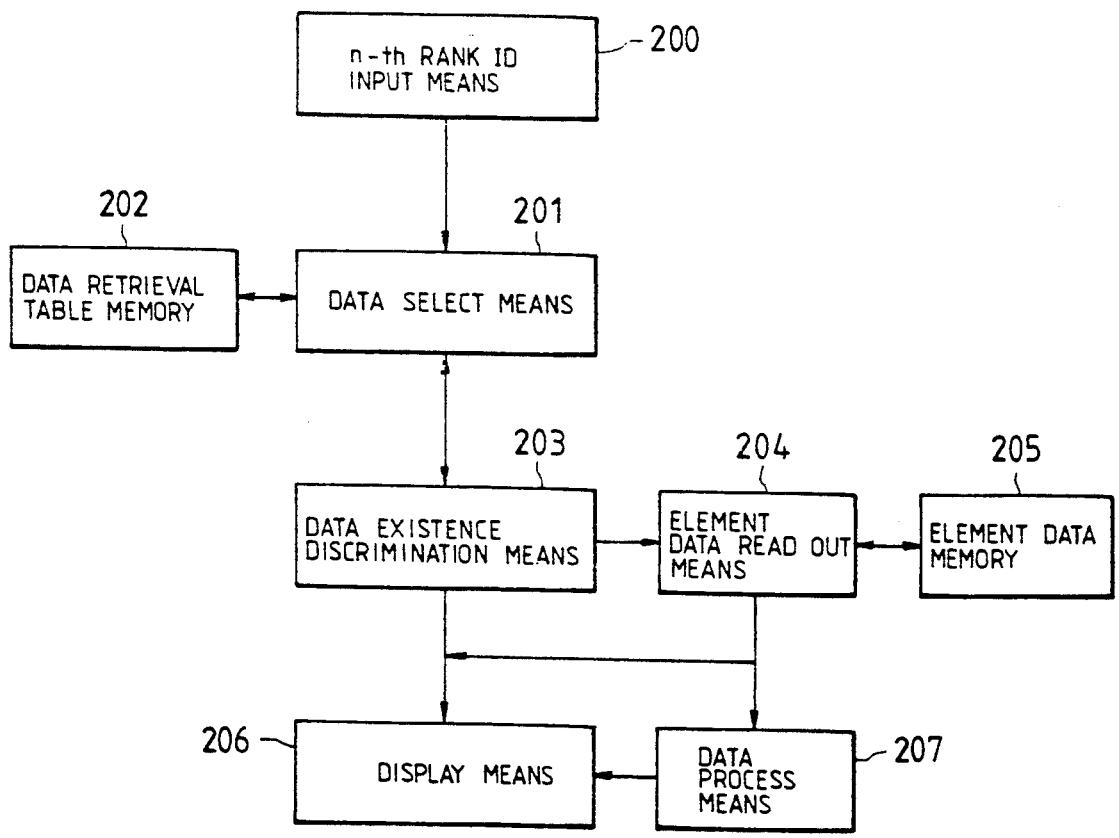

FIG. 33 is a functional block diagram of a data processing device adapted to permit efficient and quick retrieval of accumulated data to be used for editing.

With reference to FIG. 33, the data processing device comprised n'th rank ID input means 200 for the admission of an n'th rank ID, data retrieval table memory means 202 for memorizing tables illustrated in FIG. 22, namely the (n+1)'th rank data (ID and title) corresponding to the n'th rank ID, data selection means 201 for selecting the (n+1)'th rank data from the data retrieval table memory means 202, display means 206, element data memory means 205, data existence discrimination means 203 for making a decision as to whether or not the (n+1)'th rank data are selected by the data selection means 201, namely the data are memorized in the data discrimination table memory means 202 and exhibiting the (n+1)'th rank data on the display means 206 when the presence of the data in the memory means 202 is confirmed or supplying the n'th rank ID to element data read (out) means 204 (which will be described specifically hereinafter) when the absence of the data from the memory means 202 is confirmed, element data read out means 204 for reading the element data corresponding to the n'th rank ID from the element data memory means 205 to supply to the display means 206 and information processing means 207, and information processing means 207 for performing data processing other than retrieval.

First, the data selection means 201 decodes the n'th rank ID fed in through the n'th rank ID input means 200 and calls out of the data retrieval table memory means 202 the (n+1)'th rank data corresponding to the input n'th rank ID, namely the table comprising of the (n+1)'th rank ID including the n'th rank ID in the ID thereof and the title corresponding to the (n+1)'th rank ID as shown in FIGS. 22 and 23.

When the second rank ID "AA" is fed in as an n'th rank ID through the n'th rank ID input means 200, for example, the data selection means 201 reads the table d, shown in FIG. 22, which comprises the third rank ID's "AAA", "AAB", "AAC", . . . each including the second rank ID "AA" and titles corresponding one to one to said third rank ID's out of the data retrieval memory means 202 as (n+1)'th rank data.

The data existence discrimination means 203 performs the judgement as to whether or not the (n+1)'th rank data are present in the data retrieval table memory means 202.

In other words, the data existence discrimination means 203 performs the judgement as to whether or not the data selection means 201 has called out the (n+1)'th rank ID and the titles corresponding to the (n+1)'th rank ID. When the third rank ID, namely the (n+1)'th rank ID, is called out, the corresponding table d is exhibited on the display means 206.

Conversely when the absence of the ID is confirmed, namely when the absence of the third rank ID is confirmed, the second rank ID which is an n'th rank ID in this case is fed out to the element data read means 204.

The element data read means 204 decodes the n'th rank ID fed out of the data existence discrimination means 203, reads the element data corresponding to the n'th rank ID from the element data memory means 205 to supply to the display means 206 and the information processing means 207.

When the third rank ID which is an (n+1)'th rank ID in this case is absent, namely when the data constituting the table d illustrated in FIG. 22 are absent from the data retrieval table memory means 202, for example, the data existence discrimination means 203 supplies "AA" as the second rank ID to the element data read means 204.

The element data read means 204 decodes the second rank ID "AA", reads out of the element data memory means 205 such element data of sentences, illustrations, etc. as defined by the title "explanation" corresponding to the second rank ID "AA", and supplies the element data to the display means 206 and the information processing means 207.

As described above, the present embodiment permits the data retrieval to be carried out efficiently because the data retrieval can be started by the introduction of a lower ID than the first rank ID.

Now, another version of the data processing apparatus which allowed further enhancement of the efficiency of data retrieval will be described below with reference to FIG. 2, FIG. 34, and FIG. 35.

FIG. 35 is a flow chart of another typical system of data retrieval according to the present invention. In FIG. 35, the steps with S-numerals which have equals in FIG. 24 denote identical or similar steps of processing.

The n'th rank ID is fed in through the personal computer 4-1, for example, at the step S151. At the step S152, the (n+1)'th rank data including the n'th rank ID in the ID thereof are selected from the data retrieval table by the host computer.

At the step S153, the decision is made as to whether or not the (n+1)'th rank data are present, namely whether or not the (n+1)'th rank data are selected at the step S152, by the host computer 1.

When the presence of the data is confirmed at the step S153, the processing moves to the step S157. When the absence of the data is confirmed, the element data corresponding to the n'th rank ID are called out of the document D/B 12 via the host computer 1 and exhibited on the personal computer 4-1 at the step S156.

At the step S157, the decision is made as to whether or not a plurality of sets each comprising of the (n+1)'th rank ID and the title corresponding to the (n+1)'th rank ID are present in the (n+1)'th rank data.

When the presence of the plurality of the sets mentioned above is confirmed, the processing moves to the step S154. When the absence of the plurality of sets is confirmed, the processing moves to the step S158.

At the step S158, the "element data" part of the only one set of data corresponding to the (n+1)'th rank ID is called out of the document D/B 12 via the host computer 1 and exhibited on the personal computer 4-1.

At the step S154, all of the (n+1)'th rank data are displayed. At the step S155, n is increased by 1. Then the processing returns to the step S151.

Now, the procedure for data retrieval will be described more specifically with reference to FIG. 34.

Figure 34:
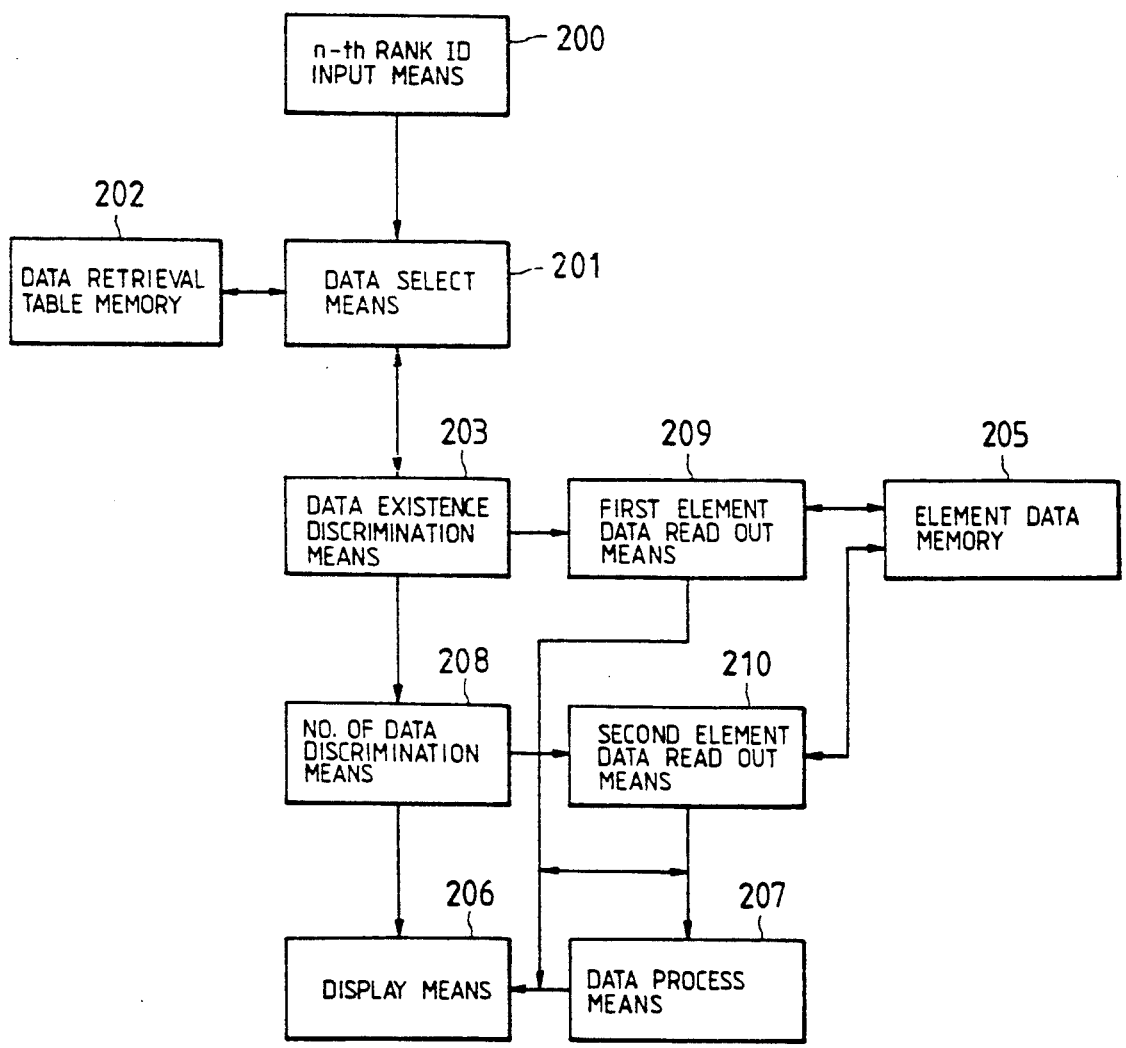

FIG. 34 is a functional block diagram of still another embodiment of the present invention. In FIG. 34, the reference numerals which have equals in FIG. 33 denote identical or similar parts.

The data processing apparatus comprises:

(A) n'th rank ID input means 200 for introducing an n'th rank ID, (B) data retrieval quality table memory means 202, (C) data selection means 201 for selecting the (n+1)'th rank data from the data retrieval quality table memory means 202, (D) display means 206, (E) element data memory means 205, (F) data existence discrimination means 203 for making the decision as to whether or not the (n+1)'th rank data are selected by the data selection means 201, namely whether or not the data are present in said data retrieval table memory means 202 and supplying said (n+1)'th rank data to data number discrimination means 208 (being described specifically hereinafter) when the presence of the data is confirmed or supplying the n'th rank ID to first element data read means 209 (being described specifically hereinafter) when the absence of the data is confirmed, (G) first element data read means 209 for reading element data corresponding to the n'th rank ID from the element data memory means 205 to supply to display means 206 and information processing means 207, (H) data number discrimination means 208 for making the decision as to whether or not a plurality of sets of data are present in the (n+1)'th rank data fed out of the data existence discrimination means 203 and exhibiting the (n+1)'th rank data on display means 206 when the presence of the plurality of sets of data is confirmed or supplying the (n+1)'th rank ID in only one set of data to second element data read means 210 (being described specifically hereinafter) when the absence of the plurality of sets of data is confirmed, (I) second element data read means 210 for reading element data corresponding to the (n+1)'th rank ID from the element data memory means 205 to supply to the display means 206 and the information processing means 207, and (J) information processing means 207 for performing information processing.

The first element data read means 209 has the same function as the element data read means 204 illustrated in FIG. 33.

In FIG. 34, the data selection means 201 decodes the n'th rank ID fed in through the n'th rank ID input means 200 and calls out of the data retrieval table memory means 202 the (n+1)'th rank data corresponding to the n'th rank ID, namely, a table composed of the (n+1)'th rank ID including the n'th rank ID in the ID thereof and the title corresponding to the (n+1)'th rank ID as illustrated in FIG. 22 and FIG. 23.

When the second rank ID "AA" is fed in as an n'th rank ID through the ID input means 200 such as a keyboard, for example, the data selection means 201 reads out of the data retrieval table memory means 202 a table composed of the third rank ID's "AAA", "AAB", "AAC", . . . including the second rank ID "AA" and the titles corresponding to the third rank ID's as illustrated in Table d of FIG. 22.

The data existence discrimination means 203 performs the decision as to whether or not the (n+1)'th rank data are present in the data retrieval table memory means 202.

To be more specific, the data existence discrimination means 203 performs the decision as to whether or not the table composed of the (n+1)'th rank ID and the titles corresponding one to one to the (n+1)'th rank ID is called out by the data selection means 201 and supplies the table called out, the table d in this case, to the data number discrimination means 208 when the presence of the calling of the third rank ID corresponding to the (n+1)'th rank ID as described above is confirmed.

Conversely when the absence of the third rank ID is confirmed, the second rank ID "AA" as an n'th rank ID is supplied to the first element data reading means 209.

The data number discrimination means 208 performs the decision as to whether or not a plurality of sets of data are present in the (n+1)'th rank data fed out of the data existence discrimination means 203 and exhibits the (n+1)'th rank data on the display means 206 when the presence of the plurality of sets of data is confirmed or supplies the (n+1)'th rank ID to the second element data reading means 210 when the absence of the plurality of sets of data is confirmed.

To be more specific, the data number discrimination means 208 performs the decision as to whether or not a plurality of sets of data each composed of the (n+1)'th rank ID and the titles corresponding one to one to the (n+1)'th ID are present in the table d whose presence has been confirmed by the data existence discrimination means 203.

Since three sets of third rank ID's "AAA", "AAB", and "AAC" including the second rank ID "AA" are present when the second rank ID "AA" is fed in as the n'th rank ID through the ID input means 200, in this example, the table d composed of the three sets of ID's and the titles corresponding to the three ID's is exhibited on the display means 206.

Conversely, when only one set "AAA" is present, the "AAA" is supplied to the second element data reading means 210.

The first element data reading means 209 decodes the second rank ID "AA" as an n'th rank ID fed from the data existence discrimination means 203, and calls out of the element data memory means 205 the element data corresponding to the second rank ID "AA" for supply to the display means 206 and the information processing means 207.

The second element data reading means 210 decodes the third rank ID "AAA" as an (n+1)'th rank ID fed from the data number discrimination means 208, and calls out of the element data memory means 205 the element data corresponding to the third rank ID "AAA" for supply to the display means 206 and the information processing means 207.

The data processing apparatus of the present embodiment constructed as described above permits the data retrieval to be carried out more easily because the element data corresponding to the relevant ID are fed out of the element data memory means and displayed when the data selection means 201 selects only one set of (n+1)'th rank data.

Though the present embodiment has been depicted as applied to an editing apparatus, it is naturally applicable to various data processing apparatuses of the ordinary run.

As clearly noted from the description given above, the embodiment of FIG. 33 enables the data retrieval to be made at a desired rank by the introduction of the n'th rank ID. In the case of the data whose index is perfectly remembered by the operator on account of high frequency of use, for example, a necessary part of the data can be promptly retrieved by the injection of the index in its complete form. Where the index for the necessary part of the data is not completely known, the data can be retrieved from a desired rank by feeding in only the part of the index clearly known to the operator and then keeping under close inspection the titles on the display means.

Thus, the data processing apparatus of the present invention allows the data retrieval to be carried out very efficiently when the index is perfectly known and even when the index is known only imperfectly.

Further in the case of the embodiment illustrated in FIG. 34 which is provided with the data number discrimination means, the first element data reading means, and the second element data reading means, the element data corresponding to the (n+1)'th rank ID are automatically displayed when there exists only one (n+1)'th rank data. The introduction of the (n+1)'th rank ID through the input means, therefore, is not required to be repeated for display. Thus, the data processing apparatus enjoys improved efficiency.

INDUSTRIAL APPLICABILITY

As clear from the description given above, the first embodiment of the present invention attains the following effect because it enables the data of the book edited with the editing apparatus to be decomposed into data concerning layout and data concerning elements for storage in the D/B and allows data for one page to be composed by using the decomposed and memorized data.

When a new book to be produced and a book already edited with the editing apparatus have common documents, illustrations, etc, the production of the new book can be attained by utilizing such common data without requiring new introduction of the documents, illustrations, etc. Thus, the production of the new book can be accomplished simply and quickly.

In accordance with the second embodiment, the security control can be attained with high reliability because the protect function is manifested not only on such materials as books and pages which have been already edited but also on element data forming such materials. In accordance with the third embodiment, the security control can be carried out more elaborately, depending on the position of the operator or the contents of data. Thus, the security control is attained with high efficiency.

The data processing apparatus of the present invention permits the data retrieval to be carried out very efficiently when the index of data is perfectly known or even when the index is known imperfectly. The application of the data processing apparatus of this invention to the data retrieval from the data base in the editing apparatus, therefore, warrants highly efficient editing of a new book.

What is claimed is:

1. A book editing apparatus comprising means for setting a converted layout code which designates a basic layout of a page of a book to be edited, means for inputting element data which compose a page of the book, means for setting element data keys corresponding to said element data, means for setting the positional coordinates of element data on said basic layout, first page data setting means for setting data for one page comprising said converted layout code, a layout for editing, and a group of element data, said layout for editing comprising the positional coordinates of element data that is to be laid out on said positional coordinates and element data keys corresponding to said element data, and said group of element data comprising element data keys and the element data corresponding to said element data keys, layout conversion means for setting layout information for one page by deleting the element data from said data for one page, first layout memory means for storing said layout information, element conversion means for extracting said group of element data from said data for one page to extract element information for said one page, first element memory means for memorizing said element information, page identification data alteration means for reading layout information from said first layout memory means and for altering page identification data comprising a portion of said layout information, element data addition means for reading pertinent element information from said first element memory means and attaching element data to said altered page identification data to set data for one page of the book, and second page data setting means for generating converted data by converting pertinent element data, the element data key and the positional coordinates of the pertinent element data in said data for one page set by said element data addition means into desired element data, a desired element data key and positional coordinates of the desired element data, respectively, and transmitting said converted data for one page to said layout conversion means and said element conversion means.

2. A book editing apparatus according to claim 1 wherein said means for setting a converted layout code comprises means for setting a basic layout code during said inputting of element data, memory means for storing said basic layout code, and means for converting said stored basic layout code, during the course of editing, into a converted layout code.

3. A book editing apparatus according to claim 1 or claim 2 further including second element memory means connected to said means for setting element data keys, to said means for inputting element data, to said first element memory means, to said coordinates setting means, and to said first and second page data setting means respectively, said second element memory means being operative to store the element data key set by said means for setting element data keys, the element data key stored in said first layout memory means, and element data corresponding to said element data keys, and means for supplying the data stored in said second element memory means to said means for setting positional coordinates and to one of said first and second page data setting means.

4. A book editing apparatus according to claim 3 including page memory means connected to said first and second page data setting means, to said layout conversion means, to said element conversion means, and to said element data addition means respectively, said page memory means being operative to store the data for one page set by one of said first and second page data setting means, and the data supplied by said element data addition means, and means for supplying the data stored in said page memory means to said layout conversion means and to one of said element conversion means and said second page data setting means.

* * * * *